(12) United States Patent
Sia et al.

(10) Patent No.: US 8,651,061 B2
(45) Date of Patent: Feb. 18, 2014

(54) SWIFTLETS FARMING FOR PRODUCTION OF EDIBLE BIRD'S NESTS

(76) Inventors: Yik Hei Sia, Johor Bahru (MY); Jee Hong Tan, Kemaman (MY)

( * ) Notice: Subject to any disclaimer, the term of this patent is extended or adjusted under 35 U.S.C. 154(b) by 0 days.

(21) Appl. No.: 13/526,929

(22) Filed: Jun. 19, 2012

(65) Prior Publication Data
US 2012/0255501 A1 Oct. 11, 2012

Related U.S. Application Data

(60) Continuation of application No. 12/630,309, filed on Dec. 3, 2009, now Pat. No. 8,205,577, which is a division of application No. 11/949,695, filed on Dec. 3, 2007, now Pat. No. 8,210,126.

(30) Foreign Application Priority Data

Dec. 1, 2006 (SG) .............................. 200608249-9
Nov. 23, 2007 (SG) .............................. 200718112-6

(51) Int. Cl.
*A01K 1/00* (2006.01)
(52) U.S. Cl.
USPC ............................ 119/449; 119/436; 119/437
(58) Field of Classification Search
USPC .......................................... 119/436, 437, 449
See application file for complete search history.

(56) References Cited

U.S. PATENT DOCUMENTS

| | | | | | |
|---|---|---|---|---|---|
| 1,823,584 | A | * | 9/1931 | Bruce | 119/302 |
| 2,881,733 | A | * | 4/1959 | Young, Jr. et al. | 119/416 |
| 3,530,831 | A | * | 9/1970 | Conover | 119/450 |
| 3,939,802 | A | * | 2/1976 | Neff | 119/51.04 |
| 4,924,810 | A | * | 5/1990 | Tominaga | 119/6.5 |
| 6,311,642 | B1 | * | 11/2001 | Finn | 119/329 |
| 6,938,577 | B2 | * | 9/2005 | Kraft et al. | 119/57.1 |
| 7,174,847 | B1 | * | 2/2007 | Hulteen, III | 119/6.5 |
| 2007/0215061 | A1 | * | 9/2007 | Sia | 119/329 |

OTHER PUBLICATIONS

Good Animal Husbandry Practice for Edible-Nest Swiftlets Aerodermus Species Ranching and its Premis, Department of Veterinary Servi Ministry of Agriculture Malaysia, http://web.archive.org/web/20051223155402/http://www.jphpk.gov.my/swiftlets+GAHP.pdf, retrieved from internet: Dec. 23, 2005.*

* cited by examiner

*Primary Examiner* — Kristen C Hayes
(74) *Attorney, Agent, or Firm* — K. David Crockett, Esq.; Niky Economy Syrengelas, Esq.; Crockett & Crockett, PC

(57) ABSTRACT

A swiftlet breeding facility, for use in creating and harvesting edible bird's nests. The facility includes sub-systems for injecting live insect and worm prey, and water, into an aerial enclosure to provide a feeding system imitative of a natural swiftlet feeding environment.

5 Claims, 30 Drawing Sheets

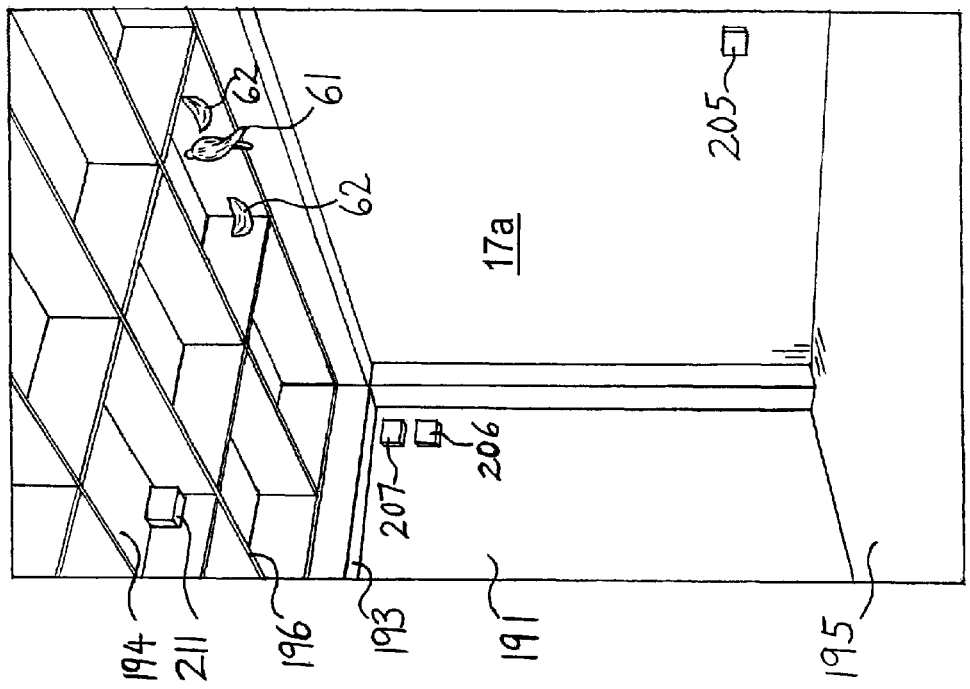
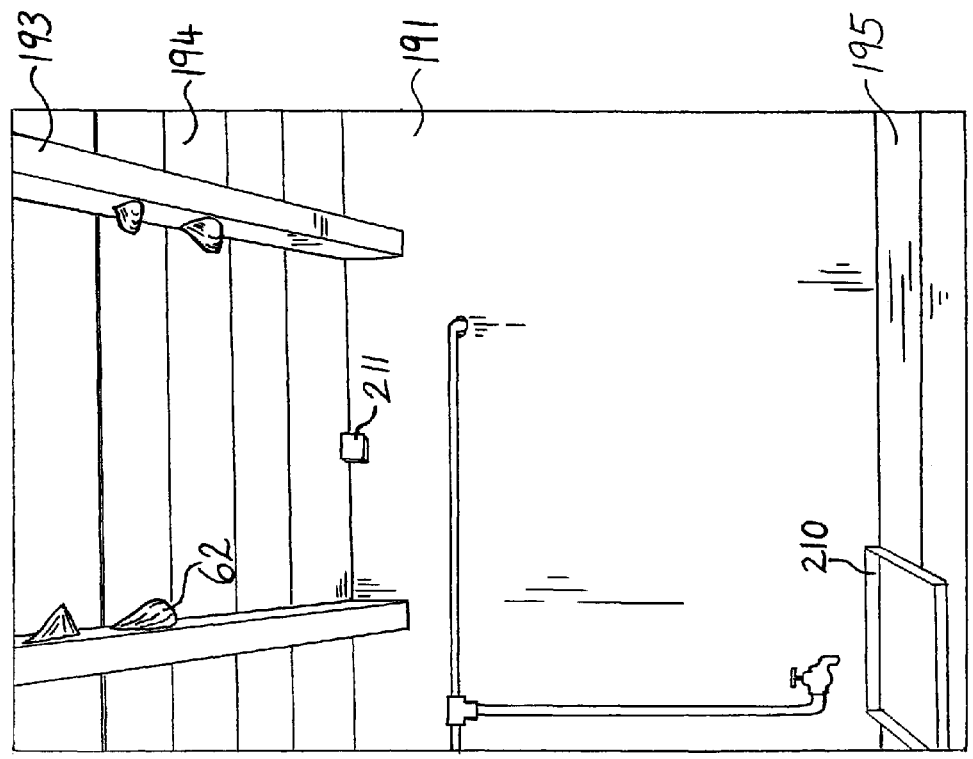

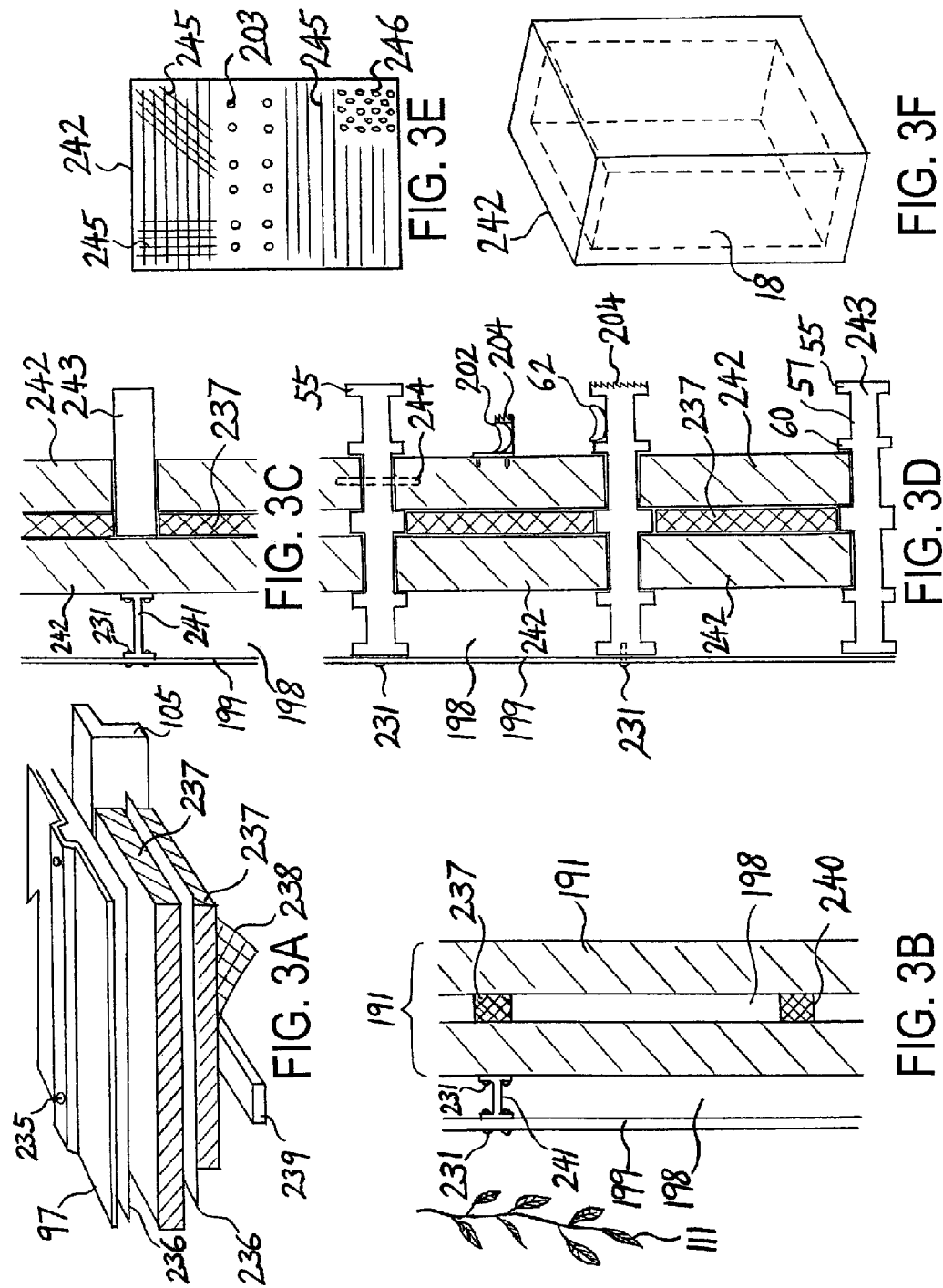

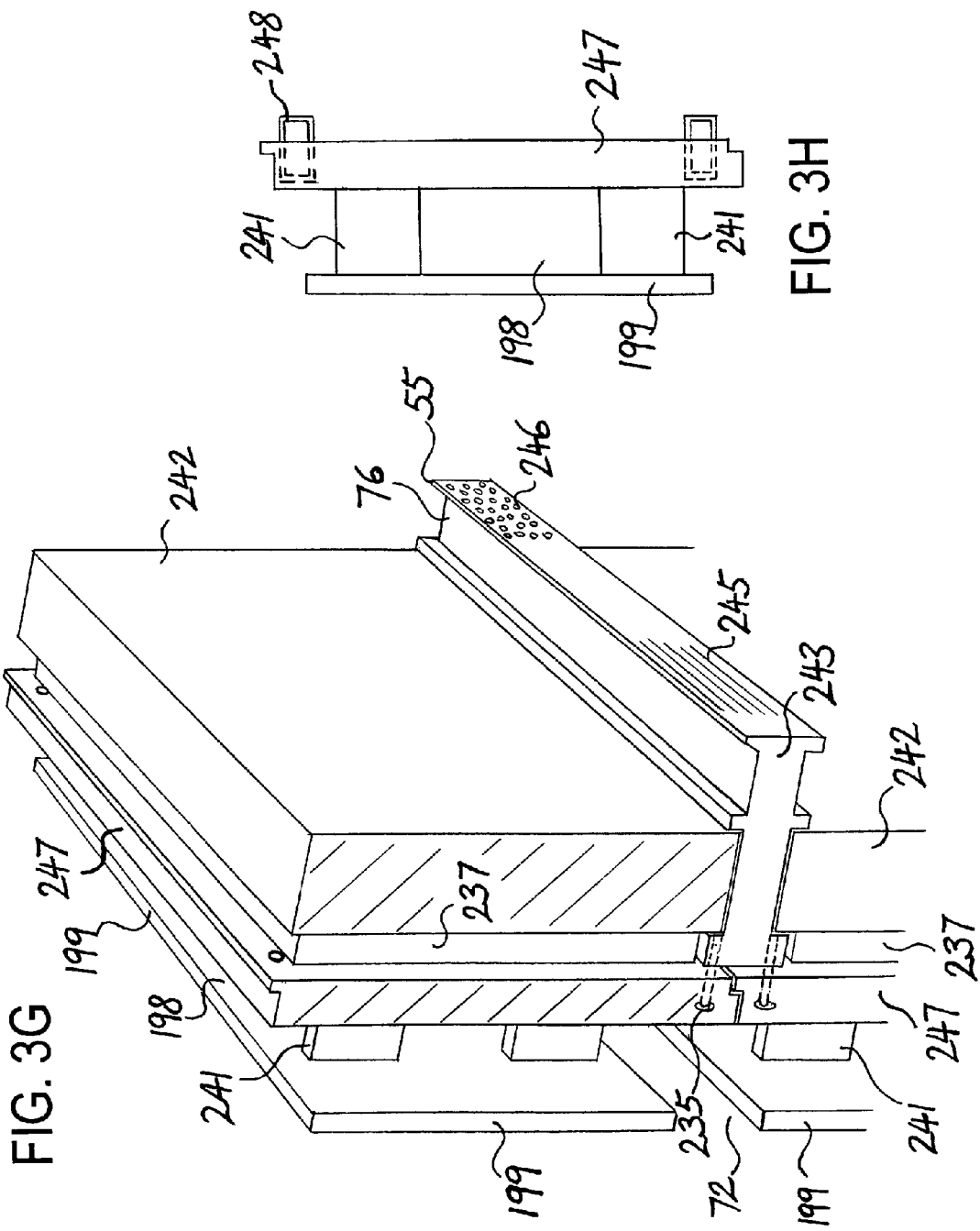

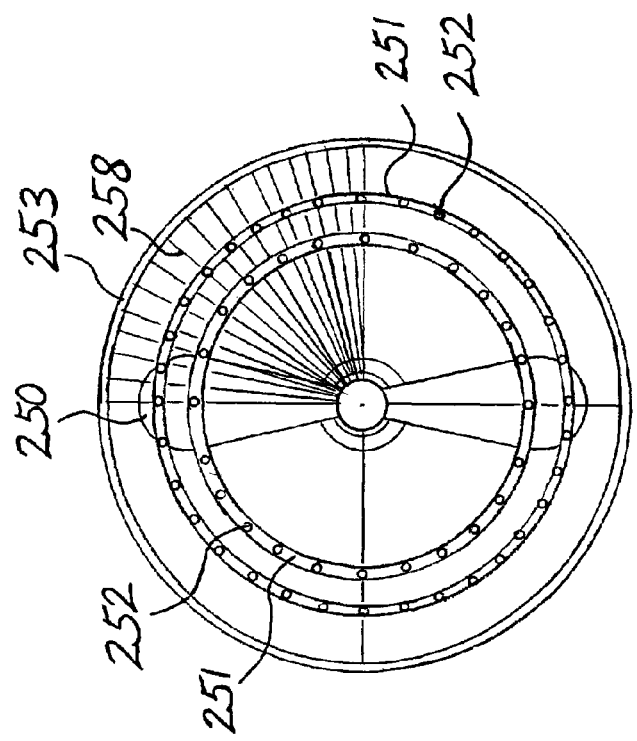
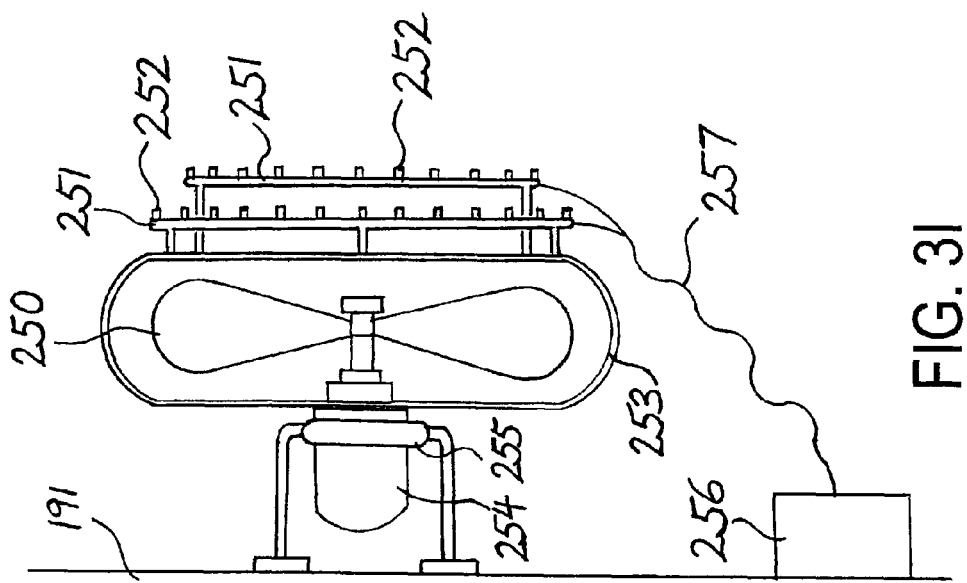
FIG. 3J
FIG. 3I

FIG. 5A
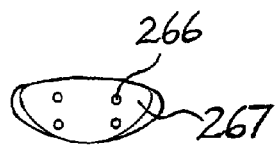
FIG. 5B
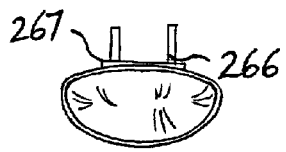
FIG. 5C
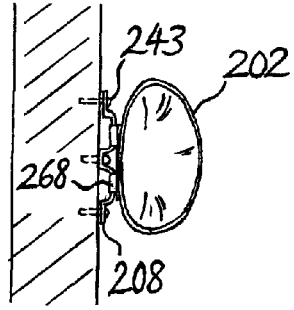
FIG. 5F
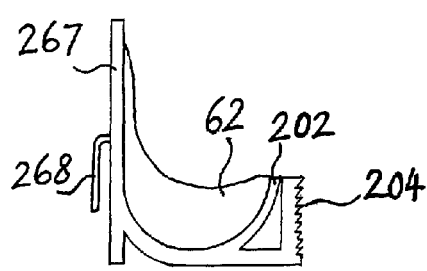
FIG. 5G
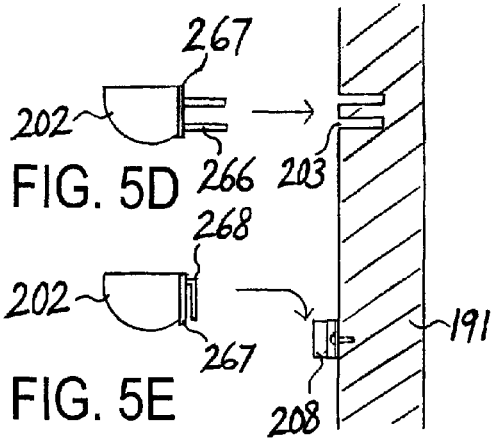
FIG. 5D
FIG. 5E
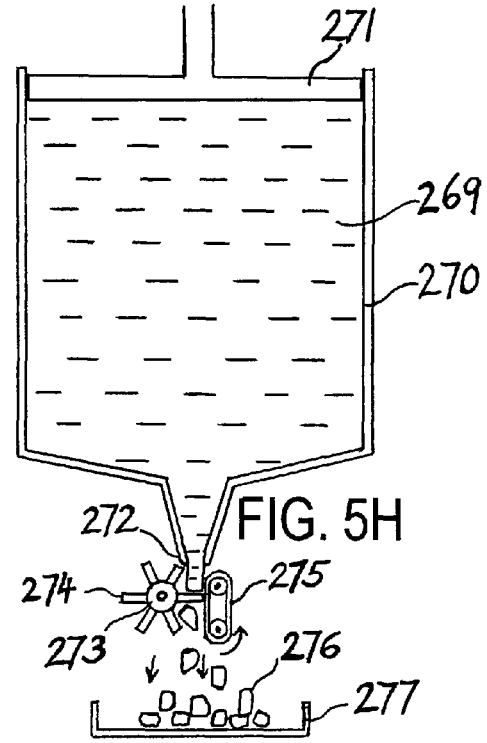
FIG. 5H
FIG. 5I
FIG. 5J

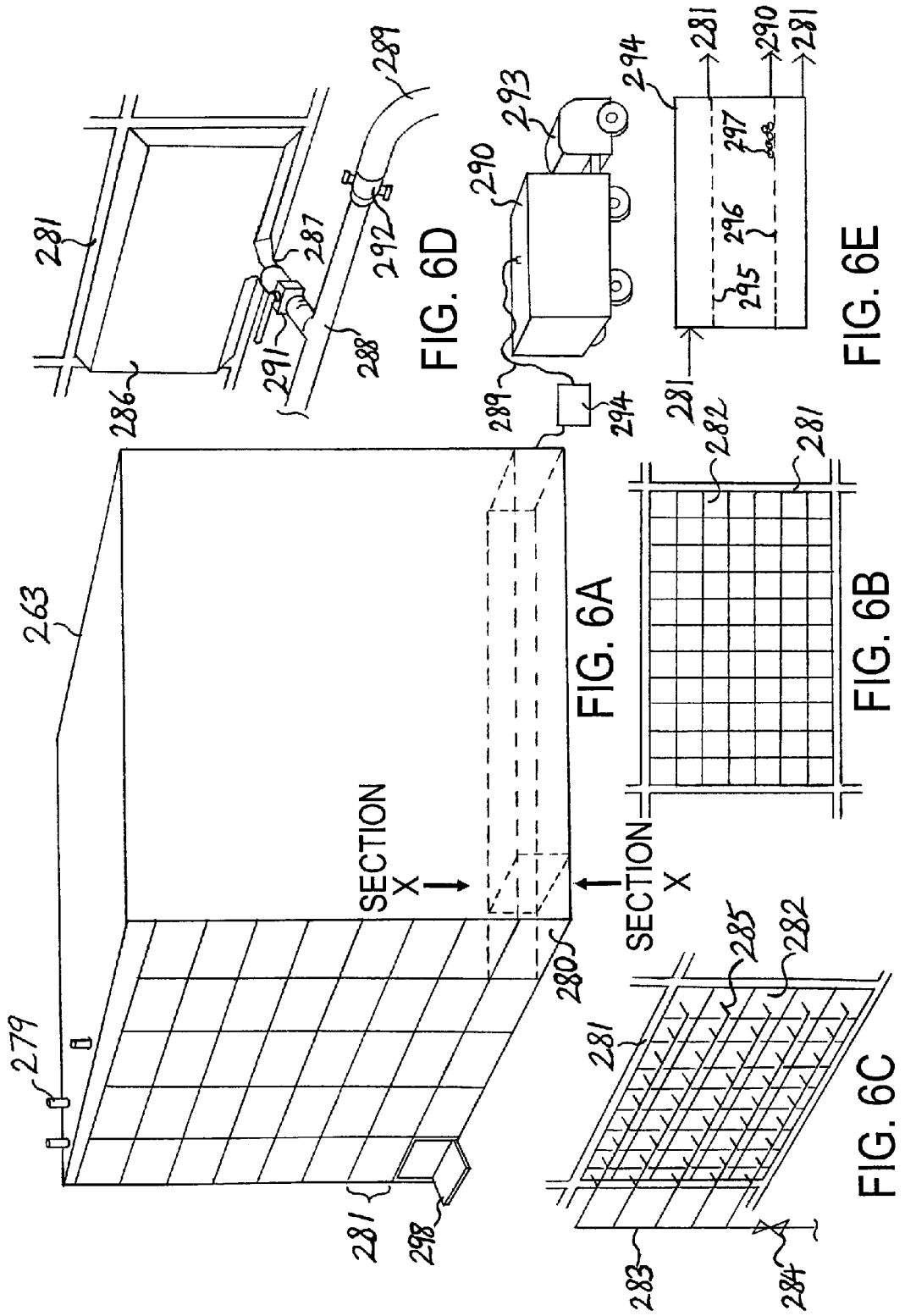

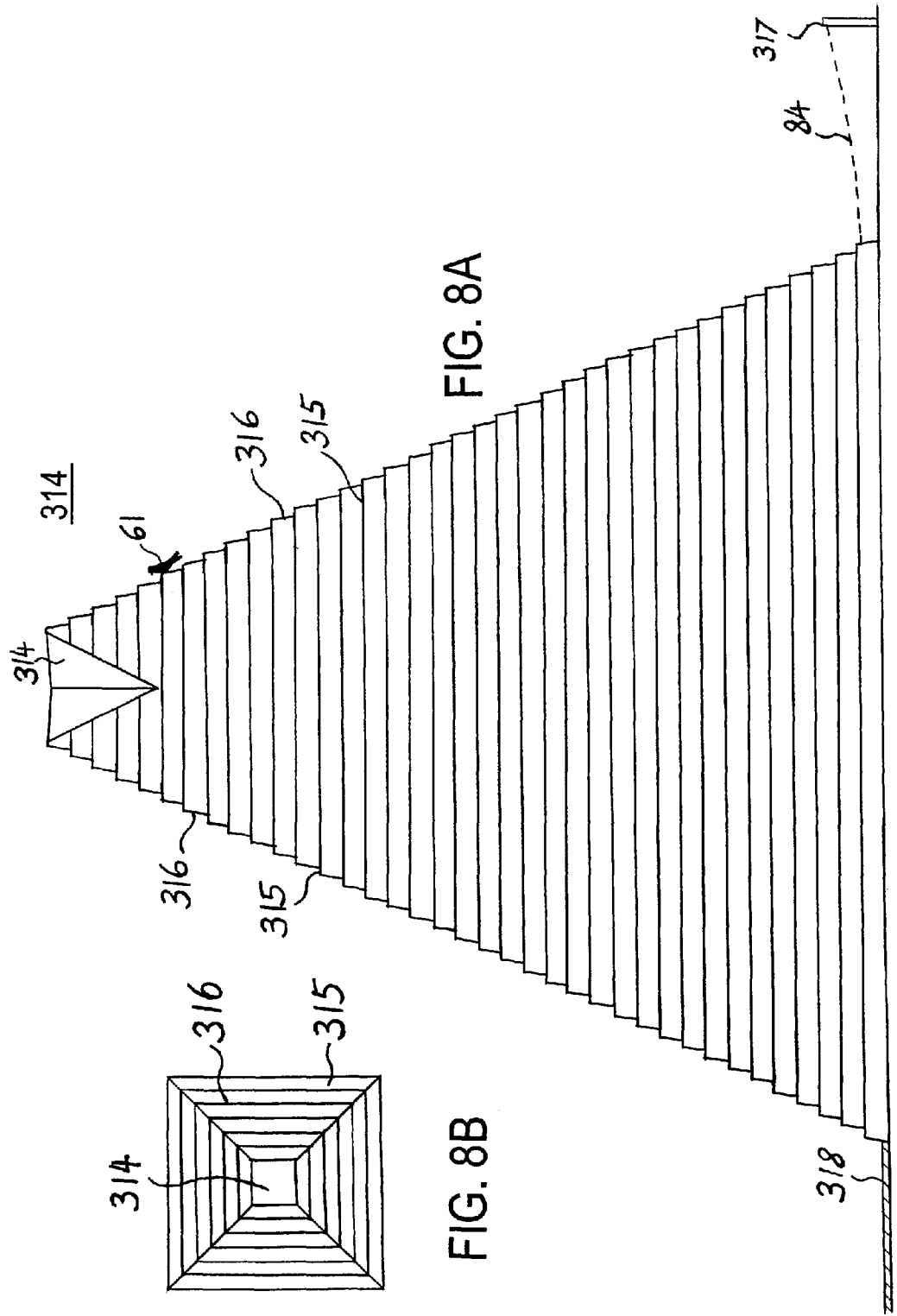

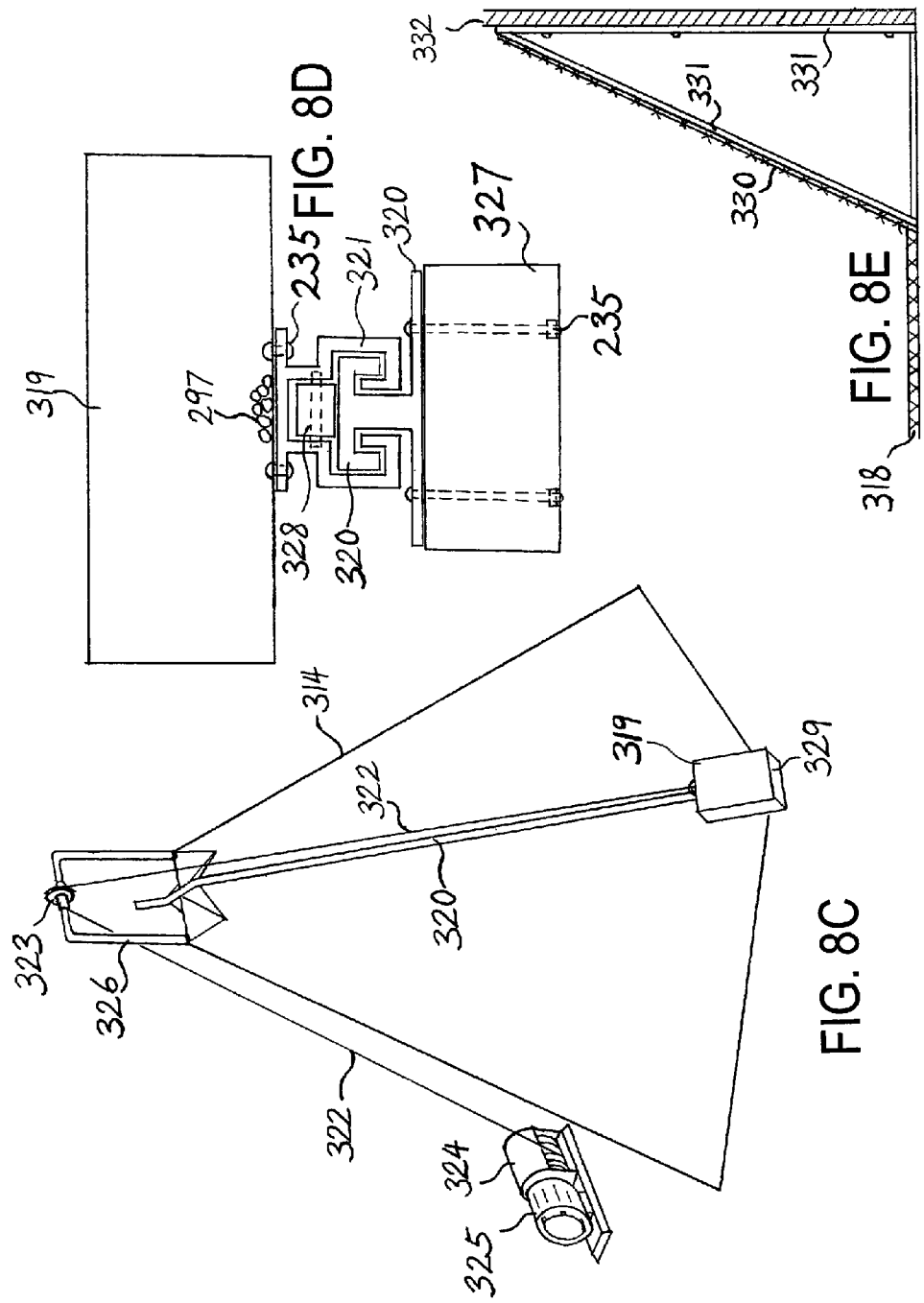

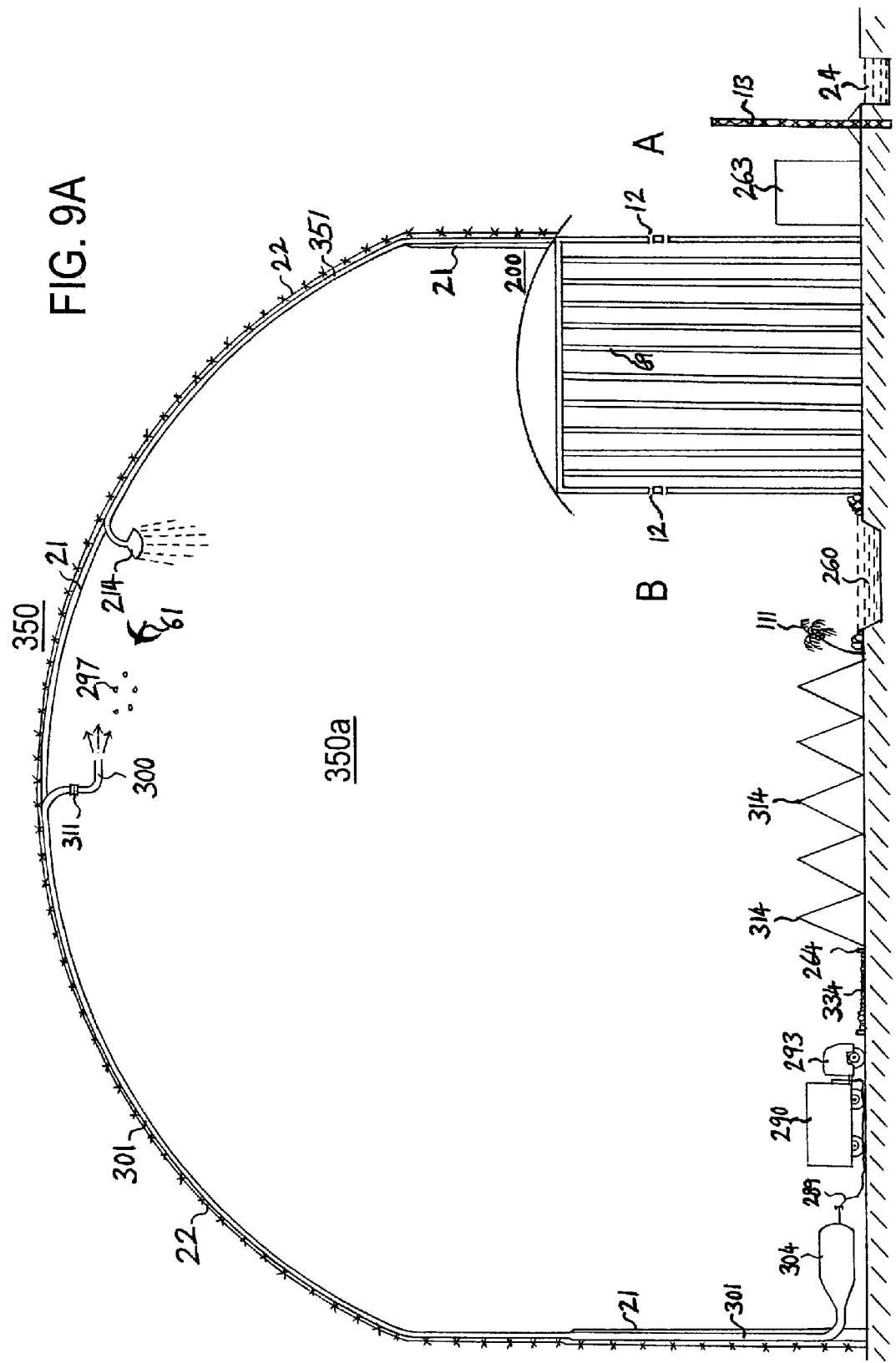

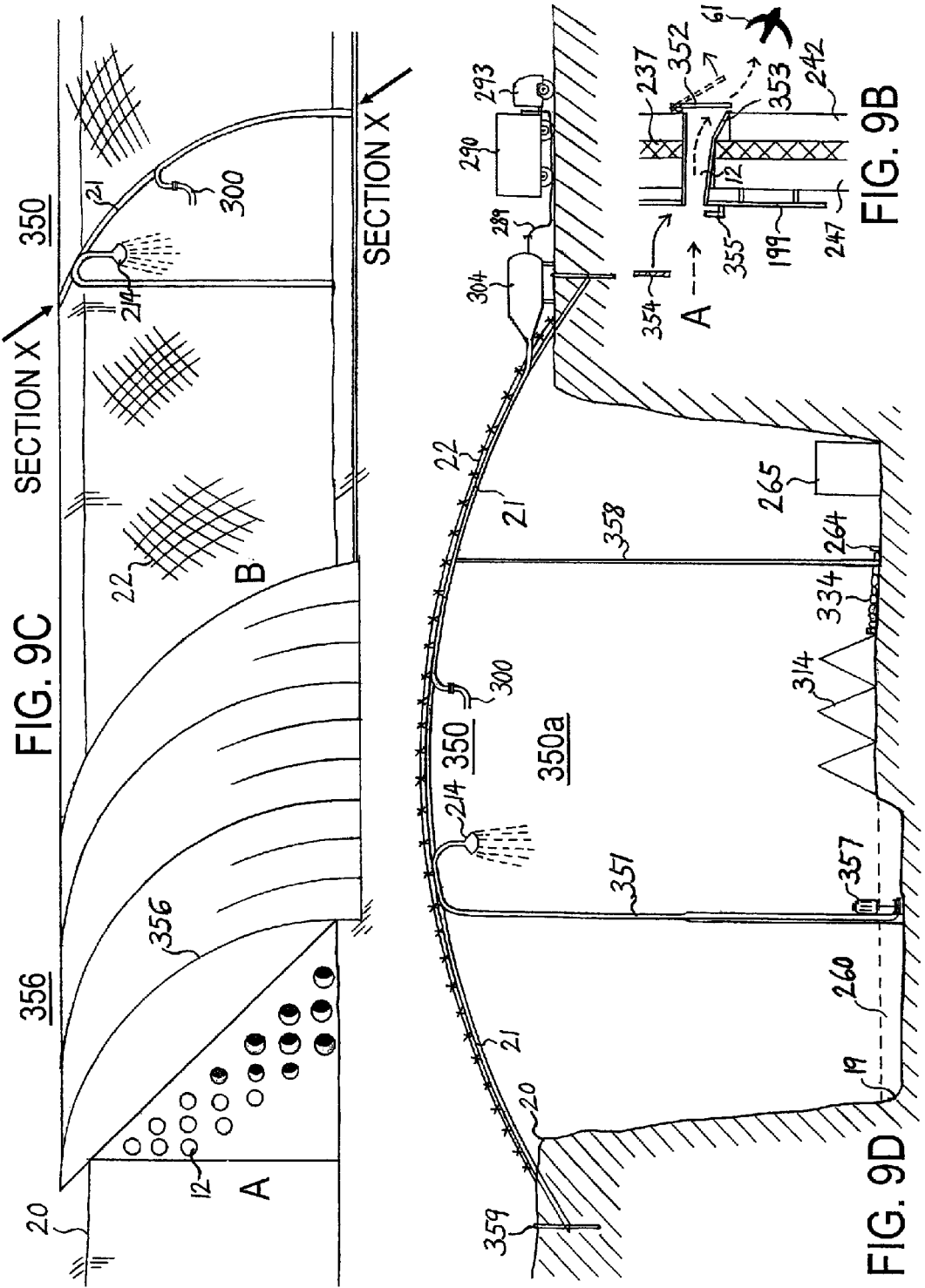

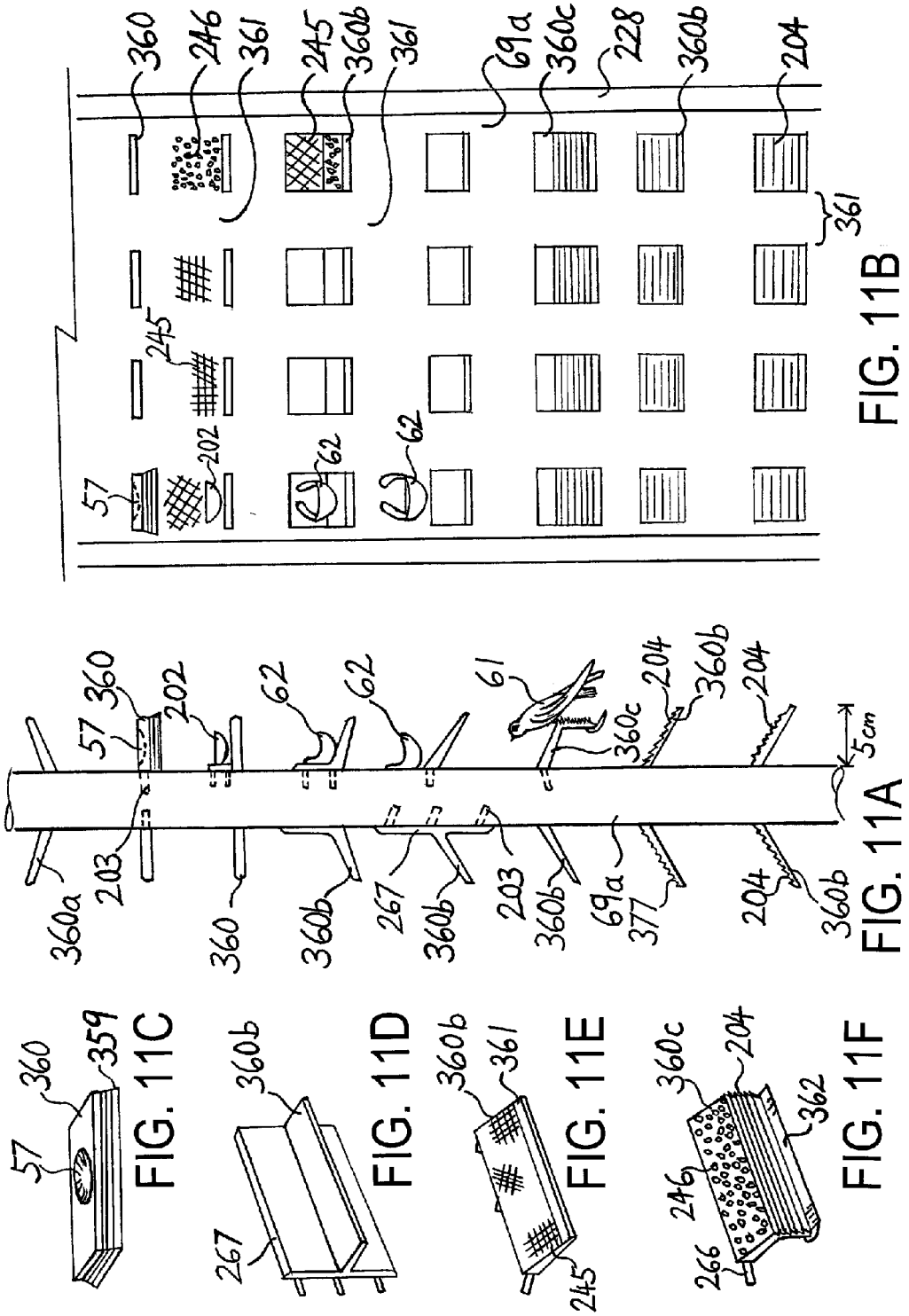

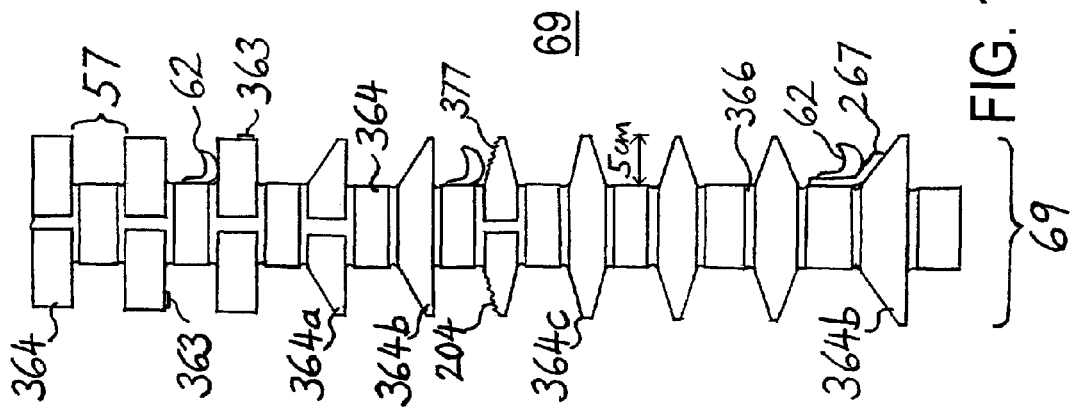
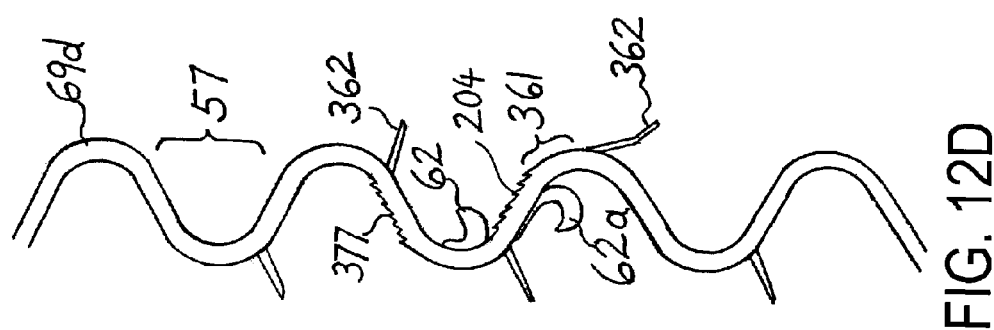
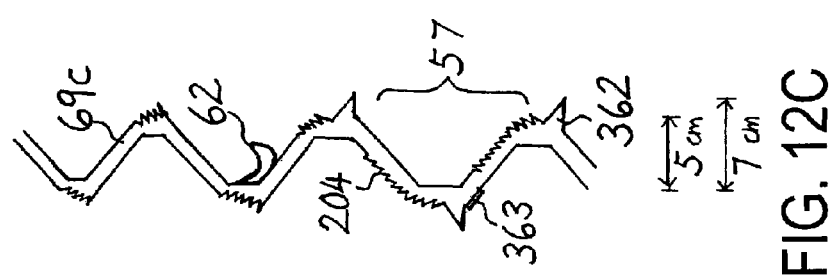
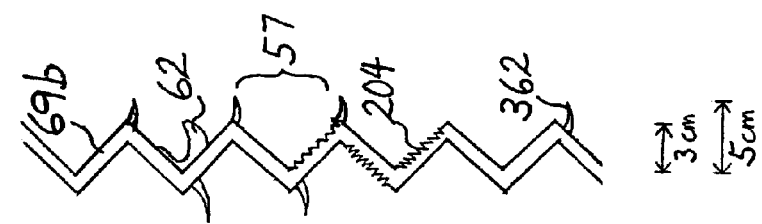
FIG. 12A
FIG. 12B
FIG. 12C
FIG. 12D

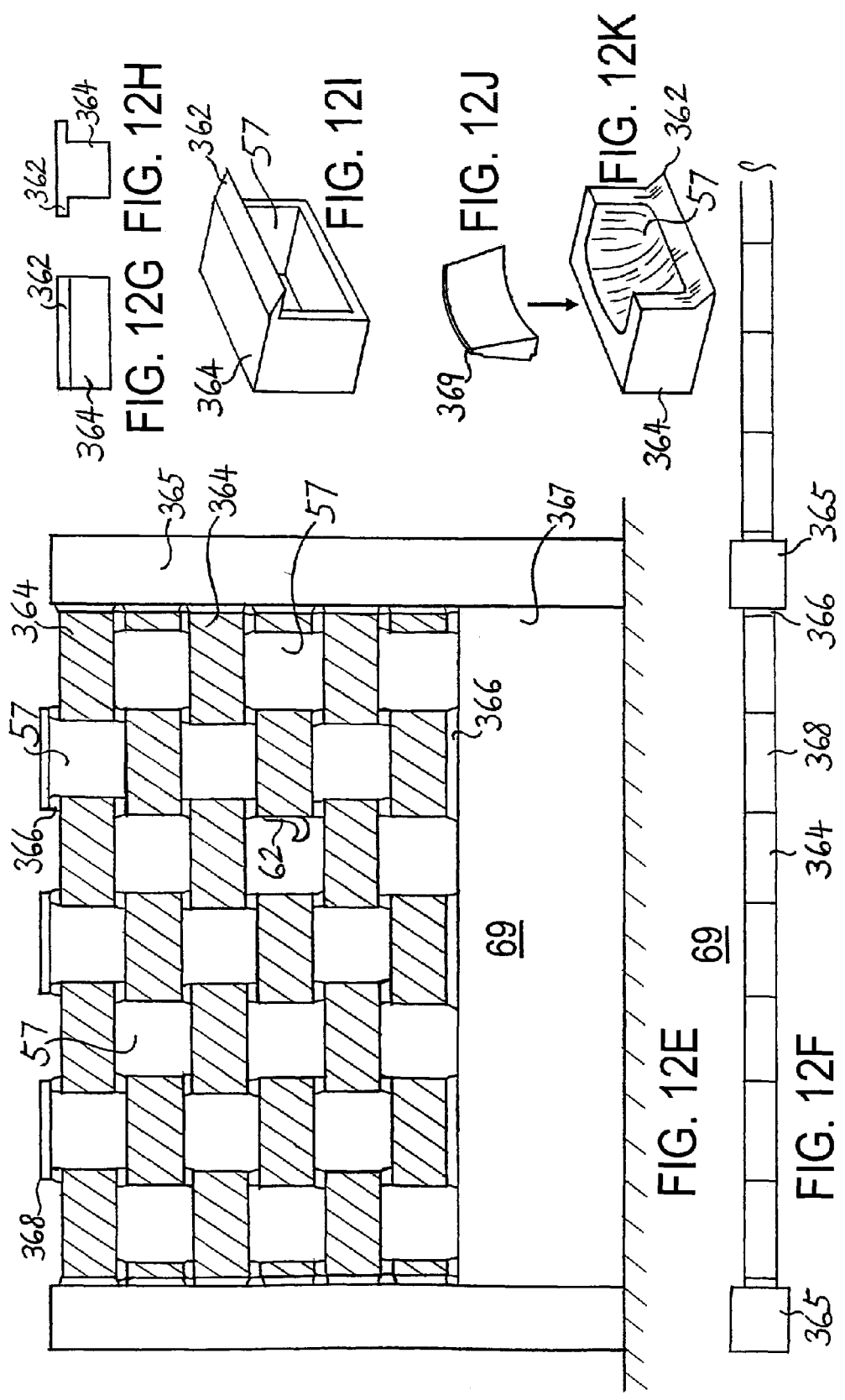

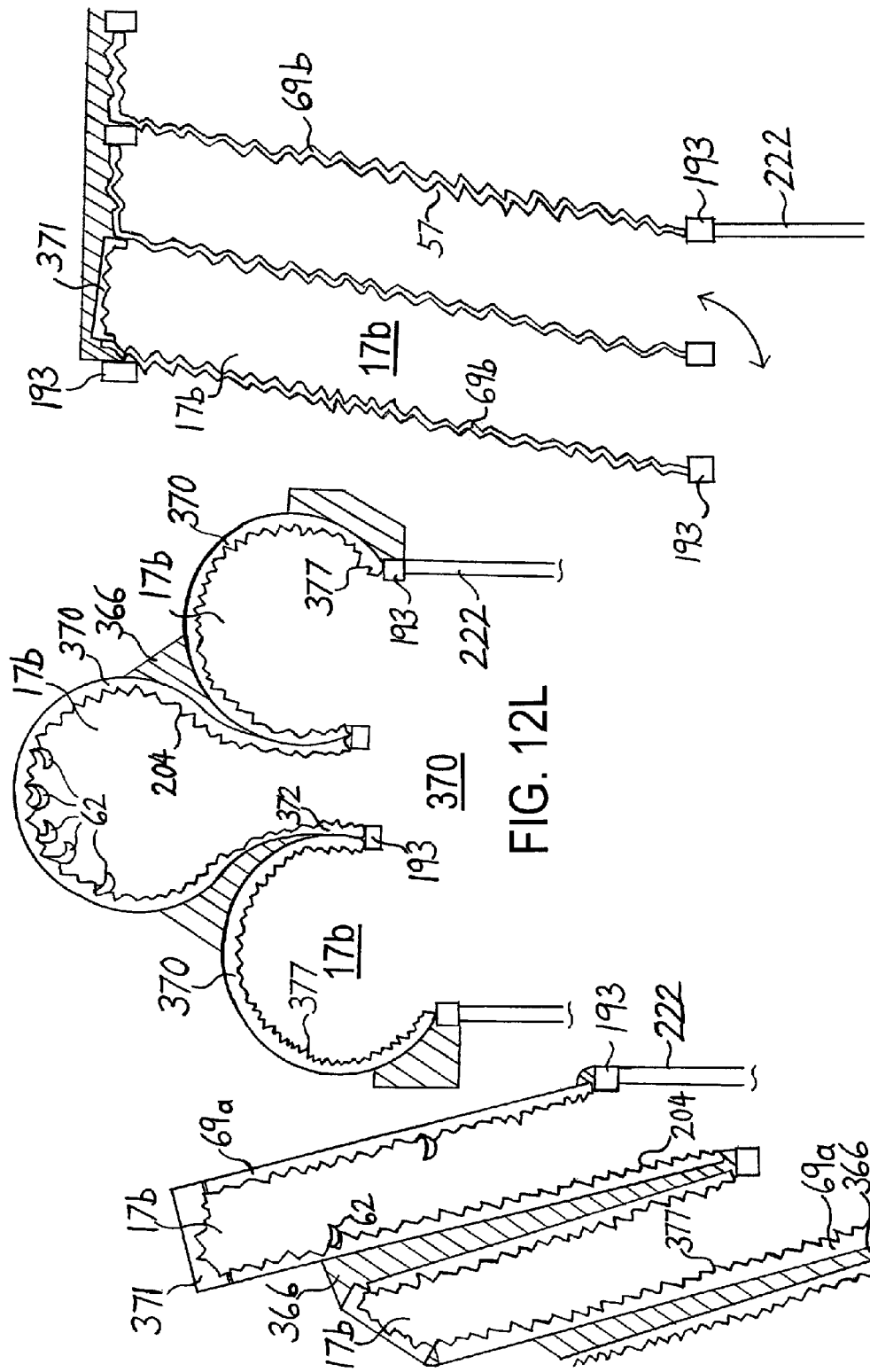

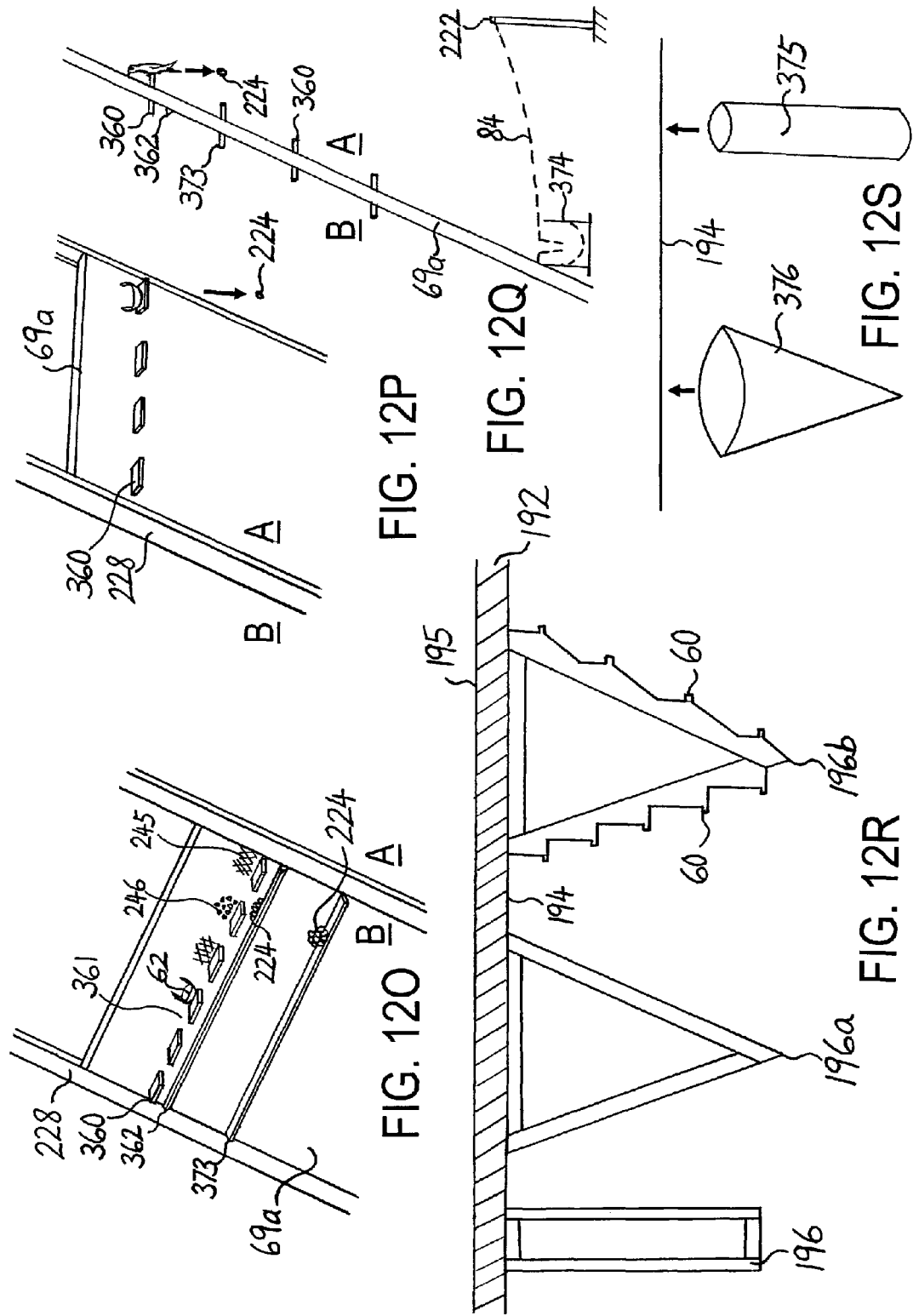

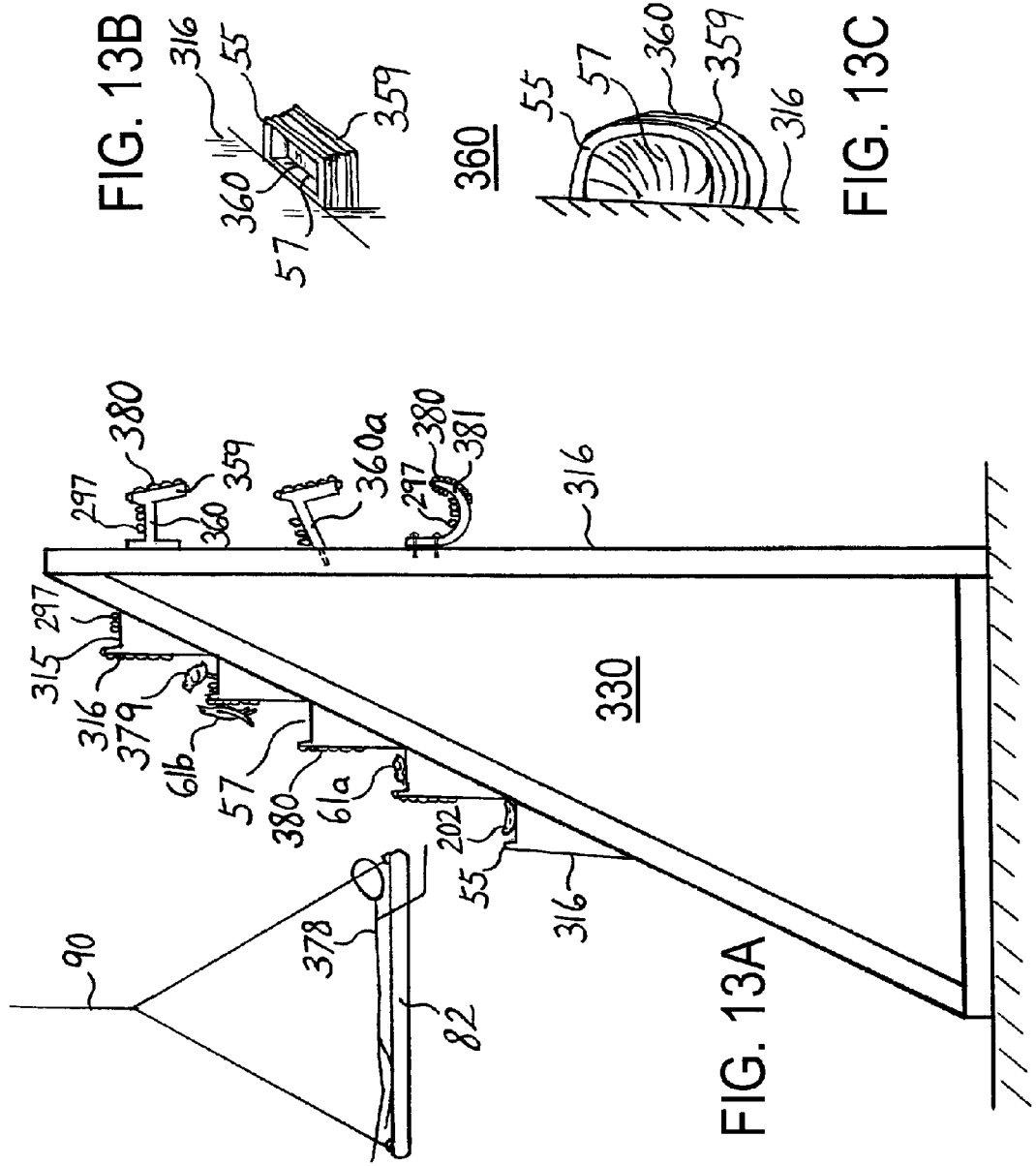

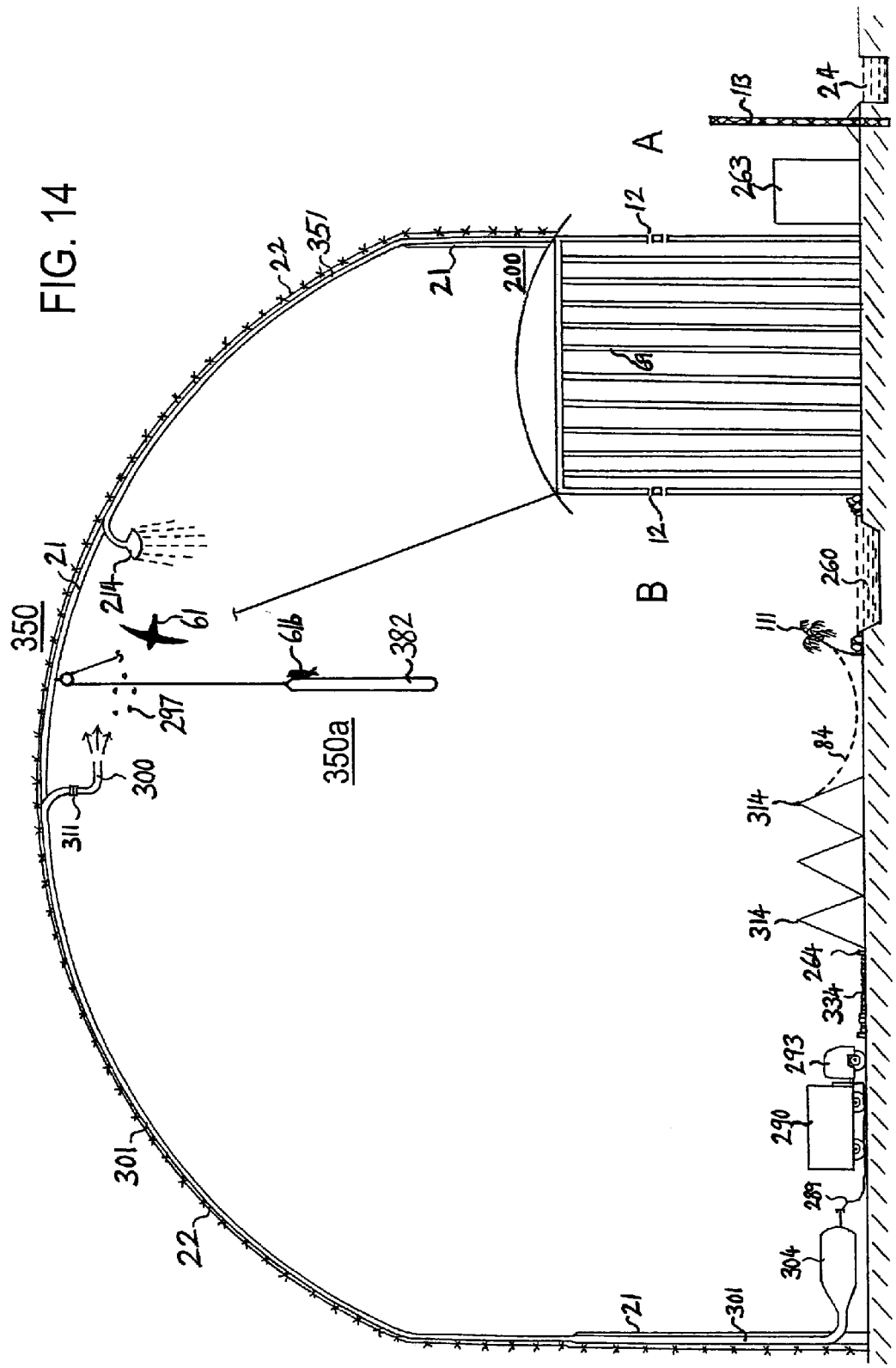

SWIFTLETS FARMING FOR PRODUCTION OF EDIBLE BIRD'S NESTS

This application is a continuation application of U.S. application Ser. No. 12/630,309 filed Dec. 3, 2009, now U.S. Pat. No. 8,205,577, which is a divisional application of U.S. application Ser. No. 11/949,695 filed on Dec. 3, 2007, now U.S. Pat. No. 8,210,126, which claims priority to Singapore Patent Application 200718112-6 filed Nov. 23, 2007 and Singapore Patent Application 200608249-9, filed Dec. 1, 2006.

FIELD OF THE INVENTIONS

The present invention relates to the breeding of swiftlets of the genus *Aerodramus* and/or *Collocalia* in an edible bird's nests production facility for producing large quantities of nests, provision of shelter, food, water, safety and security at a single point of communal congregation; pandering to satisfy the sensory perceptions, innate and instinctive preferences of swiftlets to attract and persuade them to colonize man made shelters. Such a facility being configured to breed swiftlets for their nests helps in conserving wild species of endangered swiftlets.

BACKGROUND OF THE INVENTIONS

The present method of obtaining edible bird's nest involves collecting and harvesting nests of wild swiftlets in their natural habitats such as mountain caves and limestone cliffs for consumption causing irreversible disruptions and damages to the dwindling populations of endemic wild swiftlets. Poachers have been known to raid established roosts of protected and endangered species of swiftlets in national parks and wildlife preserves at night to steal edible bird's nests. The saying, "early bird takes the worm" and "finders-keepers" epitomizes the mentality of poachers as in the wild the first to strike takes all, leaving nothing for late corners. Such that nest poachers indiscriminately destroys un-hatched eggs, killing swiftlets chicks too young to fly to safety, disrupting their reproductive life-cycle, threatening their very survival such that some species of swiftlets in South East Asia are fast approaching extinction. As with the rest of the global wildlife trade dealing in protected and endangered species of plants, animals and related wildlife products, the supply chain of the lucrative bird's nest trade is steeped in a traditional hierarchy of shadowy contacts cloaked in secrecy and black-market deals. Dealers are unable to proof the legality of their supply sources. Unscrupulous dealers have been known to pass off imitation products and fakes as genuine edible bird's nests. Some nest-processors employed harmful chemicals and detergents in the treatment of nests to improve the market value of the commodity to the detriment of consumers.

The birds called Cave Swiftlets or Swiftlets are contained within the four genera of *Aerodramus* (formerly *Collocalia*), *Hydrochous*, *Collocalia* and *Schoutedenapus*. They form the collocaliini tribe within the family Apodidae. Geographically the genus *Aerodramus* comprises around 30 species with a habitat range covering southern Asia, south pacific islands and north eastern Australia located within the tropical and sub-tropical regions. Edible bird's nests are derived from cave swiftlets of the genus *Aerodramus* and/or *Collocalia*. In particular four species comprising *A. unicolor*, *A. fuciphagus*, *A. maximus* and *A. germani* are the most prized. *A. unicolor* and *A. fuciphagus* (also known as *Collocalia fuciphaga*) produces high grade white nests while *A. maximus* (*C. maxima*) produces lower grade black nests containing more feathers, particles and other impurities.

Scientific classification of these avian species being:
Kingdom: Animalia
Phyllum: Chordata
Class: Aves
Order: Apodiformes
Family: Apodidae
Genus: *Aerodramus*
Species: *A. unicolor*, *A. fuciphagus*, *A. maximus* and *A. germani*
Binominal name: *Aerodramus unicolor*, *Aerodramus fuciphagus*, *Aerodramus maximus* and *Aerodramus germani*
Common name: Indian Swiftlet, Edible-nest Swiftlet, Black-nest Swiftlet and German's Swiftlet The Collacaliini tribe of swiftlets comprises the: Edible-nest Swiftlet (*Aerodramus fuciphagus*); Indian Swiftlet (*A. unicolor*); Black-nest Swiftlet (*A. maximus*); German's Swiftlet (*A. germani*); Waterfall Swift (*Hydrochous gigas*); Glossy Swiftlet (*Collocalia esculenta*); Cave Swiftlet (*C. linchi*); Pygmy Swiftlet (*C. troglodytes*); Seychelles Swiftlet (*A. elaphrus*); Mascarene Swiftlet (*A. francicus*); Philippine Swiftlet (*A. meamsi*); Moluccan Swiftlet (*A. infuscatus*); Mountain Swiftlet (*A. hirundinaceus*); White-rumped Swiftlet (*A. spodiopygius*); Australian Swiftlet (*A. terraereginae*); Himalayan Swiftlet (*A. brevirostris*); Indo-chinese Swiftlet (*A. rogersi*); Volcano Swiftlet (*A. vulcanorum*); Whitehead's Swiftlet (*A. whiteheadi*); Bare-legged Swiftlet (*A. nuditarsus*); Mayr's Swiftlet (*A. orientalis*); Palawan Swiftlet (*A. palawanensis*); Mossy-nest Swiftlet (*A. salangana*); Uniform Swiftlet (*A. vanikorensis*); Palau Swiftlet (*A. pelewensis*); Guam Swiftlet (*A. bartschi*); Caroline Islands Swiftlet (*A. inquietus*); Atiu Swiftlet (*A. sawtelli*); Polynesian Swiftlet (*A. leucophaeus*); Marquesan Swiftlet (*A. ocistus*); Papuan Swiftlet (*A. papuensis*); Scarce Swift (*Schoutednapus myoptilus*); Schouteden's Swift (*S. schoutendeni*).

Swiftlets lives in flocks along tropical coastal areas and are aerial insectivores. The average body length of a swiftlet is 9 centimeters, about half the size of a swallow. Swiftlets have a shorter and rectangular shaped tail while swallows has a longer forked tail. The *A. unicolor* measuring around 12 centimeters in length is mainly dark brown above and paler brown below. *A. fuciphagus* is smaller measuring 9 centimeters in length and weighs about 15 to 18 grams with a band of brownish gray feathers across the rump. *A. maximus* is larger with a wing-span of 13 centimeters and weighs 28 grams. Its lower legs have a row of small feathers.

Most swiftlets have a characteristic shape with a short tail and very long swept-back wings resembling a crescent or a boomerang for fast flight with a wide gape and small beak surrounded by bristles for catching insects in flight. The flight of some species is characterized by a distinctive "flicking" action. Swiftlets have sharp claws protruding forward for clinging securely onto vertical cliffs and roosts on vertical cliffs or walls of caves high above. Adult swiftlets would rest and sleep while perched vertically on cave walls, supporting their bodies with sharp claws. They have well developed salivary glands which are able to secrete large amounts of saliva which solidifies in contact with air, forming the main agent in the building of their nests. Swiftlets builds their nests three times a year, not for the purpose of habitation but to foster their young. Each nest is only used once and is abandoned once young swiftlets have learnt to fly. Nests are attached to the rocky walls of humid limestone caves hundreds of meters high making harvesting of nests an extremely risky profession. Many collectors were known to have fallen to their death from flimsily constructed climbing apparatus used for harvesting edible bird's nests.

Due to the inherent shortness of their legs swiftlets are not able to stand upright, perch horizontally on level surface, or take off from stationary positions by flapping their wings like other species of birds. They must perch vertically at height by gripping the sheer cliff or cave wall with sharp claws. To take off swiftlets releases their claw grips, drop from the vertical clinging-perching surface at height, spread their wings to glide before flying away. The lowest, minimum height that swiftlets will ever "land" or settle down to perch vertically is one meter above level surface. Anything lower and they will not be able to drop, glide and fly away safely. And if they ever land on level ground in the wild, they are as good as dead. Certain death awaits fallen and stranded swiftlets as they are attacked and devoured by cave creatures such as snakes, cockroaches, crickets, centipedes, crabs, ants, etc. or, other carnivorous creatures. Swiftlets only adapt horizontal positions during the nesting season: mating, eggs laying, incubating eggs, brooding and feeding young chicks; all at great heights.

The average life span of swiftlets is about 15 to 18 years. During the breeding season, all the species' salivary glands expand to produce the special sticky saliva for binding twigs and other detritus together for building the nest, in particular male swiftlets which uses thick saliva to construct the white shiny nest. The saliva is produced by a pair of lobed salivary glands beneath the tongue of parent birds. It is also called nest-cement. This glutinous nest-cement dries fast in contact with air. The nest is a shallow half-moon cup stuck to the vertical cave wall into which eggs are laid. *A. fuciphagus* and *A. unicolor* each lays a clutch of 2 eggs. The eggs are incubated for around 3 weeks before hatching. Young fledgling leaves the nest in 2 weeks but remains near it, clinging to the cavity for another 2 weeks without flying.

A pair of *A. maximus* takes an average of 30 days to lay one egg and 25 days to incubate the egg. The chicks needs at least 45 days to grow large enough to fly and takes 4 months for juvenile birds to mature. The breeding cycle of Black-nest swiftlets from its ability to fly to building its own nest is about one year. Residing mainly in the Niah Caves and Mulu Caves in Borneo, *A. maximus* has three breeding seasons in one year. Avian census by Banks in 1935 recorded 1.7 million nests in the Niah Caves compared to 65,000 nests in a DANIDA/SWMPI census in 2002, a decrease of 96%.

Swiftlets usually lays not more than two eggs each season. Generally, two collections are made. The first takes place early in the breeding season before the swiftlets lays their eggs. The birds then make another nest in which they finally lay their eggs. After the young have fledged, the second collection is made. Breeding seasons are particular to different species and the different caves in which the birds roost. At Gomantong Caves (Sabah, Malaysia), the two edible nests swiftlet species have different breeding times. For the black-nest swiftlet, the first collection should take place no later than April or May, otherwise the birds will not have time to build another nest. The second harvest then takes place in September and October. The more valuable white-nest swiftlets nests are initially collected in February, and again in June and July. The breeding patterns of the birds are not rigid and must be closely monitored to accommodate any observable changes in their reproductive behavior.

Quoting a paragraph from National Geographic, January 1990 entitled "Nests Gatherers of Tiger Caves:" "A leading authority on the history and chemistry of bird's nests, Yun-Cheung Kong, professor of biochemistry at the Chinese University of Hong Kong, believes that swiftlet's nests have been eaten in China for 1,500 years. According to Dr. Kong, the discovery of Tang-dynasty porcelain near Niah Cave in north-western Borneo suggests that importation of the delicacy goes back as far as A.D. 700. Early in the Ming dynasty (1368-1644) a eunuch named Cheng Ho made seven voyages through South East Asia in command of an imperial fleet. Among his instructions from the emperor were to note the diet and produce of these foreign parts. Cheng Ho's route touched all the major bird's nest producing sites of today, and it is possible he brought back samples to present to the imperial court. Some authorities credit Cheng Ho with introducing foreign nests into China, but no written record of this event has been discovered. Dr. Kong has found that the nests contain a water-soluble glyco-protein that promotes cell division within the immune system." Such substances may be used in the development of AIDS treatments as a way to promote cell division in the immune system.

Historically, ever since the voyages of Chinese Admiral Zheng He (Cheng Ho) to the "southern seas" (South China Sea) 700 years ago; and the establishment of barter trading of Ming Dynasty Chinese ceramics, porcelain wares, silk, exquisite handicrafts, etc. in exchange for tropical products such as edible bird's nests, spices, pepper, camphor, sandalwoods, rattan, belian (iron wood), etc., edible bird's nests from the island of Borneo (in particular the Niah Caves), have been closely associated with the imperial court, royalty and the Emperor of China. Consumption of edible bird's nests in China dates back 1,000 years ago and has been ingrained into the psyche of the orient as a special food fit for kings. Gifts and presents made of edible bird's nests in family gatherings to celebrate auspicious occasions and festive seasons have become a status symbol, a sign of respect for elders and a fashionable trend in Asia. Demand for this scarce commodity out-strips supply, which conversely, has been shrinking due to poaching, non-sustainable harvesting and destruction of wild habitats.

Scientifically and medicinally, demand for this commodity may be explained by the close relationship of edible bird's nests with the enzyme neuraminidase. In U.S. Pat. No. 4,071,408 Flashner et al teaches a method of extracting extra-cellular neuraminidase from a micro-organism *Arthobacter sialophilum* sp. nov. found in edible bird's nests, regurgitated by the swiftlets *Collocalia*. This enzyme is used for treatment or regression of solid tumors and is useful in immunological and birth control investigation and applications. In U.S. Pat. No. 5,034,516 and U.S. Pat. No. 5,192,661 Roy et al teaches a method of using antigens of sialic acid in detecting cancer. Sialic acids are derivatives of neuraminic acid which is in turn derived from edible nests. In U.S. Pat. No. 5,529,918 and U.S. Pat. No. 5,830,748 Rizza et al teaches a method for preparing neuraminidase. (Search term: *Collocalia*)

Swiftlets have been found to be attracted by bird calls to settle in human dwellings. Domestication, commercialized breeding, rearing and managed husbandry of swiftlets in a specially equipped highly productive swiftlets farm or edible nest production facility dedicated to producing edible bird's nest on a commercial scale will prevent extinction and enhance the survival of wild species of swiftlets by providing an alternative supply of farmed edible bird's nests in the market, reducing and stabilizing prices of the commodity and making illegal harvesting of wild nests unattractive to poachers.

The relatively tasteless nests are harvested and prepared for cuisine in soup mixed with chicken, spices, and other flavors as an oriental gastronomic delight with supposed aphrodisiac properties. Only a few species are suitable and it is those species whose nests are made purely or almost purely of saliva that are most prized and sought after, especially the genus *Aerodramus* and/or *Collocalia* (in particular the species *A. fuciphagus, A. unicolor, A. maximus* and *A. germani*). Desirable qualities of edible nests comprises: color, shape, shimmer or glint (buying); swell capacity, sponginess (preparation prior to cooking); aroma, texture, taste (eating); etc. are based on ingrained traditional beliefs, perceptions and oriental values inculcated from young handed over from generation to generation.

Quoting a report from The Sunday Tribune, India (Dec. 2, 2001) entitled "They are the Creatures of the Caves" the vagaries of the natural eco-system and the perils cave swiftlets faces daily are illustrated in vivid details: "Deep in the world's great cave systems, where light never penetrates, live a variety of animals to whom eyesight has become an irrelevance. These caves, over the eons, have been carved out by streams that wander through them. Water, too, ornamented the chambers inside these enormous caves. Charged with calcium as it seeped through roof over millennia, it created fantastically sculpted stalactites and stalagmites. Most of the larger animals, like cave racer snakes, that live in the dark environment of these underground galleries feed on cave swiftlets that nest and roost here by night and bats who come here for shelter during day.

Cave swiftlets are birds related to swifts, some of which are known for their great speed. Swiftlets are famous for their nest which they construct with their saliva. These nests are the main ingredient of birds' nest soup, a delicacy in some of the countries of the Far-east.

Journeys in and out of the caves are always fraught with dangers both for swiftlets and the bats. Cave racer snakes take full advantage of rushing in and out by these flying creatures. Waiting on the cave walls, these reptiles are ever ready to pluck a flying-meal from mid-air.

Fully equipped to navigate in pitch darkness, these snakes follow well-worn, rippled ribbons of polished bat-guano (bat excrement) into the deep recesses of the caves, and can climb the walls to reach bird nests, where they prey upon eggs and chicks too. More unexpectedly, they coil around stalactites, stalagmites and rocky projections at narrow points in the cave passages, places where traffic flow is restricted and flying animals must slow their flight. The snakes hang out into the void with mouths agape and snatch at anything that comes close. It is thought that air-pressure waves from the flapping wings are detected by the snakes, although the snakes have also been heard to make mewing sounds—an unusual thing for a snake to do—which might have something to do with echolocation, a common way in which cave animals find prey.

The caves are also home to hunting spiders, which, like many other troglodytes, are blind. They run about with their first pair of legs, which are covered with sensory hairs, held out in front like antennae. With these, they can detect the movements of the smaller cave crickets.

The cave crickets themselves grow to monstrous proportions, and one of the most spectacular predators is a giant with huge legs and muscular jaws that can tear a cave swiftlet chick apart, even in the nest high above the cave floor. One specimen has been seen to take a swiftlet egg in its jaws and smash it against the rock and eat it.

In the cave streams that gouge rills and ridges between the bat dung, cave crabs and giant toads battle for injured fledglings. Two crabs might tear a chick in half. A related species, deep in the caves, has lost all pigment, has reduced eyes and possesses long legs with which it can crawl about the caves like an amphibious spider. Long-legged centipedes, multi-legged cave earwigs and shimmering golden cockroaches complete the horrible picture.

Outside, the entrances of the caves are patrolled by bat hawks, dark peregrine-sized raptors that take advantage of the comings and goings at dawn and dusk. They, too, wait and watch, placing themselves at a point of plenty, ready to take advantage of the superabundance of prey. At dawn, the swiftlets leave en masse to feed by day and the bats return to roost. At dusk, it is the reverse, and the bat hawks are ready to pounce. They swoop in at an angle across the cave mouth and tear through the emerging and returning flocks. Every morning and evening there is a pandemonium as bats and swifts, both pursued by hawks, change shifts. At twilight, the bats stream out and the swiftlets, diving a spiral from a great height to avoid the waiting predators, fly in. (Note: such aerial phenomena may be witnessed in the national parks of Borneo such as Mulu, Niah and Gomantong Caves)

If it were not for the bats and the birds, this remarkable community would not exist. They collect from the surrounding forest and provide enough food to support a cave floor fauna that is most likely larger than that on the floor of the forest itself." Unquote.

The above narrative feature best describes the vagaries of the natural eco-system and the mortal predatory threats that swiftlets faces in their natural cave habitats, fraught with numerous dangers and hazards; thus the extremely high mortality rate in particular chicks, fledglings and year-old swiftlets. In addition to natural predation, the greatest threat may be posed by disruptions to the breeding cycle due to the indiscriminate activities of humans including edible nests poachers.

Quoting a photo-caption from page 130 of the National Geographic, entitled "Nests Gatherers of Tiger Caves": "Suspected thieves at Phi Phi Island, attracted by big profits on the black market for the nests, face six months to a year in jail if convicted. Swiftlet chicks tossed on to a beach in Satun Province may be the victims of such greed." One picture showed 3 alleged poachers chained together. Another photograph depicted dead chicks and broken egg shells. Quoting a paragraph from page 133: "In a nearby province men working for another employer refused to enter a cave after a climber had fallen to his death, for fear of meeting the dead nest gatherer's ghost. This gave the swiftlets time to lay their eggs, and when the gatherers did return, they spilled the eggs and young birds in order to take the nests. I saw hundreds of newly hatched swiftlets dying on the cave floor, among broken eggs, with cockroaches moving in for the feast."

Quoting another report from National Geographic.com (Aug. 22, 2002) by a group of birders cum nature conservationists monitoring Indian swiftlets at Vengurla Rocks, located in the Arabian Sea; seven miles offshore Maharashtra State, India entitled "Taste for Swiftlet's Edible Nest is Lowering Its Numbers": "Poachers no longer wait for the chicks to fledge before collecting the nests, which has dramatically decreased the swiftlets' population. Naturalists are concerned that this species may become extinct in five to ten years if the current rates of exploitation are not checked.

As they walked toward the caves, they saw a large number of swiftlets sweeping through the sky above them. On reaching the top of a cliff, they saw birds disappearing into the ground. Closer investigation revealed an opening to a large cave. Inside the dimly lit cavern they were amazed to see bamboo scaffolding built along its wall, a sign that poachers have discovered this remote haven.

When he reached the entrance, he saw thousands of edible-nest swiftlets nesting in the cave's dark recesses. Nests were constructed from about three feet from the ground all the way to the roof. The nest density varied from 20 per square yard to 40 per square yard, resulting in a conservative estimate of 3,000 nests. All the nests were attended by swiftlets that frequently entered and exited the cave, navigating by echolocation and occasionally dashing against the birders. The nests were pearly white, shiny, sticky, and spongy. From the near-complete state of the nests, the birders concluded that eggs would be laid in just a few days. As the birders made their way back to Niwati-Medha for the night, they were extremely concerned about nest poaching and the destruction of eggs and chicks."

As a result of concerted actions by conservationists and local villagers; poachers and middle-men were apprehended, poached edible nests confiscated; the nexus of the illegal wildlife trade stopped; Vengula Rocks was declared a protected area and the family to which the edible nest swiftlets belongs to, Apodidae, was declared protected by the Indian government. (Source: National Geographic.com; Aug. 22, 2002.)

Such are the vagaries of nature and dangers posed by human activities; in comparison with a farmed environment where the security and safety of swiftlets shelters are ensured; breeding habitats devoid of predatory enemies and human threats; and a plentiful supply of food and water are provided in exchange for their abandoned nests. To this end the swiftlets farm 113, 23 and swiftlets shelters 11, 14, 100, 200 and 365 of present invention provides a safe haven and wildlife sanctuary including ample food and water where the swiftlets, their edible nests, eggs and chicks may be protected by armed Gurkha guards and safe from poachers, thieves, nest robbers and unwanted intruders. A paradise! Captive breeding programs for animals including birds and fish have brought back many species from the brink of extinction and restored wild populations. Such a program may be used to establish a colony of swiftlets in a newly constructed production facility, or a new extension of an existing production facility, or to restore wild populations.

All swiftlets were previously classified together under *Collocalia* spp., however, those capable of echolocation were later separately reclassified under *Aerodramus* spp. Swiftlets of the *Collocalia* spp. are not capable of echolocation. Edible nests swiftlets comprising the species of *Aerodramus fuciphagus* are sub-divided into six sub-species: *A. f. fuciphagus; A. f. inexpectatus; A. f. dammermani; A. f. micans; A. f. vestitus* and *A. f. perplexus*. *Aerodramus fuciphagus* is also known by the synonym *Collocalia fuciphaga*. The geographical distribution of these sub-species in South East Asia is as listed below:

*A. f. fuciphagus*: Java, Bali and the western Lesser Sunda Islands.
*A. f. inexpectatus*: Andaman and Nicobar Islands, vagrant to Burma.
*A. f. dammermani*: Flores, known from only a single specimen
*A. f. micans*: eastern Lesser Sunda (Sumba, Savu and Timor)
*A. f. vestitus*: Sumatra and Borneo, sometimes considered to be a separate species, brown-rumped swiftlets, *Aerodramus vestitus*/or *Collocalia vestita*.
*A. f. perplexus*: Maratua Archipelago off eastern Borneo
Germain's Swiftlets (*Aerodramus germani*) with two sub-species *A. g. germani* and *A. g. amerchanus*, were included with the edible-nest-swiftlets previously, but are now often considered to be a separate species. Also known as German's Swiftlets, they occur in the Malay Peninsula, central Thailand, coastal Vietnam and Cambodia, Hainan, northern Borneo and parts of the Philippines.

In general, swiftlets measures 11 to 12 cm long and weigh 15 to 18 grams. The plumage is blackish-brown above, paler on the under-parts. The rump is slightly paler than the rest of the upper-parts. The tail is slightly forked and the wings are long and narrow. The bill and feet are black. The subspecies *A. f. micans* is paler and greyer while *A. f. vestitus* is darker with a rump that is less obviously paler. The bracket-shaped nest is white, translucent and is made of layers of hardened saliva attached to the cave rock. It measures about 6 cm across with a depth of 1.5 cm and a weight of about 14 grams. Two white, oval, non-glossy eggs are laid.

Swiftlets chicks are born blind, featherless and remain so for up to 20 days. The young begin eating solid insect bolus feed at 7-9 days old, and drinking at 10 days old. Nesting occurs for 5 weeks. During this time the chicks are fed every 30 minutes with about 1.7 g of insect bolus from both the parents and fledging occurs at 3 months old. Fostering meal formula for orphaned chicks may comprise a mixture of mashed milk, dry biscuits (Marie) and hard boiled eggs. These are fed every 3 hours together with 1-4 mm of water mixed with glucose, vitamins and minerals. (Source: Department of Veterinary Services, Ministry of Agriculture, Malaysia)

The majority of bird species on earth such as chicken, ducks, etc. and other farmed poultry stand upright while foraging, feeding, walking, running, makes their nests and breed on horizontal surfaces on level ground, floors of shelters or level surfaces of structures. However, birds of the avian species comprising swifts and swiftlets lack such a universal ability to stand upright, and are incapable of self-propelled movement across level ground or horizontal surfaces. They attach themselves high up on sheer cliffs and vertical walls of caves to roost. Swiftlets cling to the uneven, jagged, pitted, craggy, pock-marked, calloused and roughened surfaces of vertical walls high up, seeking out small ledges, concave faces, crevices, cavities, hollows, concavities; protrusions, indentations, extensions sticking out from the cave walls; upon which to anchor their body and their nests firmly and securely.

They have adapted themselves well to a life of living in the vertical dimension and the overhead dimension; clinging vertically onto the high walls to rest, sleep and breed. Attaching their nests securely to and bringing up their young high up on the vertical caves walls and nesting panels 69; including from overhead cave ceiling, stalactites, ceiling beams 193 and overhead nesting panels 196 of the shelter; even building into a concavity, dome shaped chamber in the overhead ceiling—at times, clinging and dangling with their bodies hanging upside down. In fact, anywhere, on any calloused vertical or overhead substrate on which they can get a firm foothold/or claw grips. This is an ecological niche, a realm that swifts and swiftlets have evolved to occupy over the eons. Chicken, ducks and farmed poultry live and breed in the horizontal dimension, on the floor or a large area of flat level surfaces. Like the majority of terrestrial animals on earth, their living space is in the horizontal dimension; capable of standing upright and propelling themselves across the relatively flat areas they occupy. Unlike small light-weight swiftlets, they are not capable of and do not live or breed from the vertical walls/or hanging upside down from the overhead ceilings.

SUMMARY

To this end the present invention provides a method to breed and domesticate swiftlets in an edible bird's nest farm and production facility comprising of: a dedicated swiftlets housing structure 200, wholly man made artificial caves system 100 and/or converted natural relief such as caves, valleys, cliffs forming the nesting habitat and artificial eco-system 356; and associated supporting sub-facilities; methods, systems, specialized techniques, equipment and apparatus. A dedicated facility specially configured for the commercial production of edible bird's nest including persuasive inducement of providing shelter, food and water for wild swiftlets; obtaining fertilized eggs for captive breeding, hatching, caring for the hatchlings and young chicks, rearing, developing familiarity and bonding of the hatchlings with human handlers; and transmigration of young chicks from swiftlets shelters 11 and 14 to large commercial production facilities 100, 200 and 356. Provision of the five basic necessities of live comprising shelter, food, water, safety and security at one singular gathering point is an extremely convenient and user-friendly feature of present invention which is beneficial to swiftlets conservation. A life of comfort and luxury provided and accorded in exchange for their abandoned nest.

The habitat 17 including swiftlets-housing structure 200 comprises the main facility in the farm 23 or 113 while other related sub-facilities includes large scale insects breeding and production apparatus 263, 265 for providing bird feed; wherein cockroaches, grasshoppers, crickets, dung beetles, etc. may be bred; free flying wild insects may be bred in open breeding grounds 264 for providing bird feed; food bolus making apparatus 270; replica nests cups 202; mannequin swiftlets. An aerial feed dispensing apparatus 300 may be used to provide "live airborne bird feed" comprising insects 297 and worms 128 bred at the swiftlets farm; mechanized aerial self-dispensing feed cage apparatus 350; a vertically inclined cradle-perching apparatus 330 for manual hand feeding of young chicks cum flight training in greenhouse 33; and a vertically inclined feeder 314 for vertical perching and peck-feeding, a capability and luxury enabled by means of present invention which swiftlets have never enjoyed previously, ever since the dawn of history. An apparatus to overcome inherent evolutionary limitations, deficiencies and shortcomings with which swiftlets have adapted to over the eons, living with, and having to bear such disadvantages as compared to other species of birds.

In an extension of the captive breeding program, nestlings two to four weeks old (before fledging) may be obtained from semi-domesticated swiftlets residing in abandoned buildings 14 and vacant human dwellings 11. The hatchlings may be manually collected from such shelters for transfer and transmigration to another location such as breeding cum production facility 200 or new extensions of the present facility 11, 14, caves system 100 or transformed natural relief 356 to initiate the breeding of new colonies of swiftlets. Apparatus 314, 330 and greenhouse 33 may be built inside cave chamber 259 to bring up the chicks such that juvenile swiftlets fledges from the new production facilities.

The present invention also includes a method of providing a manipulated breeding environment conducive to the birds, such as the replication and re-creation of a natural cave's micro-habitat environment with a temperature of 26 to 28 degrees C., relative humidity of 75 to 90% and stygian darkness; including attractions of wild swiftlets by means of acoustic, audio-visual broadcasts, and live demonstrative display by robotic swiftlets; special training techniques such as pre-mediated conditioning and acclimatization of nestlings to its nesting colony, bonding with its brood and avian community creating a conscious and sub-conscious feeling of belonging to its "home-ground" and habitat. Such that even after it has grown up, and may be allowed to fly free to forage for natural foods, the homing instincts of these domesticated swiftlets urges them to return daily to roost at its breeding ground, congregate and interact in an avian colony which it recognizes as its own, a "home-ground," sanctuary and safe haven to which it belongs where shelter, food, water, safety and security is provided round the clock. Such that when the nesting season approach, this innate sense of belonging and pre-mediated conditioning ingrained into the conscious and sub-conscious mind urges nesting swiftlets to return home to its colony and birth-place to roost, congregate, mate, build new nests, lay eggs, brood, hatch and rear the next generation of young.

An object of the present invention is to provide a method and system including facilities, apparatus and techniques for the large scale domestication, breeding and rearing of swiftlets for their nests, commercial production techniques, managed sustainable harvesting of nests by way of electronic identification, tracking and monitoring to avoid disruptive repeated collection, and safe collection of edible bird's nests to satisfy the appetite of connoisseurs and to meet market demand without harming wildlife. A scientific method of farming including the provision of apparatus and techniques beneficial to avian husbandry and the conservation of wild swiftlets capable of producing edible bird's nests. Scarcity of supply relative to global demand serves to artificially inflate the high prices of this "delicacy." It is a fact that edible bird's nests comprises a delicacy, a culinary and gastronomic delights of the Orient; and an essential ingredient in Asian "traditional medicine" practices; a tonic and an invigorating health food for the rich and affluent to pep up their energy levels.

Research shows that every 100 g of dry nest contains 49.9 g of water-soluble (including amido nitrogen, monoamine nitrogen, non-amino nitrogen, arginine, humin, histidine, lysine and cysteine), 30.6 g carbohydrate (glycoprotein and mucin), 4.9 g iron, 2.5 g inorganic salt (including potassium, sodium, calcium, magnesium, sulfur, phosphorus, silica and other trace elements), and 1.4 g fiber (Dictionary of Traditional Chinese Medicine, The History of Chinese Medicine and the Nutrition Table). The energy contained in 100 g of swiftlet nest is 345 kcal.

The methods as disclosed may create a new niche industry in animal husbandry for large volume production of edible bird's nests in commercial farms comprising man-made swiftlets-shelters such as specialized production facilities 100, 200 and transformed natural relief 356, thus providing the traditional edible bird's nest industry steeped in the harvesting of wild nests with an alternative supply of commercially farmed edible bird's nests. This includes a cleaner, healthier and high quality source of health food product produced in a controlled environment by means of modern scientific farming techniques. Commercial farming possess advantages such as economics of scale, high productivity, quality and efficiency; safe breeding environment for swiftlets free from predators and enemies, safe and easy harvesting of edible bird's nests; provision of shelter, food and water including specialized apparatus, equipment, facilities and techniques designed, configured and tailor made for the edible bird's nest production facilities 100, 200 and 356; quarantine capability, modern management techniques, deployment of professional expertise such as veterinarians and ornithologists, avian medications, vaccination against disease and sickness, etc. in favorable conditions that only a farm environment can provide. Such advantages may be used to maximize the swiftlets population by minimizing mortality rates, thus increasing productivity and efficiency of the farm 113 and 23. Farmed edible bird's nest provides connoisseurs with a choice of consuming such nests with a clear conscience, secure in the knowledge that they have not harmed wild-life. But have in fact, helped in the conservation of wild species of swiftlets by making a conscious personal choice in choosing farmed products, in preference, over wild life related products of questionable origin.

Included in the swiftlets breeding and edible bird's nests production facility of present invention are specialized equipment such as predator traps; arrangement to exclude or keep out predators from the nesting habitat; commercial breeding and production facilities for insect grubs; extensive cultivation of cover plants enveloping the man made structures and nesting habitat in greenery forming ecologically and environmentally friendly swiftlets eco-farms; a grid of criss-crossing overhead nesting panels and boards hanging down from the ceiling specifically designed for swiftlets to perch vertically and to build nests during the breeding season. Such a structural configuration and design layout provides for ease of collecting and harvesting edible bird's nests produced safely; designs incorporating safety features into the constructions, apparatus and safety devices such as self-dispensing cage structure 350, vertical perch feeder 314, to minimize fledgling mortality rates; pest control measures including use of soda ash to soak, desiccate and kill fleas, ticks and lice; and cleaning of nesting panels 69 and boards 196 with high pressure water jets.

Achievement of the desired micro-habitat environ/or parameters comprising a temperature of 26 to 28 deg. C., relative humidity of 75 to 90% and darkness may be enabled by means of novel structural arrangements, configuration, fundamental concepts and innovative engineering designs. New conceptual designs should be used to address and to achieve the ultimate objective of providing a swiftlets shelter with a compatible micro-habitat environment. Note the use of additional auxiliary equipment to achieve removal of micro-habitat limitations created by short comings in design configuration, even though such additional equipment may be used to complement design strategy and to overcome limitations and shortcomings in structural configurations, as they impose additional overhead, recurring, and maintenance costs. As increased production costs reduce cost-efficiency ratio and profitability of farm 113 and 23.

The present invention is conducive to the conservation and beneficial to the preservation of endangered species of swiftlets, to bring them back from the brink of extinction and eventual removal from the list of endangered species. The production facility, methods, systems, apparatus and techniques as disclosed may be used to make available a constant supply of cheap and affordable swiftlets edible nests for consumers, so that edible bird's nest may no longer remain as a rare commodity affordable to the rich and affluent but commonly available for all connoisseurs. Additional features of present inventions shall be described herein.

BRIEF DESCRIPTION OF THE DRAWINGS

Preferred embodiments of the present invention will now be described with reference to the accompanying drawings wherein:—

FIG. 1C shows the criss-crossing lattice work structure of the overhead nesting boards hanging down from the ceiling to provide perching and nesting surfaces for swiftlets in swiftlets shelter 14.

FIG. 1D shows the use of floor beams as a substrate for nest building by swiftlets in swiftlets shelter 11.

FIG. 3A shows the multi-layered insulation and roofing structure to keep shelter 200 cool.

FIG. 3B shows details of the structure of wall 191.

FIG. 3C shows an alternative arrangement of FIG. 3B.

FIG. 3D shows an alternative embodiment of FIG. 3C.

FIG. 3E shows the roughened surface of brick 242 which may be serrated, scratched and clawed to give various patterns.

FIG. 3F shows a hollow brick 242 used for construction.

FIG. 3G shows an alternative embodiment of FIG. 3D.

FIG. 3H shows the side-view of external tile 247.

FIG. 3I shows the side-view of a humidifier fan with fogging nozzles mounted on the frontal fan guards. FIG. 3J shows the front view of FIG. 3I.

FIG. 5A to FIG. 5D shows various view of a nest cup 202 with attachment legs.

FIG. 5E and FIG. 5F shows a method of attaching nest cups to a vertical surface with slip-on clips.

FIG. 5G shows the side view of a nest cup 202 with vertical front perching surfaces and extended back rest.

FIG. 5H shows a mechanized food bolus making apparatus.

FIG. 5I and FIG. 5J shows the rotational lid apparatus to produce round food bolus.

FIG. 6A shows a cockroach breeding apparatus 263 and a method of collecting insect using vacuuming and compressed air apparatus into a containerized vessel.

FIG. 6B shows details of a breeding compartment comprising of a multitude of honey-combed micro-cells.

FIG. 6C shows a network of air inlet piping to channel compressed air into the micro-cells to flush out cockroaches.

FIG. 6D shows the outlet side cum collection plate to channel harvested insects into a containerized vessel.

FIG. 6E shows a dual layered strainer-filter mechanism to separate feed materials from breeding adults and juveniles.

FIG. 8A shows a vertical perching feeder for stationary peck-feeding by swiftlets. FIG. 8B shows the plan view of FIG. 8A.

FIG. 8C shows a mechanized pulley cum sliding-rail apparatus to move the feed container up the vertically inclined perching feeder.

FIG. 8D shows details of the sliding-rail apparatus for mounting the feed container on the sliding rail.

FIG. 8E shows a vertically inclined cradle cum perching apparatus for swiftlets chicks.

FIG. 9A shows a self-dispensing cage structure designed to protect young swiftlets from aerial predators and an arrangement for optional confinement during an outbreak of avian diseases.

FIG. 9B shows a modified access way 12 with an inward opening flapper trap-door and a manual barring mechanism.

FIG. 9C shows a transformed natural relief comprising of a double sided valley with optional quarantine capability.

FIG. 9D shows a cross-sectional view X-X of self-dispensing cage system 350.

FIG. 11A shows the cross-sectional view and details of FIG. 11B.

FIG. 11B shows the vertical-frontal view of nesting panel 69a fitted with short pieces of receptacles 360.

FIG. 11C, FIG. 11D, FIG. 11E and FIG. 11F shows a perspective view of the different arrangements of using short nesting receptacles 360, 360b, 360c installed on wall 69.

FIG. 12A shows a bricks wall 69 constructed from bricks with extended edges.

FIG. 12B, FIG. 12C and FIG. 12D shows various configurations of nesting panel 69.

FIG. 12E shows a vertical-frontal view and FIG. 12F shows the plan view of bricks wall 69 constructed of rectangular bricks spaced apart to create nesting crevices 57.

FIG. 12G, FIG. 12H, FIG. 12I, FIG. 12J and FIG. 12K shows various configurations and features of bricks adapted for building nesting wall 69.

FIG. 12L shows an arrangement of dome shaped concavity preferred by swiftlets.

FIG. 12M and FIG. 12N shows an arrangement of corrugated walls 69 constructed at an inclined angle.

FIG. 12O, FIG. 12P and FIG. 12Q shows nesting panel 69 built at an inclined angle.

FIG. 12R shows triangular inclined adaptations of nesting boards 196.

FIG. 12S shows cylindrical and conical adaptations of artificial stalactites used for nesting purposes.

FIG. 13A shows the staircase shaped feeder cum flight training simulator 330.

FIG. 13B and FIG. 13C shows the nesting receptacle 360 used for feeding chicks and training fledglings.

FIG. 14 shows the release apparatus for inducing juvenile swiftlets to fledge.

DETAILED DESCRIPTION OF THE INVENTIONS

The swiftlets breeding system and method described below provide the 5 basic necessities of suitable shelters, food, water, safety and security at one single point of communal congregation for swiftlets 61. The system provides means for introducing environmental features (sound, sight, smell, tactile) appealing to the innate preference and instinct of swiftlets which serve to attract, entice, lure and persuade them to colonize, occupy and reside permanently in man made swiftlets housing structures 11, 14, 100, 200 and 356 in order to produce swiftlets edible nests 62 for food and human consumption.

Figure 1A:
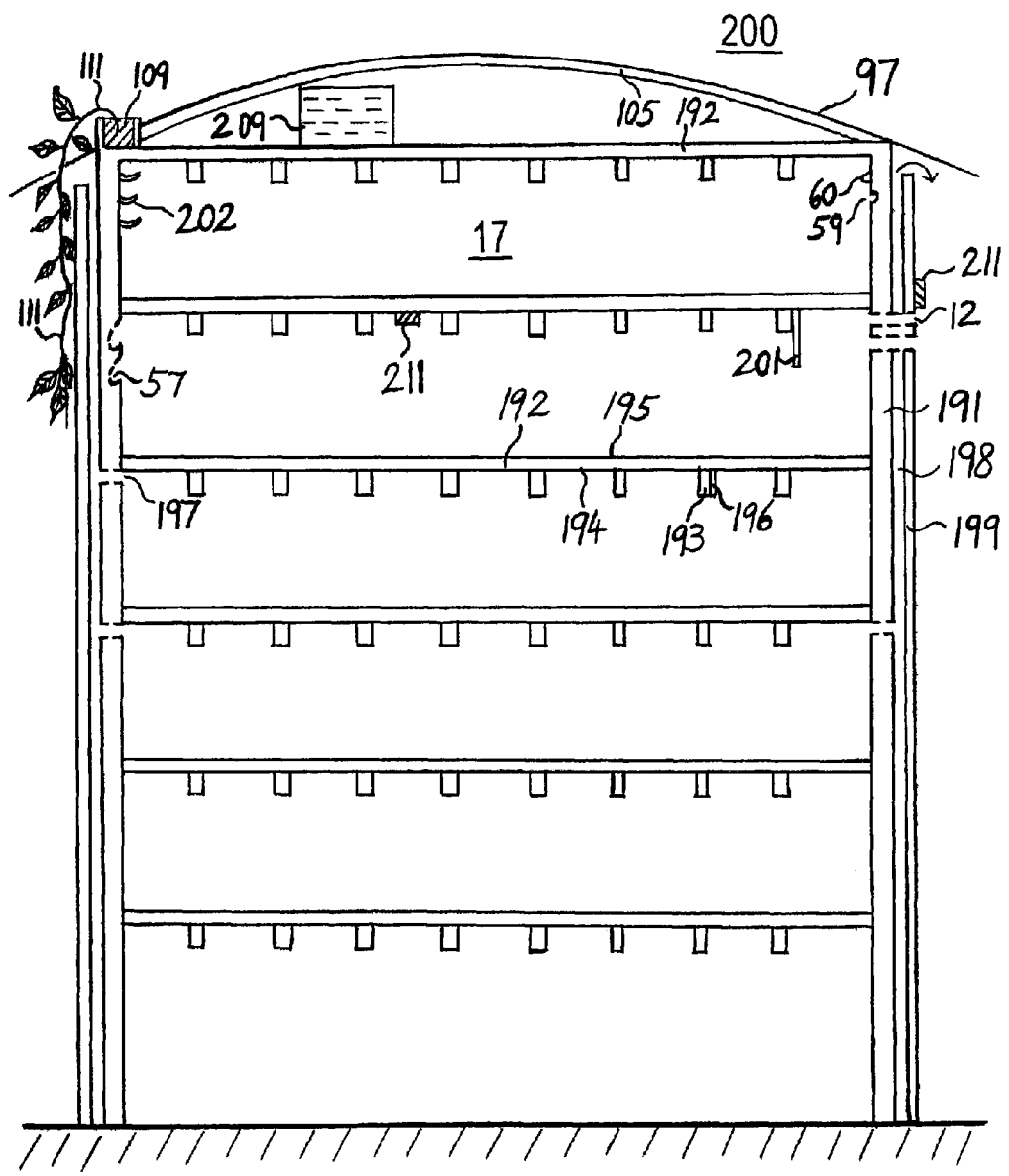
FIG. 1A shows the sectional view of a swiftlets-house/or shelter comprising of a multi-storey(s) building 200 for breeding swiftlets to produce edible bird's nests.

FIG. 1A illustrates a sectional view of one embodiment of present invention for breeding wild swiftlets 61 and the large scale production of edible birds nest 62 in a multi-storey(s) swiftlets breeding-edible nests production facility 200. This may be achieved and enabled through the provision of compatible shelters, roosting habitat or a nesting site including food, water and attractants to establish a colony of nesting swiftlets. Attractants, lures and enticements appealing to the sensory perceptions of the swiftlets such as hearing, sight, smell, touch (ears, eyes, nose, feel) may comprise: sounds of bird-chirps and bird-calls; play of the robotic swiftlets; stimulating smell of hormones, eggs, edible nest fragments (applied on to the nesting panels 69 and 196) bird-excrement; darkness, temperature of 26 to 28 deg. Celsius, relative humidity of 70 to 90% and vertical perching surfaces of the habitat. Such attractants appealing to the innate senses of swiftlets are used to create an alluring environment for them to roost, breed and build nests may comprise various forms of lures, enticements and persuasions. Such attractions may be audiometric, olfactory, visual and tactile-sensory perceptive in nature, pandering to the inborn and instinctive characteristics of swiftlets.

Initially, wild roaming swiftlets 61 may be attracted to the vacant habitat comprising man made structures by means of recorded playback of bird calls broadcast over audio-musical systems including speakers 211 repeatedly day and night until a colony of birds have been established naturally. Such broadcasts may be continued even after a colony have been established to further attract new swiftlets to move in to adopt the shelter as their home. Dozens of such audio-musical speakers and tweeters 211 may be mounted externally next to access-ways 12 to attract wild flying swiftlets 61 to shelter 200. Thousands of speaker and tweeter units 211 may be installed internally in habitat 17 to impart a feeling of homeliness to visiting swiftlets encouraging them to stay and adopt it as their home. Audio-visual displays via VDUs and a group of mannequin swiftlets playing at the entrance of access-ways 12 and inside the shelter may also be used to attract newcorners. Nesting habitat may comprise isolated crevices in the attics of houses and vacant human dwellings 11 and unoccupied commercial buildings or shop houses 14 specially renovated and adapted to provide a man made environment conducive to attract wild swiftlets 61 to build their nests 62. Such multi-storey shop-lots 14 may be transformed to replicate the swiftlet's natural habitat. Such that doors and windows may be shuttered, boarded, bricked up and cemented. Building 14 may also be specially designed, configured and built for the sole purpose of breeding swiftlets such as structure 200 as disclosed herein.

Multi-storey structure 200 may be specifically designed, specially configured and built, not for human habitation but dedicated for the sole purpose of breeding swiftlets 61 to produce edible nests 62 for human consumption. A man made eco-system 200 configured to provide residential inhabitants comprising swiftlets 61 with a safe and secure shelter in which to build their nests 62 for the purpose of raising their young. The internal construction of building 200 may comprise of a multi-storey(s) structure with numerous horizontal levels segregating the vertical height akin to multi-storey buildings constructed for human dwelling and shopping. The nesting and production capacity of commercialized facility and structure 200 may also be increased by extending the storey(s) and levels underground by means of excavations and subterranean constructions. In the stygian darkness of the cave environment with flight navigation enabled by means of echo-location, height and subterranean depth has become an irrelevance to swiftlets. Wall 191 may be multi-layered. Each level or storey may be constructed of wooden planks 192 and beams 193 such that the bottom surface of the wooden plank 192 forms the overhead ceiling 194 of the storey beneath; while the upper surface of the wooden planks 192 forms the flooring 195 of the storey above. Vertical nesting panel 196 may be attached to overhead ceiling 194 or beams 193. Floor 195 provides a safe working platform for the farmer to harvest edible nests 62 built on the overhanging latticework of nesting planks 196 or beams 193. Each storey or level 192 may also be built of mortar and concrete.

Double layered brick wall 191 with an empty space 198 in between may be covered with an external layer of zinc sheet or ceramic tiles 199. Well-ventilated empty space 198 in between keeps the inner wall 191 and structure 200 cool. Nesting crevices 57, vertical perching grips 59, 60, may be incorporated into walls 191. Water and soil retention pit 109 supports cover plants 111. Water tank 209 provides water for fogging pump 205 and humidifying fan 250. Access-ways 12 provides swiftlets with entry and exit points. Air enters and exits via access-ways 12 and ventilation ducts 197 to keep the habitat cool. Board 201 in front of access way 12 blocks direct sunlight from entering to keep habitat 17 dark and cool. Audio speakers and tweeters 211 may be installed internally in habitat 17 and externally next to access ways 12 to advertise shelter 200 to passing swiftlets. Audio-visual displays via VDUs and a group of mannequin swiftlets playing at the entrance of access-ways 12 and inside the shelter may also be used to attract new-corners to move in to occupy the shelter. The swiftlets affinity to colonial nesting-breeding behavior may be taken advantage of such that once a small colony of swiftlets has been established by artificial means other wild roaming swiftlets may be lured to move in and join the established colony of their own accord without further artificial persuasion.

Macro-habitat environment comprises man made buildings such as swiftlet-housing structures 11, 14, 100, 200; or transformed natural relief such as caves 77, cliffs and valleys 16, 19, 20 and structure 356. The humidity, temperature and darkness of natural caves may be re-created by means of design configurations, artificial adaptations and transformation of such wholly man made shelters. Nesting habitat 17 and micro-habitat environment 17a comprises replicated temperature, relative humidity and darkness simulative and emulative of natural cave conditions including nesting panels 69a, crevices 18, recessed grooves 57, vertical surfaces roughened with indentations 59, protrusions 60, claw lines 245, claw holes and pock marks 246; nests cups 202; provision of olfactory stimulation by means of bird excrement, eggs, edible nest fragments and hormonal attractions; acoustic lures to entice and attract swiftlets by means of bird chirps broadcast over audio-musical systems repeatedly; VDU display and the play of a group of replicated mannequin "swiftlets."

Additional features of the inventions are disclosed herein. Dedicated macro-habitat structure 200 designed and constructed specifically for the purpose of breeding edible nest swiftlets for their nests may be configured to simulate nesting swiftlet's natural cave conditions and micro-habitat environment. The climatic conditions in caves comprising humidity, temperature and darkness may be re-created and replicated. Such that swiftlets housing structure 200 may be planned and designed from conception to be well ventilated, cool, dark and humid. All such specialized breeding-production facilities comprising structures 100 and 200 may be configured from the conceptual stage to achieve the desired parameters including transformed natural relief such as: natural caves 77; U-shaped valley 16, 19, 20, structure 356, cage 21, 22, 350 and; single sided cliffs 16, 19, 20, structure 97. The basic architectural design criteria and infrastructural configuration of the macro-habitat (shelters 100, 200, 356 and habitat 17) should be engineered right from the conceptual stage in achieving a replicated and re-created micro-habitat conditions and environmental parameter comprising of: a temperature of 26 to 28 deg. Centigrade; relative humidity of 75 to 90%; and stygian darkness emulative and simulative of natural caves. These critical, governing design parameters and specifications should form the ultimate objectives of the swiftlets-house designers and/or architects. Including modification and transformation works carried out to transform and convert human shelters 11, 14 into a swiftlets habitat for breeding swiftlets to produce edible nests 62. Top levels of high rise buildings may also be transformed for breeding swiftlets to produce edible nests while other levels beneath are used for human dwellings and normal economic activities.

Shelters 200 may be constructed for the creation and provision of a man made macro-habitat, micro-habitat environment and climatic conditions compatible with and/or attractive for swiftlets to nest and colonize. The internal environment of the micro-habitat 17a may be adapted to be simulative and emulative of natural conditions in caves in which swiftlets breeds. These natural breeding caves are dark, cool and humid with a temperature of 26 to 28 degrees centigrade, a relative humidity of 75 to 90 percent and vertical perching surfaces formed by cave walls. In the tropical climate, temperature ranges from 22 to 34 degrees centigrade; and daytime temperature averages 30 to 34 degrees centigrade. The lowest and highest recorded temperature in Singapore being 18.4 deg. C. and 37.8 deg. C. The relative humidity ranges from 90% in the morning to 60% in the afternoon; rising to 100% during prolonged heavy rain.

A green house is normally required to provide a regulated environment which is warmer than the outside temperature. In swiftlets farming, this requirement is reversed. The swiftlet's micro-habitat environment 17a must be cooler, damper and darker than the external environment. The crux lies in replicating a climatically regulated natural cave's environment equivalent to a "cool green house," wherein the micro-habitat conditions are maintained and controlled throughout the year; at a temperature of 26 to 28 deg. C., a relative humidity of 75 to 90% and total darkness.

Figure 1B:
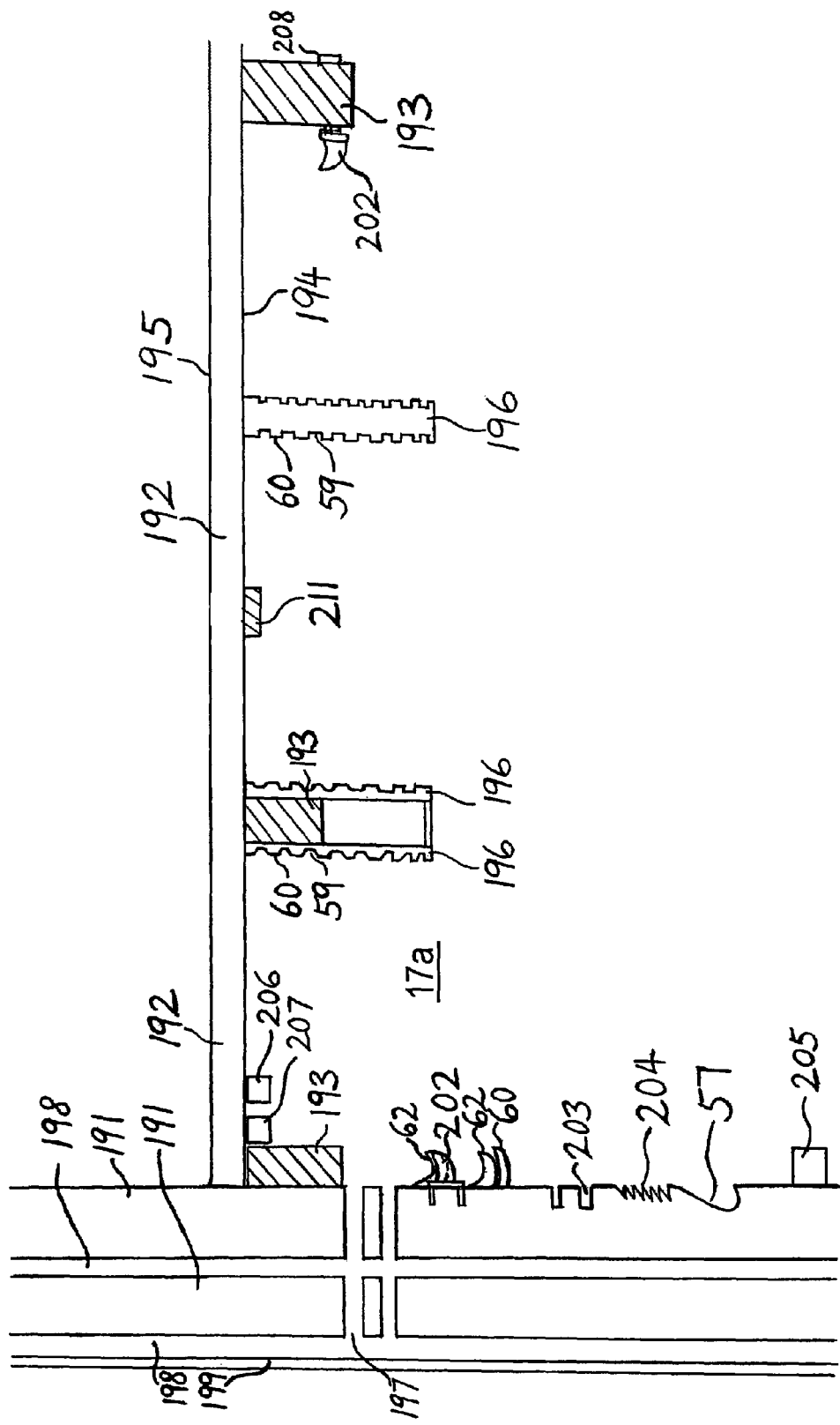
FIG. 1B shows the cross-sectional view and details of the internal configuration of one storey of the shelter 200.

FIG. 1B illustrates an enlarged sectional view of the latticework arrangement of FIG. 1A comprising vertically positioned nesting panels 196 attached to horizontal wooden planks 192 or beams 193, hanging down from ceiling 194. Vertical nesting panel 69a may also be modified to form a shortened and miniaturized version comprising nesting board 196. Such an array or grid of vertically positioned nesting panels 196 may be built affixed to the overhead ceiling 194 inside such man-made shelters, buildings and structures 200 to maximize nesting surface areas and to provide vertical perches for resting swiftlets enclosed by multi-layered walls 191. Vertical boards 196 may be attached to beams 193 or directly mounted to floor planks 192, hanging down from the overhead ceiling 194 of the multi-storey building 200. Panels 196 may comprise vertical wooden boards ranging from 5 centimeters high to 30 centimeters in height. Nesting surface may also comprise wooden rafters and beams 193 upon which wooden planks 192 rested. Multi-layered wall 191 may be perforated by ventilation ducts 197 and access-ways 12, externally covered by a layer of galvanized zinc, rigid plastic roofing sheets, or ceramics tile 199 separated by empty spaces 198. Other features as shown includes indentations 59, protrusion 60, nest cup 202 attached to wall 191 by means of extended legs 266 in holes 203, or clips 268 slipped into fixed brackets 208; extension 60, crevice 57, saw-tooth serrated perching surface 204, fogging pump or humidifier 205 controlled by humidistat 206; forced draught fan 217 and ventilators 218 controlled by thermostat 207, or remote command signals from the central control center. Claw lines 245 and claw holes 246 may be added. Audio speakers and tweeters 211 may be installed on nesting surfaces 191, 196 or ceiling 194 to broadcast swiftlets-calls non-stop, 24 hours every day. The speakers may be spaced 3 feet apart such that thousands of units may be mounted inside habitat 17 depending on the physical dimensions of shelter 200.

FIG. 1C illustrates a perspective view of an arrangement of specially arranged lattice-work of nesting boards 196 which may be affixed to the ceiling 194 of swiftlets breeding structure such as inside concrete shelter 14. A criss-crossing grid or array comprising pieces of such vertically positioned nesting panels and boards 196 ranging from 5 cm to 30 cm in height, or of any desirable measurement or suitable configuration, may be constructed overhead, hanging down from beneath the ceiling 194 to provide vertical nesting surfaces for swiftlets to cling on and to build their nests. Vertical nesting board 196 may also be attached to concrete beams 193 and vertical building walls 191 made of bricks. Swiftlets 61 perches on vertical panels 196 next to its nest 62. Such an arrangement being emulative and simulative of a natural cave environ, in which nesting boards 196 replicates the utility purposes of stalactites. Harvesting of nests in such swiftlets shelters 200 may be easily carried out by simply reaching up to pluck them from ceiling 194 while standing on the floor 195. The building structure may comprise of reinforced concrete floor and beams and the walls constructed from bricks. Fogging pump 205, humidistat 206, thermostat 207 and audio speakers 211 may be installed.

FIG. 1D illustrates a perspective view of edible nests 62 built by swiftlets 61 on beams 193, underneath the ceiling 194 in a swiftlets breeding structure such as inside wooden shelter 11. Beams 193 may be used as a substrate upon which nests are attached and built by swiftlets. Water container 210 may be topped up by means of water from overhead tank 209 via a water tap to maintain high atmospheric moisture content in habitat 17.

Figure 2A:
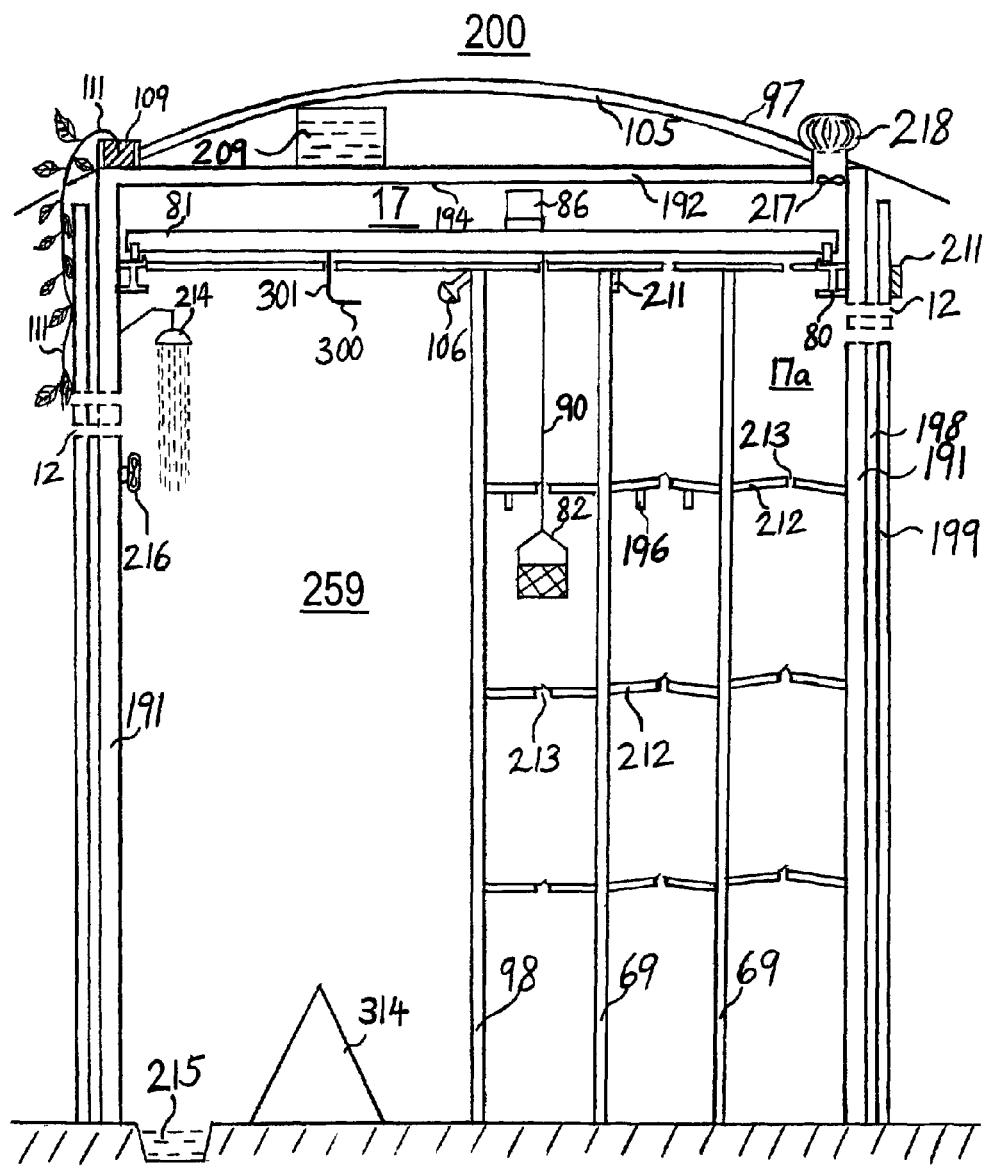
FIG. 2A shows the use of vertical nesting panels with horizontal partition boards 212 in shelter 200.

FIG. 2A illustrates an alternative arrangement from FIG. 1A to FIG. 1D, in which the internal structure of swiftlets shelter 200 may comprise of a wholly vertical configuration such that pieces of nesting panels 69a are mounted and assembled in a grid or lattice-work of "C, U, I, H" shaped channels 228 rising vertically, hundreds of meters from the ground level to the top most level 192 and ceiling 194 of building 200. Mechanized lifting systems comprising overhead hoists 82, 86, 87, 88, 89, 90, 91 mounted on girders 98, 80, 81 (mobile) may be provided for working on such vertical panels 69. Audio speakers 211 or VDU screen may be mounted on external wall cover 199 near to access-way 12. Or, a group of robotic toy swiftlets may be arranged to play at the entrance to access ways 12. Dozens of such speakers 211 may be installed around structure 200. In another embodiment, if desirable, the vertically positioned panels 69 may be horizontally segmented into micro habitat cells 17a by means of level boards 212 to enable partitioning of the vertical nesting space. Horizontal boards 212 may be slightly inclined at an angle for ease of guano 224 removal; and spaced 10 to 15 meters apart in height forming a physical canopy, an overhead barrier equivalent in utility purpose to a ceiling 194 and floor 195 structure. Extension 212 may not be designed to bear heavy load. Rigid yet light weight materials comprising canvas, plastics, PVC, plywood, fiber boards, polymers, etc. may be used to construct horizontal extension 212. Two pieces of horizontal boards 212 mounted on opposite sides of vertical panel 69 may be arranged facing each other with a gap 213 running along the whole length to provide access for hoisting lines 90 and 85 of the overhead lifting mechanism. Water stored in overhead tank 209 may be provided to fogging pumps 205 and humidifiers fans 250. Water in pond 215 may be pumped to discharge nozzle 214 mounted high up near the girder 80. Fine droplets of water falling down to pond 215 vaporizes into the air as it falls to increase the relative humidity of habitat 17 to 90%. Wall mounted fan 216 may be used to assist in evaporation. Forced draught fan 217 may be run to augment ventilator 218 to keep the habitat 17 cool. Additional units of fans 216 and 217 may be run during hot and dry weather conditions to maintain the coolness and atmospheric moisture content of habitat 17.

In another embodiment of present invention, large spacious feeding cavities 259 may be designed, incorporated and integrated into eco-system 200 together with feed dispensing system 300 and water dispensing apparatus 214 such that chamber 259 may be used as an enclosed feeding cavity with discharge nozzle 300 of the aerial feed dispensing system mounted high up near to ceiling 194 on girders 80 and 81 for dispensing insects and worms comprising cockroaches, crickets, grasshoppers, beetles, ants, larvae, etc. from high up. Aerial feed dispersal system 300 is capable of simulating, emulating and pandering to the natural feeding habits of the aerial insectivorous swiftlets 61. Feeding trucks 290 and prime-mover 293 may be parked externally, next to structure 200, discharge hoses 289 hooked up to collection drum 304 and feed pumped up discharge pipe 301 to nozzle 300. Such feeding chambers 259 designed into the production facility 200 provides a communal area for swiftlets to interact, feed, drink, play and display mating flights. Cavity 259 devoid of nesting structures may also be equipped with humidifying fans 216, internal water pools 215, water sprays discharged by nozzles 214, lighting 106, vertical perching feeders 314. Swiftlets may drink from pool 215 or from the water sprays discharged by spray nozzles 214. All access ways 12 may be collectively located at the chamber walls such that all the swiftlets occupying a section of the ecosystem 200 enter and exit via cavity 259. Such a structural configuration enables food, water and shelter to be provided at one single communal point of congregation and contact for the colony of swiftlets.

To satisfy the crepuscular feeding habits of swiftlets, feed materials may be arranged for dispersal at dawn and dusk, in particular, between 0630 to 0830 hours and 1730 to 1930 hours daily. To provide enough light, windows may be built with shutters and spotlights 106 may be mounted on the ceiling and on the ground facing upward to enable swiftlets to see and home-in on the airborne food supply dropping down from hundreds of meters above. Audio cues may be used to alert residential swiftlets via speakers and tweeters 211 such as the tolling of a bell, siren, whistle, feeding sounds, special song, etc. Prior to and during such routine feeding, window shutters may be opened, spotlights 106 switched on to illuminate the feeding chamber 259 and audiometric cues broadcast. Such that upon hearing and seeing this audio-visual cue, swiftlets 61 knows by habitual routine ingrained into their brain that food is on the way; rushing into feed chamber 259 to be feted to a sumptuous meal of insects 297. Lights, music, feast and drink! In a farm environment, feed materials may be provided 24 hours a day, round the clock if desired, even in the dead of the night. In times of poor diurnal catch swiftlets have been known to use echolocation to find their way around in nocturnal hunting sprees to satisfy their hunger especially during the dry season.

Figure 2D:
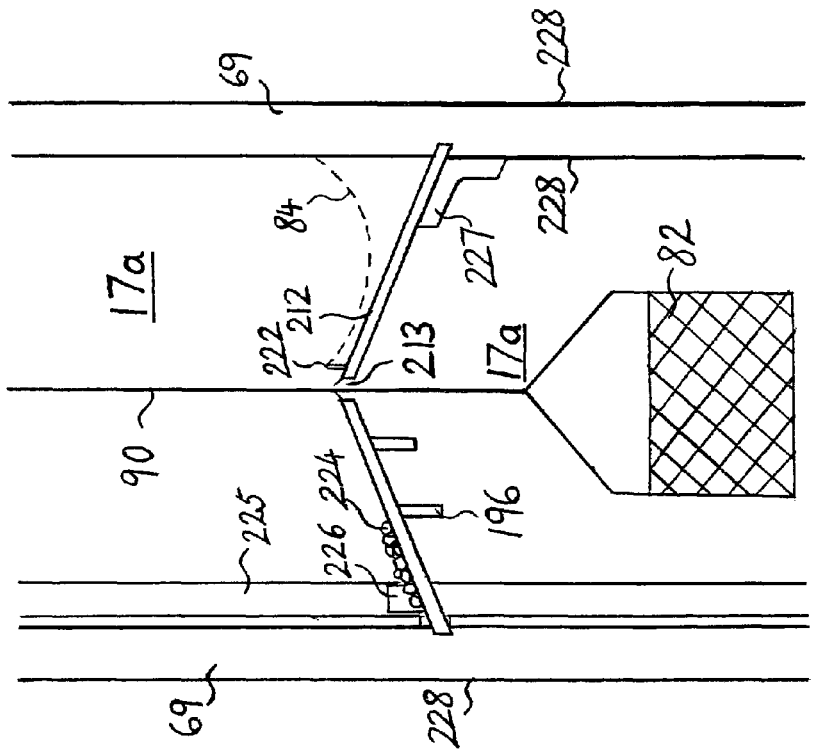
FIG. 2D shows an apparatus to remove bird shit from the horizontal boards 212.
Figure 2B:
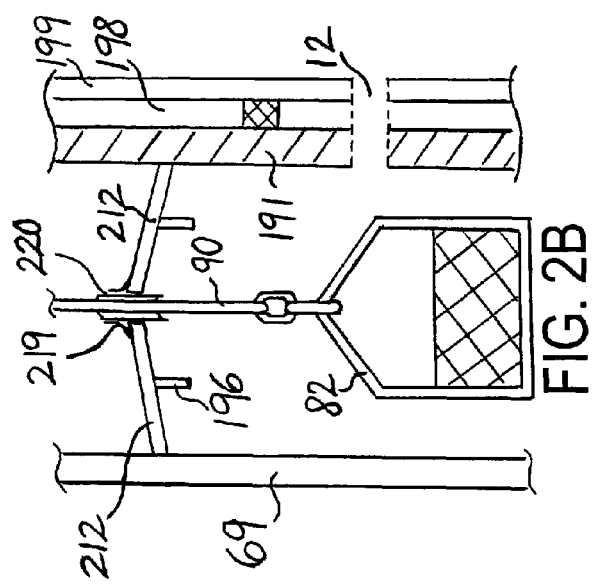
FIGS. 2B and 2C shows the detailed perspective view of additional features and transformation necessary to operate the lifting mechanism in tandem with horizontal boards 212.
Figure 2C:
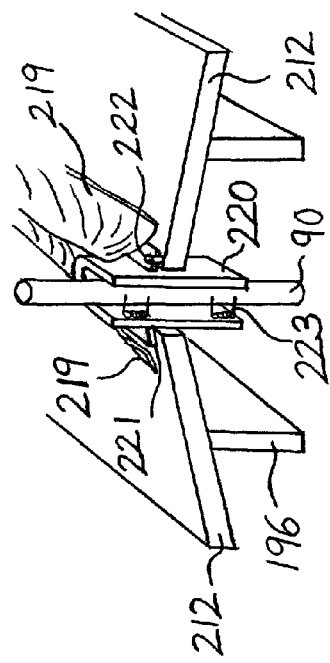

FIG. 2B and FIG. 2C illustrates enlarged views of FIG. 2A, including details of the adaptive features and transformation required to operate the lifting mechanism (81, 86 to 91) in tandem with horizontal boards 212. Work cage 82 may be moved horizontally into micro habitat cell 17a. A lengthwise gap 213 in between the two pieces of horizontal boards 212 is retained for passage of hoists lines 90, safety lines 85, electric lighting cables, lifting system control cables of the lifting mechanism, hydro-jetting hoses, etc. Gaps 213 may be filled in by two pieces of overlapping pliable materials 219 comprising canvas, semi-rigid cloth, rubberized sheets, pliant plastics, PVC, polymers, etc. allowing passage of these utility lines while restricting and preventing vertical movement of swiftlets between micro-habitat cells 17a. A U-shaped protective sleeve 220 resting on sliding bracket 221 mounted in gap 213 shields the utility lines 90, 85 from debris as they are moved vertically up and down; and horizontally from one point to another along gap 213 in cell 17a. Spring-loaded wire clips 223 enable U-shaped sleeve 220 to latch onto the utility lines and move together with them along gap 213. Vertical movement of work cage 82 in the space between the upper and lower panels 212 is unhindered as the lines slides freely through the U-shaped sleeve 220. When work cage 82 moves out from cell 17a, mechanical stoppers 222 mounted at the edge of the boards 212 stop further movement of brackets 221 and sleeve 220 beyond, while the utility lines breaks free from the spring-loaded wire clips 223 and detaches from sleeve 220. Vertical panels 196 may be mounted and affixed beneath horizontal boards 212. The wholly vertical configuration of nesting panels 69a in FIG. 2A provides a larger nesting surface area and is much more productive, efficient and effective in breeding swiftlets to produce edible nests than the horizontal arrangement of short modified vertical panels 196 mounted beneath the ceiling 194 as illustrated in FIG. 1A.

FIG. 2D illustrates a waste disposal system of present invention in which swiftlets excrement 224 deposited on horizontal panels 212 may be removed by means of disposal chute 225 via trap door 226. Brooms with stiff bristles made from rattan or bamboo may be used to sweep guano through the swinging trap door 226. Accumulated bird shit may be removed at regular intervals from boards 212 which may not be designed for carrying heavy loads. The base of horizontal board 212 may be attached to nesting panel 69a supported by struts 227 extending from and welded to the framework of channels 228. Edges forming the gap 213 may not be supported and the weight of boards 212 may be solely borne by supporting leg struts 227. Disposal chutes 225 running parallel to the vertical panel 69 may be made of PVC pipes or any suitable material. Guano 224 accumulated at the bottom of disposal chute 225 may be removed for use as insect feed and fertilizer. During the breeding season, safety net 84 may be arranged above the board 212 at the bottom of micro-habitat cell 17a. One end may be attached to panel 69 while the other end may be anchored by short struts 222 near to the edge of gap 213.

Figure 2E:
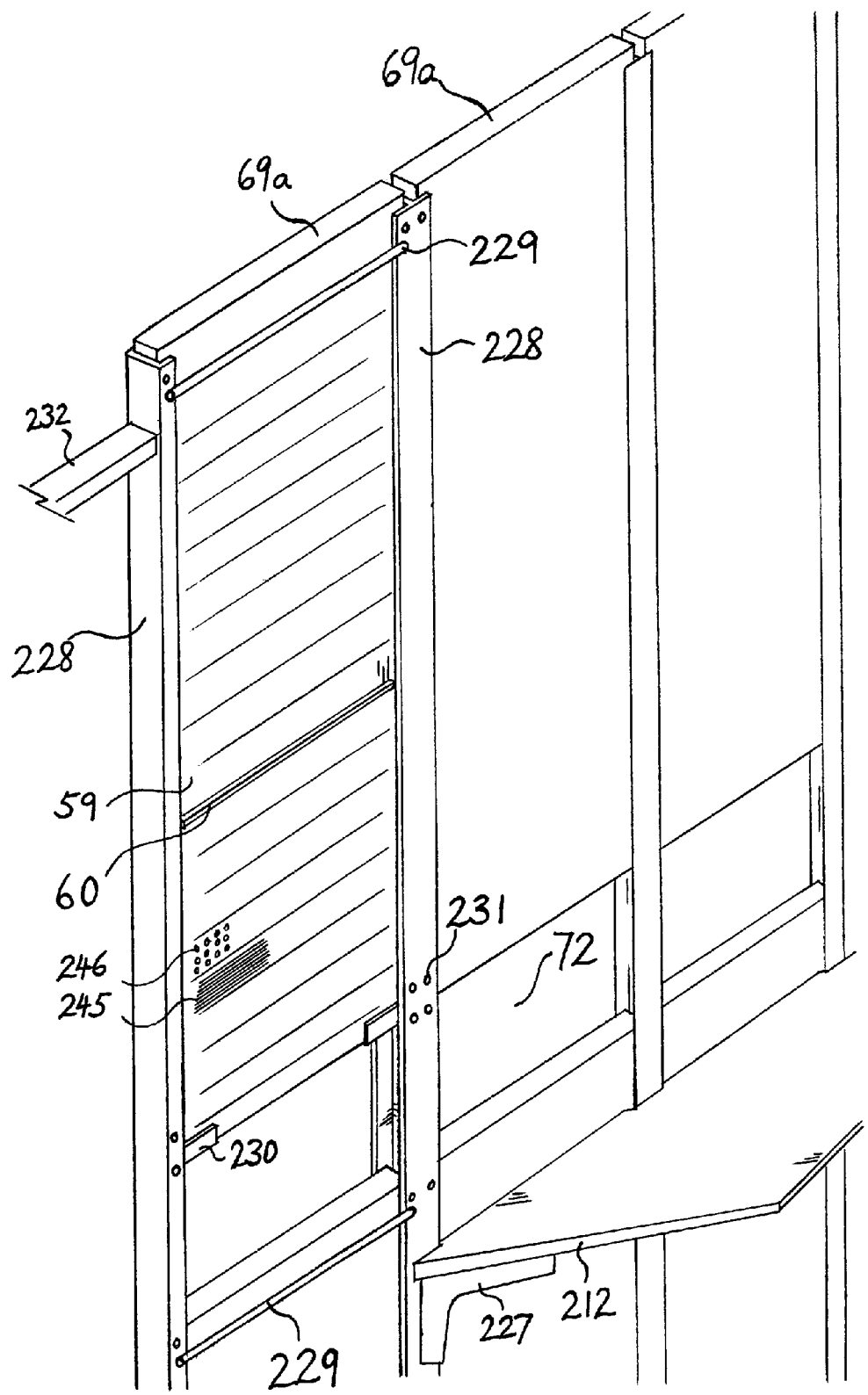
FIG. 2E shows details of nesting panel 69a mounted in C, U, I, H shaped channels 228.

FIG. 2E illustrates details of individual pieces of nesting panel 69a mounted in C, U, I, H shaped metal channels 228; rising hundreds of meters in vertical height from ground level to the ceiling 194. Hundreds of individual pieces of such vertical panels 69a may be assembled together to form one main nesting panel 69. Supporting struts 229 may be welded to secure channels 228 together while welded bottom plates 230 may be used to support the weight of panel 69a held in place by bolts and nuts 231. Channels 228 may in turn be secured and anchored to I-beams and girders 80, 98 and beams of wall 191 by means of welded extension struts 232. Metallic components may be protected from corrosion by means of a layer or coating of concrete applied externally. Gaps of empty space 72 measuring up to 1 meter wide may be left in between individual pieces of panels 69a for passage of swiftlets and ventilation. Horizontal boards 212 may be attached to nesting panel 69a supported by metal struts 227 welded to channel 228. Vertical perching groves 59, extensions 60, claw lines 245 and claw holes 246 may be integrated into the panels 69a. In an alternative arrangement, panels 69 mounted in production facility 100 may be aligned breathwise stretching from one side of the cave wall to the next, running across the width for ease of habitat management purposes; instead of stretching length-wise, along the whole length of the caves system. The length of the caves may be constructed to stretch for up to 10 km long if desired.

FIG. 3A illustrates the multiple layered structures of the roof to keep swiftlets shelter 200 cool. External roofing cover 97 may be securely attached to metal girders or I-beam 105 by means of bolts and nuts 235. Nails and screws may be used if beam 105 comprises wooden beams. Beneath lies a layer of aluminum foil 236; a layer of glass fiber wool 237; another layer of silvery foil 236; another layer of Styrofoam or glass wood insulation 237; supported by a layer of wire mesh 238 kept in place by wooden rafters 239 attached to beam 105. Radiant heat is kept out of the habitat 17 by the double layers of shiny reflective surfaces of foil 236 while conduction of solar heat is minimized by means of double layers of Styrofoam insulation. Stagnant air trapped in between the multiple layers prevents convection of heat. If desired, additional layers of such insulation materials may be used to keep structure 200 cool. Roofing cover 97 may comprise galvanized zinc sheets, carbonates, silicates, ceramic tiles, etc. generally used in the construction industry. Roofing 97 may comprise specially designed ceramic tiles 247 made from clay with SS316 brackets 248 securely pre-attached into the tiles measuring 1 m×2 m×2 cm such that the tiles may be secured to beam 105 by means of screws, bolts and nuts. Rafters 239 may be substituted or supplemented with metal rods or SS-316 wires strung in between the struts of girders 105. The three major types of heat transfer: radiation, conduction and convection may be controlled by way of reflective surfaces, foams, fibrous materials and spaces by reducing physical contact between surfaces and stopping or retarding the movement of fluids around the insulated object. Plastic foams and thermoplastics comprising: polystyrene (PS) or Styrofoam, polyethylene (PE), polyethylene terephthalate (PETE), polypropylene (PP), polyester, polyamide (PA), polycarbonate (PC), Polytetrafluoroethylene (PTFE), polymethyl methacrylate (PMMA), acrylonitrile butadiene styrene (ABS), polyvinyl chloride (PVC), polyvinylidene chloride (PVDC) and polylactic acid (PLA) may also be used for insulation.

FIG. 3B illustrates layout details of the multiple layered walls 191 to keep swiftlets shelter 200 cool. Vegetative plants 111 provide external shade while the outermost cover 199 is exposed to direct sunlight filtering through vegetation 111. Outermost cover 199 may comprise of galvanized zinc sheets or rigid plastic sheets attached to external surface of wall 191 by means of supporting struts 241 secured by screws, raw bolts or rivets 231 with a well ventilated empty space 198 in between. The inner and outer layers of bricks forming walls 191 may be kept apart with spacer bricks 240. Space 198 may be filled with pieces or layers of insulation materials 237 comprising fiber glass wool or Styrofoam. Cover 199 may also be made from materials such as silicates, carbonates, fibers, plastics, ceramic tiles 247, earthen brick tiles, etc. Wall 191 may also be made from individual pieces of normal bricks widely used in the construction industry.

FIG. 3C illustrates an alternative embodiment of FIG. 3B such that the inner wall 191 may comprise vertically positioned bricks 242 interspersed with horizontal pieces 243 sticking outward from the wall. Such a structural configuration enhances nest building opportunities for swiftlets as the short stubs sticking out provided by horizontally positioned bricks 243 may be used as a ready made substrate and a conducive micro-habitat environment 17a upon which edible nests may be built. The opposite end of brick 243 forms a spacer to create an empty space in between the twin bricks walls 191, which may be filled with pieces of Styrofoam 237. Outer wall 191 may be constructed wholly of vertically positioned bricks 242 covered by sun shield 199.

FIG. 3D illustrates an alternative embodiment of FIG. 3C such that horizontally positioned bricks 243 may comprise of specially configured bricks prefabricated with raised extensions 60 and groves 57 into which vertically positioned bricks 242 may be slotted and cemented in place. One end of brick 243 provides a spacer onto which external cover 199 may be attached by means of screws, raw bolts and rivets 231 while the other end provides a ready made nesting surface for swiftlets such that nests 62 may be built in grove 57 which is equivalent in utility purpose to nesting channel 76. Vertical perching may be augmented with saw-tooth ribs 204 affixed at the edge for parent swiftlets to mind and feed their chicks in nest 62. Raised extension 60 in the middle part of brick 243 replaces spacer bricks 240; while the extension 55 at the end forms a raised edge similar in utility purpose to raised edge 55 in preventing chicks from falling off nesting cavity 57 or 76. Nest cups 202 may be affixed to vertical bricks 242 via prefabricated holes 203. The cemented bricks 242 and 243 may be reinforced with inter-connecting shunts 244 made of SS 304, SS-316 or belian wood. Such that wall 191 comprises of a four layered structure. Both the vertical inner and outer layers of wall 191 may be made of bricks 242 with a layer of Styrofoam or fiberglass wool 237 in between. External cover 199 forms a sun-blocking heat shield to keep structure 200 cool. Photo-voltaic cells may be mounted on cover 199 or roofing 97 to tap solar power, supplying electricity to run exhaust fans 217, ventilators 218, fogging pumps 205, humidifying fans 249, etc. Ceramic tiles 247 as illustrated in FIG. 3G and FIG. 3H may also be used as a substitute for zinc sheet 199 to form a five layered wall structure. Such a configuration produces the strongest, coolest and most utilitarian wall structure 191.

FIG. 3E illustrates the roughened external surfaces of hollow bricks 242 to provide vertical perching claw grip for swiftlets. All the external surfaces of bricks 242, 243, 247, including all vertical nesting surfaces such as boards 196, beams 193, panels 69a, wall 191, etc. may be serrated, ribbed, scratched and claw-marked with lines 245 and pock-marked with claw holes 246. The claw lines may comprise of horizontal, vertical, matt or diagonally in a criss-cross pattern. Lines 245 may be scratched onto the soft clay of bricks 242, 243, 247 with a row of nails mounted on a piece of wood, before being dried and heat treated in the furnace or oven. Rows of nails mounted on a flat piece of wood may also be pressed against the soft clay surfaces to imprint hundreds/or thousands of indented pock-mark and small holes 246 packed closely together. Alternatively, such lines 245 and holes 246 may be imprinted by means of stenciled patterns designed into the moulds used for making the bricks 242, 243 and 247. Such surfaces provide ease of vertical perching for swiftlets while at the same time, ensures enhanced bonding of cement during construction, resulting in a stronger structure 200. Pre-fabricated holes 203 provide ready made slots for accepting attachment legs 266 of nest cups 202. Brick 242 may measure 0.5 m×1 m×10 cm. FIG. 3F illustrates a perspective view and details of the specially designed bricks 242 with an internal hollow structure 18 used for constructing walls 191. Bricks 54 may also be used for building wall 191. Lines 245 and holes 246 may also be designed into all vertical perching and nesting surfaces like panels 69a, boards 196, beams 193, walls 191 and inside channels 76, crevices and recesses 57, apparatus 314, apparatus 330 and any other vertical perching and nest building surfaces in structures 11, 14, 100, 200, 356.

FIG. 3G illustrates an alternative embodiment in which the external layer of zinc sheet 199 and bricks 242 comprising the outer layer of wall 191 may be substituted with specially configured ceramics tiles 247 incorporating an external layer of sun blocking ceramics surface 199; such that tiles 247 cum heat shield 199 forms a single integrated unit. The cross-sectional structure of wall 191 comprises of a multi-layered configuration such that hollow bricks 242 forms the inner layer of the wall 191 while the outer layer comprises of ceramic tiles 247 integrated with an external layer of sun blocking ceramic surface 199 which acts as a heat shield. Ceramics surface 199 is attached to tile 247 by supporting struts 241 with an empty space 198 in between. Surface 199 may be slightly smaller in size than tile 247 surrounded by a ventilation gap 72. Photo-voltaic cells may be mounted on surface 199 to tap solar energy for electrical power. Specialized ceramic tiles 247 may be slotted onto the end groves of bricks 243 and cemented as in FIG. 3D; or attached to modified horizontal bricks 243 by means of raw bolts 235 as shown in present diagram. A layer of Styrofoam 237 may be placed in between the hollow bricks 242 comprising the inner wall and ceramic tiles 247 forming the outer wall. The protruding end of horizontal bricks 243 may be designed for nesting including various features like claw lines 245, pock-marked claw holes 246, saw-toothed surface 204, raised edge 55 and nesting channel 76.

FIG. 3H illustrates a side view of double layered ceramics tile 247. Outer layer 199 is attached to tile 247 via attachment legs 241 separated by an empty space 198. The edges of tiles 247 may be designed with overlapping edges to prevent rain water from ingress. Ceramic tiles 247 may also be used for roofing purposes, such that the tiles may be attached to girders 105 by means of embedded brackets 248. Brackets 248 may also be incorporated for attachment to bricks 243 or other structural substrate. All dimensional measurements such as length, breath and thickness of the illustrated figures may be varied to suit local conditions.

FIG. 3I illustrates details of the humidifying fan 250 with two rings 251 of water spray nozzles 252 mounted on the fan's metal grill cover 253. Fan 250 mounted on wall 191 is powered by electric motor 254 which moves by means of swivel mechanism 255. Pressurized water to water rings 251 and nozzles 252 may be provided by a water pump 256 via hose 257. FIG. 3J shows the frontal view of FIG. 3I. Closely spaced grill 258 protects external objects from coming into contact with rotating fan blades 250. High pressure water sprays may be discharged through the nozzles 252 producing a fine mist of minute water particles. Fan 250 is run to blow air vaporizing this fine mist or fog. Fine evaporating water droplets absorbs heat from the surrounding air, cooling the ambient temperature of habitat 17 to 26 to 28 degrees C.; and at the same time, raises atmospheric humidity to 75 to 90%. Integrated units of fogging fans 216, humidifiers 250 and fogging pumps 205 controlled by humidistat 206; exhaust fans 217 and ventilators 218 controlled by thermostats 207 may be used for the direct measurement, control and real time adjustments of moisture content and temperature of habitat 17. Alternatively, externally mounted chiller units may be used to circulate a refrigerant of chilled fluid by means of conduit pipes into ecosystem 100 to chill the rocks 101, which in turn cools down the habitat 17. Or, the fluid may be circulated into conduit pipes laid inside nesting panels 69a of ecosystem 200 and 356. Alternatively, the refrigerant may be used to chill the water in pond 215, producing icy-cold water-falls and water-sprays to chill the rocks 101, stones 102 and wall 104. Such a system may only be necessary/or used during the hot dry season.

Bricks 242, 243, 247 used in constructing walls 191 and roofing cover 97 as well as nesting panels 69a and modified nesting boards 196 may comprise earthen-wares such as fired ceramics in the form of bricks, tiles, slabs and large sheets of building materials made from earth and clay. The soft and pliable mixture or slurry of wet clay, mud, earth, sand, small stones, binding agents, etc. may be machine pressed in moulds. After they have set, the raw bricks, tiles and panels (including metallic moulds if used) may be further dried, solidified and cured by heat treatment in a fired kiln/or furnace. Wire mesh and metal rods may be placed internally to reinforce the structure. Alternatively, organic materials comprising pieces of bamboo, wood, rattan, fibers may also be added and used, such that when the organic materials have been burnt off by heat and fire, the hollowed out internals provides a light-weight, yet extremely strong and durable structural support for the panels (just like the hollow bones of our body). The bricks, boards and panels may be air cooled, then washed and cleaned before being used for construction of shelters 100, 200 and 356. Nesting panels 69a and boards 196 may also be constructed from building materials comprising: silicates, carbonates, chalk, limestone, concrete, wood, plywood, poly-vinyl-chloride (PVC), Styrofoam, poly-propylene (PP), poly-ethylene (PE), polymers and related petroleum based synthetic compounds, etc.

Building materials may also comprise blocks or slabs of flat surfaced rocks of any desirable shapes cut, sliced, sawed, hewn and carved from natural occurring rocks. Individual pieces may be drilled with holes, furrowed with groves, surfaces cut to form interlocking holds and overlapping grips for ease of attachment. Such pieces may be cemented, attached, affixed and bound together with strands of metal wires, straps, bars, channels, sheets, etc. made of SS-304 or SS-316. Blocks of square, rectangular shaped rocks may be used to form supporting beams, columns and pillars 98 for the structure 200 which may be moved into place by means of overhead hoists and tower cranes 116. Rocks used may comprise of granite, limestone, calcite, marble, sandstone, etc. quarried from the farm vicinity and surrounding mountains.

Structure 200 forms a fully enclosed multi-storied swiftlets-house rising hundreds of meters high spread over hectares of land area. Externally such fortress-like-buildings 200 appears pock-marked with rows of neatly arranged aerial access-ways 12. Entrance to and exit from the shelters may comprise of an array of small apertures 12 to keep out predators but adequately sized for swiftlets to enter and exit with ease. Such airborne access-ways 12 which also serves as air intake or exhaust ports for the swiftlets-house 200 may be located on the roof top or high up on the vertical walls of the structure. Panels 69a and 196 may also be erected at strategic locations in the farm 113, 23 or outside of habitat 17 for open space perching and resting by swiftlets.

In regulating temperature and darkness of the swiftlets housing structure 200, primary structural designs should focus on control measures to prevent, avoid and eliminate external heat and/or direct sunlight from entering habitat 17, in order to maintain and keep the shelter's internal environment cool, dark and humid. The double layered vertical bricks wall 191 of the swiftlets-housing structure may be configured with an additional layer of external cover 199 comprising: galvanized zinc sheets 199; roofing tiles 247; large pieces or sheets of protective cover made from earth, ceramic or porcelain; wood, attaps made from the fronds of nipah palms; synthetic materials such as sheets of rigid plastic roofing, etc. For maximum results, the design should include a well ventilated empty space 198 in between the double layered structural wall 191 as well as the exterior cover 199, such that any heat trapped in between the surfaces may be easily removed by means of natural draft. Alternatively, a layer of fiberglass wool or Styrofoam 237 may be placed in the empty space in between the double layers of bricks wall 191, effectively insulating the inner wall from heat transmitted by conduction and convection. An exterior vegetative cover and shade may be provided by means of plants 111. Undesirable designs should be avoided. Employment and use of effective and efficient architectural design generates long term cost savings, reduces over heads and operating cost to maximize profitability of the swiftlets farm.

The architect should utilize structural designs in the construction of macro-habitat 200 to achieve the ultimate objectives of providing an internal habitat 17 and micro-habitat 17a with the desired environs. Not depending on ancillary equipment for the removal of design limitations (temperature, humidity & brightness) after the shelter has been erected; by means of auxiliary equipment such as fogging pumps 205, exhaust fans 217, ventilators 218, humidifying fan 249, etc. to achieve the ultimate objectives; even though these equipment may be installed for back up purposes and stop gap measures. Such that even without the use of such additional auxiliary equipment as a means to an end (stop gap measures); the configuration of the infrastructure, basic underlying design and engineering principles used in constructing the swiftlets-shelter 200 (hollow bricks, double roofs, multiple layers of insulation and reflective materials, multiple layered walls, etc) would have achieved the desired objectives of re-creating, replicating and providing a compatible and desirable swiftlet's macro-habitat 200 environment and micro-habitat environment 17a to a large extent.

To regulate the temperature in swiftlets habitat 17, the structural configuration of swiftlet's breeding cum edible nests production facilities should be designed to keep the habitat cool and well ventilated even during the hottest months of the year. FIG. 3A to FIG. 3H illustrates an arrangement of apparatus and a method of keeping the structure cool. Multiple layered heat resistant insulations and reflective (radiant heat) materials such as Styrofoam, fiber-glass wool, tin and aluminum foils, etc. may be adapted for use in the construction of the roofing and ceiling. Double or multiple layered walls with a layer of Styrofoam in between may be adapted to keep the structure cool. The walls 191 may be constructed of hollow bricks 242, horizontal bricks 243 and multiple layered ceramic tiles 247. Such tiles 247 may also be used as roofing materials. Air trapped inside the hollow bricks 242 being a poor conductor, keeps the interior cool. Water may be sprayed on the external walls by means of a network of pipes drilled with holes to maintain a cool habitat. Water may also be distributed by means of spray nozzles and rotating sprinklers mounted on the roof top 97 of structure 100 and 200. Cover plants 111 shields the structure while evaporation of water cools down the external structure comprising roof 97; heat shield 199, tiles 247 and the outer concrete wall 191; while inner wall 191 of bricks 242, 243 and Styrofoam 237; or layers of rocks 101 and stones 102 prevents heat from permeating into habitat 17. Evaporation of water may also be used to cool down the internal structure of habitat 17 comprising the walls, concrete, bricks, rocks and stones, which in turn cools the air to bring down the interior ambient temperature to 26 to 28 degrees centigrade; such that vaporized water also raise the moisture level of habitat 17 to the desired parameter. Moist air being less dense as compared to dry air rises to the ceiling 194 or roof 97. It is discharged via ventilation ducts 197 and access ways 12 while fresh air inducted establishes and maintains a natural draft in habitat 17. Ducts 197 may be covered by fine mesh and perforated screens. Motorized exhaust fans 217 and ventilators 218 controlled by thermostats 207 may also be used to cool and regulate the temperature of habitat 17.

Wall mounted fan 216 may be used to enhance the rate of water evaporation. Forced draught fan 217 may be run to augment ventilator 218 to keep the habitat 17 cool. Additional units of fans 216 and 217 may be run during hot and dry weather conditions to maintain the coolness and atmospheric moisture content of habitat 17. Variable speed drive may be used to control the speed of the fans. Such that in time of abnormal conditions or in case of equipment failure, manual intervention may be required to repair malfunctioning devices, or resolve any other problem. Or, stand by units of fans 216, 217, 218, 250, etc. may be run; additional water pumps run to discharge water through shower nozzles 214.

To regulate the relative humidity in swiftlets habitat 17, water in containers may be placed beneath ventilation ducts 197 to boost moisture levels in habitat 17. Water stored in overhead tank 209 may also be sprinkled on spongy, absorbent and fibrous materials such as newspapers, hemp, jute sacks, etc. in a container 210 or spread out on the concrete floor or walls at regular intervals. The evaporated water vapor provides habitat 17 with a relative humidity of 75-90 percent. Artificial water fall from spray nozzle 214, pool 215; mists generated by fans 216, motorized mechanical humidifying fans 250 and/or fogging pumps 205 controlled by humidistat 206 may also be used to maintain a constantly high humidity in the habitat. Maintaining habitat humidity is important as it ensures better quality of nests produced, with edible nests being larger and thicker. Maintaining the right humidity is especially important at night as swiftlets returns to rest and builds their nests mostly during night time. Good quality edible nests comprise 100 to 120 pieces per kilogram.

Timers may be used for controlling equipment but should be avoided where possible in preference of fully automated systems which accords real time measurement, monitoring, corrective actions and rectification of short-comings in micro-habitat environment 17*a*. Automated temperature sensors and humidity sensors comprising thermostats 207 and humidistat 206 may be installed at strategic points in the facility linked to a local controller to control and regulate the environmental conditions of micro-habitat cell 17*a* to the desired temperature and humidity set points; and to trigger and initiate immediate corrective actions, in order to make adjustments to rectify any off-sets. Automated equipment present in each micro-habitat cell 17*a* may make the necessary adjustments independently. Humidistat 206, thermostat 207 and the local controller may be integrated with such fans, water pumps, ventilation ducts, other ancillary equipment, software and hardware to enable automatic adjustments to be made to maintain the internal climatic parameters in micro-habitat cell 17*a*. Such data, automated actions and reactions taken by the local controllers may also be linked and transmitted back to the remote central control center for record purposes and to monitor the overall health of each micro-habitat cell 17*a* present in the production facility 11, 14, 100, 200 and 356. Each production facility may comprise millions of such micro-habitat cells 17*a*.

Brightness of habitat 17 is well controlled due to the absence of any window. Swiftlets-housing structure 200 may be configured without any window except for the presence of ventilation ducts 197 and access ways 12 to maintain an air circulation. Access-ways 12 also serves to provide an entry and exit point for swiftlets. Internally, a wall-shade 201 placed directly in front of access ways 12 may be used to limit or block excess external lights from directly entering habitat 17. Swiftlets and air entering from access-ways 12 may be arranged to pass through an arrangement of boards, twists and turns designed to block direct sunlight from entering the habitat 17. Access-ways 12 may be positioned near to the ceiling 194/or upper part of a horizontal partition 212. Portable photometers and photo-detectors may be used to measure the luminous intensity or the darkness of micro-habitat 17*a*. Infra-red lamps and IR imaging and vision enhancement equipment may be used for working in the production facilities such as harvesting, cleaning panels, swapping replica nest cups, etc. in order to minimize "visible" disturbance to the swiftlets. Just as IR lights are invisible to naked human eyes, IR lights may not be in the visible spectrum range of swiftlet's vision. Double doors with a corridor or empty space in between may be installed on human access ways of swiftlets shelters to block out entry of external light. Bird shit may be spread out on the floor 195 to provide olfactory stimulation of "homeliness."

A centralized control center may be established for overall control and coordination of activities in the swiftlets farm 113 including: monitoring both the external and internal environment of production facility 100, 200 or 356 by means of CCTV cameras, VDU panels; computerized distributed control systems (DCS such as Yokogawa/or Honeywell) monitoring of the habitat 17*a*, 17; make corrective adjustments, deploy personnel to check, repair and rectify defects; it may also be programmed to alert the farmer or console technicians of any drastic changes by means of audible alarms, flashing lights and printable records; control of power supply to provide lights, run the lifting and hoisting systems 82, 86, 90. The computerized DCS controls may also be used for continuous monitoring of the swiftlets habitat 17 and for providing instantaneous response to enable manual or automated adjustment of habitat conditions and climatic parameters comprising brightness, temperature (26 to 28 deg. C.), humidity (75 to 90%); control water level in tanks 209, pools 215; control sludge farm's waste disposal; monitor waste-effluent discharge to the open water-ways in order to prevent pollution of environment; coordinate insects-feed production, and deliveries of insects supply from externally located insects production facilities to the farm 113; proper management of nest harvesting, total quality management (TQM) of the production complex and artificial eco-system 100, 200, 356. Such that all critical activities in the swiftlets farm 113 may be authorized, directed, coordinated and controlled from this central control center, the central nervous system (CNS) of swiftlets farm 113.

Other activities includes co-ordination of: the statutory inspections of mechanized lifting systems; preventive maintenance such as regular checks and servicing; directs production personnel taking charge of dedicated sectors of the artificial eco-system; monitor weather conditions to activate opening of roof top 97 trap doors 110 to prevent wind lift damages; pest control activities and cleaning of nesting panels 69; monitoring of swiftlets breeding biology, population and distribution demographics in the eco-system in order to avoid habitat over crowding, and assist in the planning and construction of new swiftlets housing structures; directs harvesting activities of the production facility, monitoring the productivity of each sector, zone or micro-habitat 17a; monitor movement, storage and transportation of all goods, products and merchandize comprising swiftlets edible nests. The main objectives being to ensure safe occupation of the breeding facilities and artificial eco-system 100 and 200 by swiftlets 61 for the production of swiftlets edible nests 62. The central control center working in cohesion with field personnel assigned to take charge of dedicated zones of the production complex may also monitor the external farm environment and surroundings for security and safety threats, incursions by airborne predators; unwanted intruders, thieves, nest robbers, poachers, activate emergency intruder alerts, etc; directs security guards to respond; call for additional resources, and to activate deployment of external help from the government authorities such as forestry, agricultural, veterinary departments, etc. accordingly.

Figure 4A:
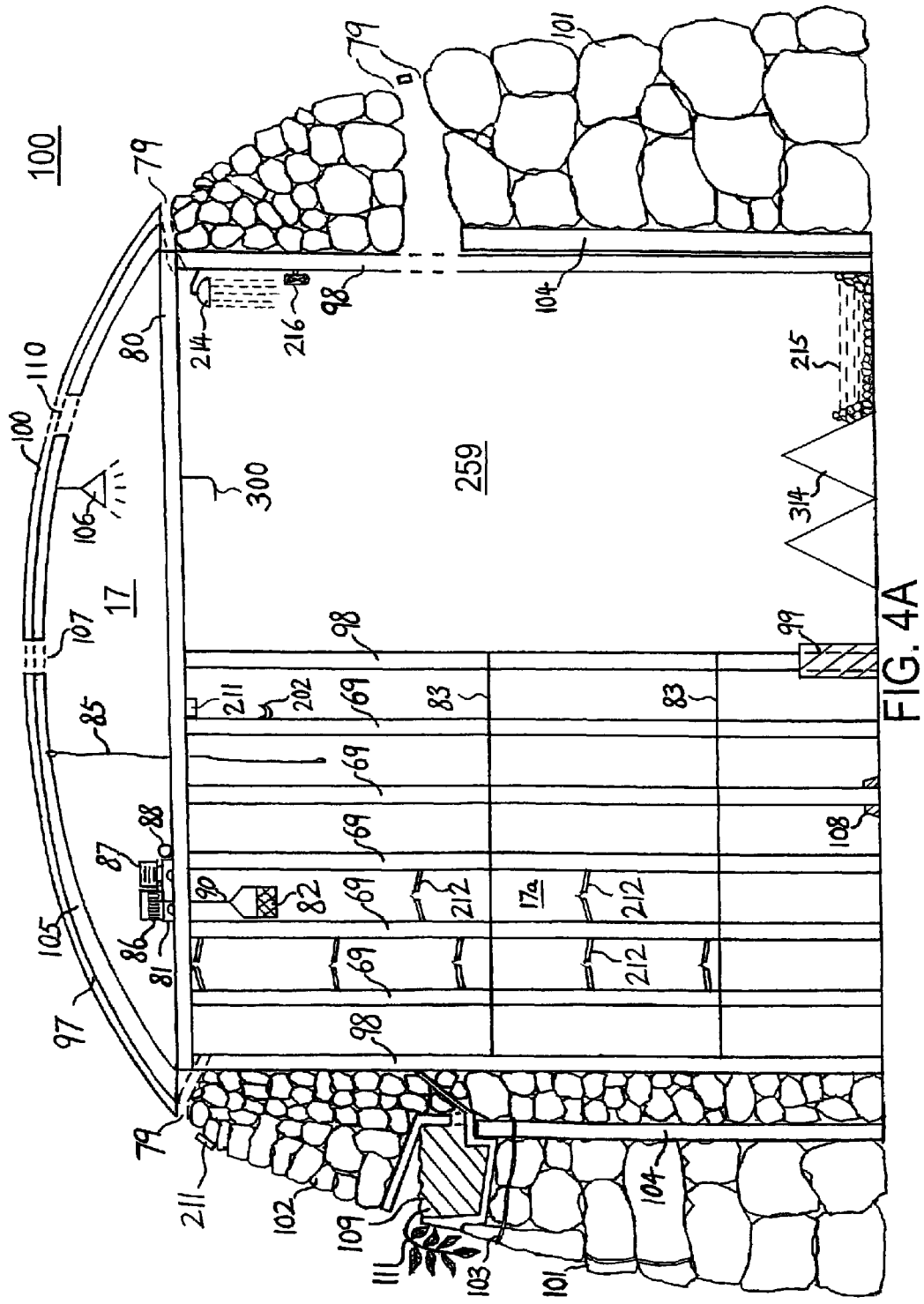
FIG. 4A shows additional features, modifications and adaptations which may be incorporated into caves system 100.
Figure 4B:
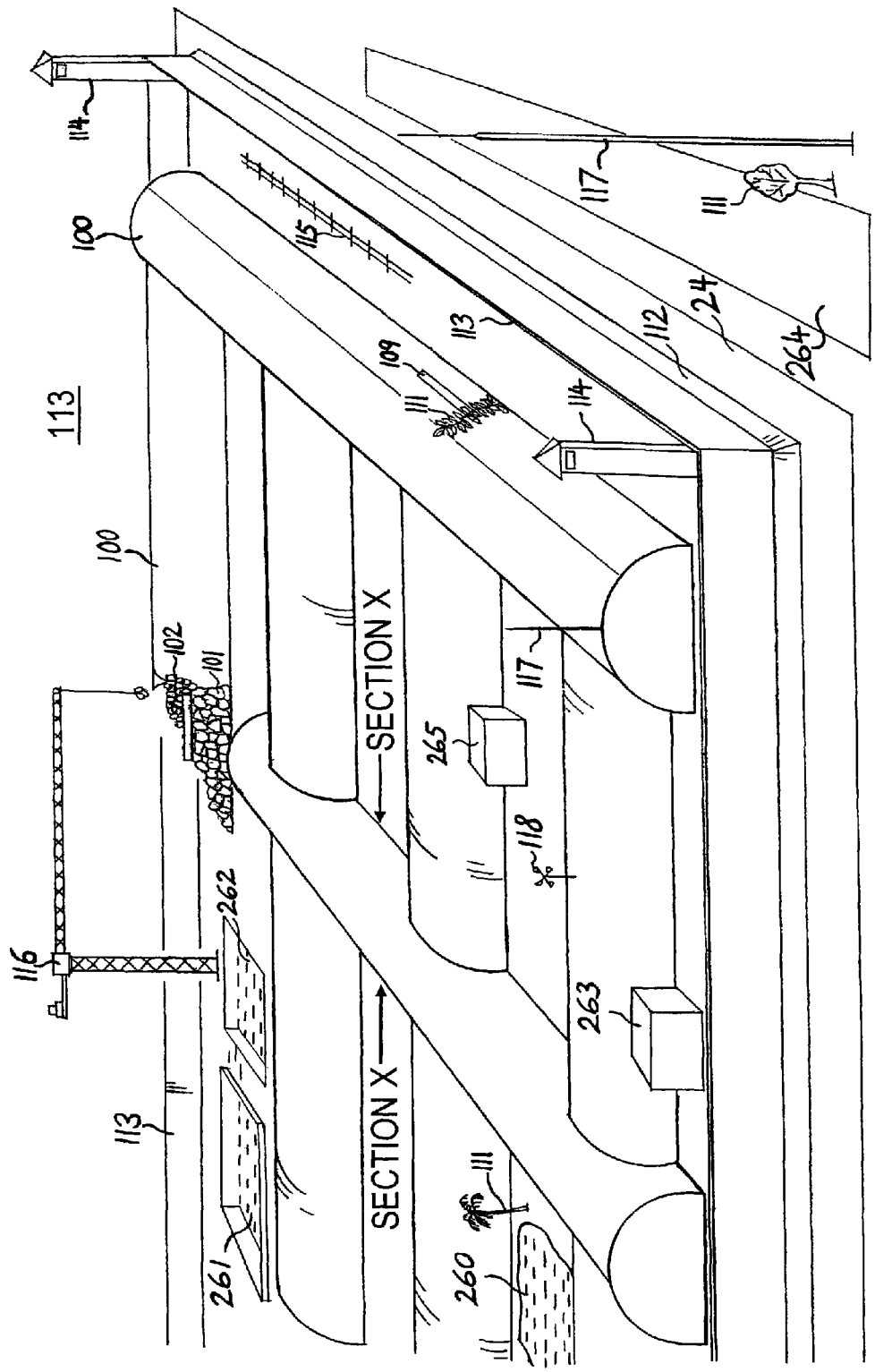
FIG. 4B shows additional features and facilities which may be incorporated into the swiftlets farm 113.

FIG. 4A shows the cross-sectional view X-X of FIG. 4B and illustrates further disclosures of the inventions which may be incorporated into the swiftlets breeding cum edible nests production facility 100. Water pools 215 may be constructed inside of the man made caves system, including a circulatory system to pump water in the pool high up the cave near to girders 80. The water is then discharged by means of shower heads and spray nozzles 214 to create a shower of fine water droplets falling down from the roof-top, hundreds of meters high. Or water may be discharged onto the wall formed by rocks 101 and stone 102 or, wall 104 creating a falling wall of water cascading down to pool 215. Evaporation of water cools the wall and rocks, which in turn cools down the surrounding air bringing the ambient cave temperature to 26 to 28 deg. C. The evaporated water in turn saturates habitat 17 providing a relative humidity of 75 to 90%.

In addition, fans 216 mounted on the rock wall behind the falling water droplets may be run blowing air to vaporize the water droplets to increase humidity to 75 to 90% and at the same time, cooling down the habitat 17 to 26 to 28 degrees C. The falling water is collected as it falls back into the retention pool 215 located directly below and re-circulated to the spray nozzles 214. Water falling on to the rocks 101 may have the run-offs diverted back to pool 215. Evaporating water absorbs heat from the rocks which in turn cools down the habitat 17. Intermittent top up from an external source by means of an automated float-pin mechanism may be used to maintain the pool level. To prevent mosquito larvae from breeding, abate may be used. Or aquatic animals like fish may be raised in water ponds 215.

An arrangement of horizontal panels 212 as illustrated in FIG. 2A may also be incorporated into the vertical nesting panels 69 of caves system 100. Such that the vertical height rising hundreds of meters high may be separated by boards 212 into a number of partitions or micro-habitat cells 17a, similar in utility purpose to the horizontal structure created by wooden or cement floor boards 192 which restrict and stop the vertical movement of swiftlets. However, panels 212 may not be designed to take heavy weight. Access to work at height is achieved by means of mechanized lifting system 82, 86, 90. Guano 224 deposited on the top surface of horizontal panel 212 may be removed periodically by way of disposal chute 225 via trap door 226 as illustrated in FIG. 2D. Nest cups 202 may be attached to nesting panel 69; speakers and tweeters 211 affixed near to passage-ways 79 and internally.

In another embodiment of present invention, large spacious cave chambers 259 may be included in eco-system 100 for use as internal feeding grounds such that discharge nozzle 300 of the aerial feed dispensing system may be mounted high up on girders 80 and 81; or near to the ceiling for dispensing insects and worms comprising cockroaches, crickets, grasshoppers, beetles, ants, larvae, etc. from great heights. Aerial feed dispensing system 300 is capable of simulating, emulating and pandering to the natural feeding habits of the aerial insectivorous swiftlets 61. Feeding trucks 290 and primemover 293 may be parked externally, next to structure 100, discharge hoses 289 hooked up to collection drum 304 and feed pumped up discharge pipe 301 to nozzle 300. Such feeding chambers 259 designed into the cave system 100 provides a communal area for swiftlets to interact, feed, drink, play and display mating flights. Cavity 259 devoid of nesting structures may also be equipped with lighting 106, skylights 107, vertical perching feeders 314. Swiftlets may drink from pool 215 or from the water sprays discharged by spray nozzles 214. Such a structural configuration enables the basic necessities of live comprising food, water and shelter to be provided at one single communal gathering point for the colony of swiftlets.

In an alternate configuration, all cave passage ways 79 may be shifted and repositioned at the walls of feeding chamber 259 such that the cavity provides the main conduit and transit passage for all the swiftlets living in one section of the caves system 100 to enter and exit between micro-habitat 17a and the external range. To satisfy the crepuscular feeding habits of swiftlets, feed materials may be arranged for dispersal at dawn and dusk, in particular, between 0630 to 0830 hours and 1730 to 1930 hours daily. To provide lighting, spotlights 106 may be added on the ceiling and on the ground facing upward to enable swiftlets to see and home-in on the airborne food supply dropping down from hundreds of meters above. Audio cues may be used to alert residential swiftlets via speakers and tweeters 211 such as the tolling of a bell, siren, whistle, feeding sounds, special song, etc. Prior to and during such routine feeding spotlights 106 switched on to illuminate the feeding chamber 259 and audiometric cues broad cast. Such that upon hearing and seeing this audio-visual cue, swiftlets 61 knows by habitual routine ingrained into their brain that food is on the way; rushing into feed chamber 259 to be feted to a sumptuous meal of insects 297. Lights, music, feast and drink!

In an alternative arrangement, apart from water and soil retention pit 109, all the external surface of caves system 100 may be covered by a layer of soil medium. A thick layer of earth may be piled up on the lower part of the structure up to pits 109 to form a hill. Soil retention higher up may be achieved by means of serrated staircase terraces, culverts, shallow pits, groves and trenches built into the stones 102 and rocks 101 walls for the cultivation of grass and cover plants 111 to provide shade. Transplanted grass and fast growth varieties of seed grass like alfalfa, or shrubs with strong fibrous roots may be planted to prevent erosion. Grass of the genera *Agrostis* spp.; *Festuca* spp.; *Zoysia* spp.; *Axonopus* spp.; *Eremochloa* spp.; *Cynodon* spp.; *Paspalum* spp.; *Poa* spp.; *Lolium* spp; in the family Poaceae may be cultivated as cover. Other types of grass such as St Augustine grass *Stenotaphrum* spp.; *Ruppia* spp.; *Boehmeria* Spp.; *Cabomba* spp.; *Galium* spp.; *Cymhopogon* spp.; *Ophiopogon* spp.; *Cyperus* spp.; *Lipidium* spp.; *Cladium* spp.; *Cochlearia* spp.; *Oxalis* spp.; *Zostera* spp.; *mimosa* spp.; wildflowers, etc. may also be cultivated as well as a host of unclassified tropical flora endemic to equatorial rain forests. Seeds may be broadcast by way of hydro-seeding; stolons and rhizomes may be dispersed by sprigging. Such a planting process utilizes a slurry of seeds and mulch transported by tank truck and sprayed on the planting area uniformly. Mulch helps to maintain the moisture level of the seedlings and the slurry contains other ingredients such as fertilizers and additives. Such that the whole artificial caves system 100 may be transformed into a wave of rolling hills covered with lush foliage and greenery. A man-made swiftlets breeding eco-system 100 converted, integrated and transformed into an ecologically friendly setting.

Vegetative cover plants 111 may also be cultivated externally to envelop, cover and shroud the shelters comprising swiftlets-housing structures and buildings 11, 14, 100, 200, 356; or, protective cage structure 21, 22 of a production facility comprising transformed cliffs and valleys 16, 19, 20; providing an ecologically friendly farm environment, and at the same time external shade to keep habitat 17 cool. Tropical climbers such as rattan rotan sage, scientifically known as *Calamus caesius* cultivated for shade may also be harvested for commercial uses in making furniture, etc. Taxonomic grouping of rattan is as follow: Kingdom: Plantae; Division: Magnoliophyta; Class: Liliopsida; Order: Arecales; Family Arecaceae; Tribe: Calameae; Genera: *Calamus, Calospatha, Ceratolobus, Daemonorops, Eremospatha, Eugeissonia, Eugeissonia, Korthalsia, Laccosperma, Metroxylon, Myrialepis, Oncocalamus, Pigafetta, Plectocomia, Plectomiopsis, Raphia, Zalacca, Zalacella*. Wood of the belian trees, *Euzideroxylon zwageri* may be used for construction of facilities. This is an iron-wood endemic to the island of Borneo and traditionally used by nest collectors in constructing the climbing apparatus together with rattan reaching hundreds of meters up to the cave roofs to collect edible nests built by wild swiftlets. Such amenity plants being cultivated for utilitarian purposes, for the provision of shade and protective cover. Lianas and climbers comprising vines and ivies from the genera *Clematis* spp., *Vites* spp., *Hedera* spp., *Calamus* spp. (rattan rotan sage), *Piper* spp. (pepper plants), or other types of tropical creepers prevalent in the rainforest may also be cultivated. The genus of *Clematis* spp. comprises 297 species. Leafy vegetable crops such as sweet potatoes, tapioca, turnips, beans; ground creepers and climbers, carpet grass, etc. with fibrous roots may also be cultivated in water and soil retention pits 109 on the roof tops of structure 100 and 200. Such crop plants may have fibrous secondary roots and climbing tendrils but without damaging penetrative roots. Certain plants like vines and ivies may have penetrative roots which enlarge cracks and crevices causing long term damages to the structure. Different types of plants may be selectively arranged to be grown at different places of the structures compatible with their design and utility purposes. A thorny plant *Rosa Sericea* f. Pteracantha, may be planted near perimeter wall 113 to discourage poachers.

FIG. 4B illustrates further disclosures of the inventions which may be included in the swiftlets farm 113 enclosed by a high wall 113. Water pools and lakes 260 may be constructed externally surrounded by trees, vegetation and aquatic plants 111 to provide a supply of airborne insects to satisfy the crepuscular feeding (at dawn or dusk) habits of swiftlets. Swiftlets may drink from the water pools 260 while swiping or skimming in low passes across the water surface, giving rise to the expression "drinking on the wings." Water supplies may be sourced by means of collective drainage facilities, or acquired by diversion of streams for maintaining the level of water tank 209, internal water pools 215 and external water pools and lakes 260.

Also illustrated in FIG. 4B are effluent water treatment ponds 261 and 262 for treatment of farm animal wastes including filtration facilities which may be constructed to treat contaminated effluent water produced by the farm 113, such as washing, flushing and hydro-jetting water used for cleaning nesting panels 69. Such contaminated water may be channeled into the treatment facilities 261 for treatment especially settlement and filtration. Standard industrial equipment comprising aeration pumps, motorized paddles and associated filtration facilities used for farm animal waste-water-treatment may be employed to treat effluent water prior to discharge into the open water systems. Clean treated water may be discharged while the concentrated sludge may be diverted into retention ponds 262 for further biological treatment prior to discharge into the natural waterways. Aquatic animals and plants may be used for waste-water treatment to prevent, control and eliminate environmental pollution. Aquatic animals such as bugs, bacteria, fish, etc. may be bred in pond 262 to eat, decompose and break down the organic waste; while aquatic plants such as water hyacinth (*Eichhorinia* spp. derived from the family Pontederiaceae); lotus (*Nelumbo* spp. derived from the family Nelumbonaceae); water lilies (*Victoria* spp., *Nymphaea*) etc. may be cultivated in ponds 262 to treat such aqueous waste generated by the farm. Such aquatic plants may also be cultivated in lakes 260 surrounded by trees 111.

The organic waste sludge may also be removed from retention pond 262 to be used for feeding huge populations of wild breeding flies, dung beetles, cockroaches, etc. in wild insects breeding apparatus 264, cockroach and crickets breeding apparatus 263 and 265 to produce swiftlets feed in a cyclical eco-system enabled by means of human intervention and present invention. Cockroach breeding apparatus 263, grass hoppers and crickets breeding apparatus 265 may be constructed in the surrounding of the farm to provide feed materials. Wild insects breeding apparatus 264 may be built in open areas inside or outside of the farm compound surrounded by trees 111. Guano 224 in production facility 100, 200, 356 may be shoveled and physically removed for use as fertilizer for plants 111; feed for cockroach, crickets, earwigs, dung beetles and large populations of wild breeding flies.

Once the macro-habitat structures are ready and the necessary micro-habitat adaptations, modifications and conversion have been undertaken, habitat 17 may be considered ready for occupation. Wild swiftlets may then be enticed and attracted to the vacant habitat comprising man made structures 11, 14, 100, 200, 356 by means of recorded playback of bird calls broadcast over audio systems including speakers 211 repeatedly day and night until a small colony of birds has been established naturally, migrated and adopted the shelter as their home. This "music of the birds," chirping sounds which are unique only to swiftlets may be played non-stop to attract new birds and to keep the residential swiftlets from straying such that they keep returning back to their adopted home and shelter.

The recorded bird calls may be broadcast by means of computerized musical-audio-visual equipment including stereo, hi-fi sound systems, speakers, amplifiers, tweeters; fixed analog and digital musical-audio-visual home entertainment systems; and/or portable and mobile consumer electronic equipment commonly available over the counter. Such musical audio visual systems may be specifically configured for the sole purpose of attracting swiftlets 61, speakers and tweeters 211 may be mounted inside on panels 69 and outside of the shelters next to access ways 12 and cave passage ways 79; for maintaining the resident population and for attracting other wild roaming swiftlets to move in thereby increasing the residential swiftlets population. Such electronic equipment may be configured to replay the bird calls repeatedly, over and over, again and again, 24 hours every day, 365 days a year.

In another embodiment of present invention, audio broadcast of bird calls may be augmented with visual graphic images of nesting birds projected and displayed on the walls of such shelters and swiftlets-house 11, 14, 100, 200, 356 by means of audio-visual projection units and/or visual display units. Such visual graphic images may comprise static and/or moving display not unlike a movie. The displayed images may show swiftlets or groups of swiftlets playing, interacting, mating, building nests, nesting, brooding, feeding chicks, etc. Broadcasts of mating calls may be made together with visual images of aerial display depicting mating dances performed by male swiftlets to attract females; and images of copulating swiftlets may be used to enhance swiftlet's sexual urges and to trigger their conjugational desires; such that combined with hormonal stimulation dispersed by means of aerial release in habitat 17, or mixed in with feed materials; swiftlets may be enticed and stimulated to kick off their mating urges and/or to kick start an earlier breeding season. Chemical attractants and stimulants such as avian sex hormones may also be applied to nesting surfaces such as nesting panels 69a, 69, 196, nest cups 202, bricks 242, 243, 247 by means of painting, soaking, spraying, etc. Audio visual broadcasts may be recorded and configured for low light showing in a dim interior, such that brightness of the images may be adjusted to be optimally visible, but not too bright.

Numerous types of such bird calls and visual images may be collected from the wild and from man made shelters 11, 14, 100, 200 and 356. Such audio cum visual graphic images may be recorded and collected by means of modern analog or digital computerized musical-audio-visual equipment capable of capturing, storing and replaying the stored musical-audio-visual data comprising video cassette recorder (VCR), video camera, digital camera, movie camera, closed circuit television (CCTV), etc. The captured data may be stored on storage memory means comprising magnetic tapes, video tapes, video cassettes, digital audio tapes; video disc, CD-ROM, CD-RW, CD-R, compact discs (CD), video compact disc (VCD), digital versatile disc (DVD), HD-DVD; computerized multi-media storage mediums such as integrated circuit microchips, silicon-chips, flash memory chips, hard-disk drives, etc. And broadcast by means of computerized digital musical-audio-visual equipment and home entertainment systems comprising visual display unit (VDU) and flat panel display units such as television screen (CRT), personal computer monitors, plasma screen, liquid crystal display (LCD), etc. to attract, pamper, pander to and gratify the sensory perceptions of swiftlets 61.

In another embodiment of present invention, replicas of robotic swiftlets akin to real live swiftlets in visual appearance and physical form may be used to attract, entice and induce wild breeding swiftlets to move in to stay at swiftlets shelter 11, 14, 100, 200 and 356. Such fake, mock, imitation, replicated mannequin swiftlets may be used to masquerade, con, dupe and deceive living wild swiftlets into believing that the shelter is already inhabited by a colony of residential swiftlets, encouraging them to adopt, migrate and move in to make it their breeding ground. Each individual electronic model bird may be equipped with capabilities such as the bodily movement of wings, body, legs, climb or move about on the nesting panels, etc.; giving out, issuing and producing bird chirps including vocalizations, bird calls and echo-location clicks that are well within the range of human hearing (by means of minute speakers attached to the body); body warmth (electrical heating coils or heat generated by motors producing movement), body odor, attractants, hormones (impregnated in a slow releasing agent such as gel, jelly, thick viscous liquid), etc. Such computerized robotic birds may be powered by electrical wire-line cables or rechargeable batteries, with charging points mounted directly on panel 69. Such that these mock swiftlets only need to perch in pre-designated slots to establish physical contact with the chargers.

In the wild, males perform aerial displays to attract females and mating takes place at the nest. Both the monogamous birds take part in caring for the nestlings. Such real life actions and movement of swiftlets may be recorded and programmed into the computerized software such that these actions may be displayed realistically, replayed and re-enacted physically by the robotic swiftlets with uncanny resemblance. Such replicated actions may be directed by means of a PLC chip; or a computerized software program may be developed and used to control and coordinate the group activities of different individual birds such that they are versatile enough to perform any colonial masquerading and imitating tasks, antics and gimmicks as desired. Transmission mode between the computer-controller and the robotic swiftlets may be carried out by means of wireless and wire-line systems commonly available such as Blue-tooth, Wi-Fi, RFID, broadband, radio frequency, etc. Groups of such mechanical model birds may be configured and mounted on a vertical panel such that they appears to be playing together, interacting with each other as colonial birds such as swiftlets do; move about, bird antics, gimmicks, nuptial flights, aerial dance, "fly" short distances (in the vicinity of the panel) by flapping their wings while in actual fact, the mannequins are moved about by telescopic (retractable and extendable) and flexible metallic holders or struts attached to their bodies. At the entrance 12, the holder may be of the same color as the background.

Alternatively, the robotic swiftlets mounted on wheels may be held and attached to a vertically positioned U-shaped board by means of magnetic field. The magnetic field of the robotic swiftlets and the vertical surfaces of the board may be of opposing poles while the magnetic field of the curved bottom portion of the U-shaped board may be the same as the robotic swiftlets. Such that the mannequins are attracted to and attached to the vertical portions facing each other; while the curved bottom portion opposes and repels the mannequins. Electro-magnets mounted behind the vertical surfaces may be moved such that robotic swiftlets follows such movement and moves on roller wheels into desired positions and arrangement. When the electro-magnet holding a particular robot to the vertical surface is de-energized, the robot falls to the curved bottom portion. Due to the effect of magnetic-levitation caused by homologous magnetic effects (same pole) the falling robot is propelled and levitated upward to the opposite vertical surface without touching the bottom loop.

In "flight," the robotic swiftlets may be configured to send out singular or double echolocation clicks; and just before landing on the vertical perch, it may send out vocalizations similar to living swiftlets; possibly to warn other perching birds of his approach and eventual landing. In the dimly lit interior of the shelter, the darkened metal holders may not be discernible. Thus giving the impression and appearance that the group of swiftlets are interacting, playing, mating, squabbling, quarrelling, fighting over space, perches, food, etc. Genuine swiftlets feathers may be attached to the robotic swiftlets to enhance their reality. A group of such robots may be positioned at the entrance of access-ways 12 and passage-ways 79 to advertise the shelter to passing swiftlets and attract them to inspect the habitat. The robots may also be used to demonstrate and show young chicks and adult swiftlets the stationary peck-feeding habits used by chicken and other avian species. Such that live swiftlets follows the example and adopts such habits to feed on insects and worms present on the horizontal steps 315 by clinging to the serrated vertical surface 316 of vertical perching feeder 314 and cradle feeder 330. Broadcast of mating calls and the exhibition of physical, demonstrative and provocative display of copulation and mating activities by the mannequin robot swiftlets may be combined with timely release/or application of mating hormones and avian sex hormones to entice, arouse, stimulate and provoke live swiftlets into satisfying their sexual urge; such that an increase in mating cum nesting frequency leads to an increase in edible nests production and farmed population. Other desirable and manipulative avian habits and behaviors may also be taught and imparted to live swiftlets by means of such robotic teachers.

A micro-habitat nest building environment 17a made up of artificial receptacles comprising crevices and recesses 57, ledges, eaves, indentations 59; extensions and protrusions 60, claw lines 245, claw holes 246, nesting channels 76 and replicated nest cups 202 may be constructed on the vertical walls of shelters 11, 14, 100, 200, 356 and nesting panels 69a to encourage swiftlets to build nests in. Such that naturally occurring materials like sea shells may be used to replicate the form and shape of indented hollow nesting cavities 57, but protrudes and extends out from the vertical wall surface. Coconut shells cut in halves, quarters or eighths, may be configured into crescent shaped cups to form dummy cups 202 which may be attached and affixed to the vertical walls and panels 69 to provide ready made nest building receptacles. Artificial receptacles comprising replica nest cups 202 may be permanently affixed to wall 191.

FIG. 5A to 5G illustrates details of replica nest cup 202. FIG. 5A shows the frontal perspective and view of a nest cup, a crescent shaped receptacle/or apparatus forming a micro-habitat environment 17a for swiftlets to build their nests in. FIG. 5B shows the rear view of FIG. 5A with four attachment legs or pins 266 mounted on a back plate 267, while FIG. 5C shows the plan view of FIG. 5A. FIG. 5D shows the side view of the replica nest cup 202 with attachment legs 266 which may be push-slotted into compatible pre-designated holes 203. Removable cups 202 may be designed with extension pins or legs 266/or attachment clips 268 such that individual nest cups 202 may be made independently detachable and replaceable. Replica nest cup 202 with attachment legs 266 may be plugged into matching compatible fitting holes 203 built into the vertical surface of the substrate. They may be easily removed for cleaning, repair works and nest harvesting. The protruding legs or attachment pins 266 may comprise singular, twins or multiple extensions which may be slotted, pushed and plugged into slots 203 built into the nesting panels 69 or walls 191. Nests cups 202 may be removed by pulling or plucking them from the slots, and swapped with spare cups which are plugged into exactly the same fixed slots 203. Swiftlets being territorial birds, return to precisely the same nesting spot. Such a plug-use-pluck configuration enable flexibility, portability and ease of deploying nest cups and production resources where applicable and desirable; it facilitates cleaning and repair works of nesting panels 69, boards 196, walls 191 and nest cups 202 to be carried out with ease. Harvesting of edible nests is made easier for collectors as the nest gatherers only need to swap "full" cups 202 with "empty" cups 202. Nest gatherers un-plucks full cups containing fully built edible nests and plug in spare cups in exchange, without the need to forcefully scrape or prize firmly attached nests from the substrate which is difficult and time consuming. Such a cup swapping method improves harvesting efficiency and manpower productivity of the farm. In another embodiment, nest cup 202 may also be attached by means of slip-on clips 268, such that clip 268 affixed onto nest cup 202 need only to be slipped on to holder 208 affixed on to the vertical surface of the substrate.

FIG. 5E illustrates nest cups 202 with hooking clips 268 attached to back plate 267 which may be slipped and hooked securely into a bracket/or saddle 208 attached to the wall 191, vertical panels 69 or boards 196. FIG. 5F shows the plan view of FIG. 5E with cup 202 securely attached to the wall by way of double slotted clips 268. Double slotted bracket 208 may be affixed permanently to the wall with screws, nails, raw bolts or rivets, and tagged with a bar-code label. FIG. 5G illustrates the side view of a modified nest cup with saw-toothed vertical front perching surface 204 and an extended back rest 267 such that edible nest 62 built inside may have the traditional extended legs to attach securely to the "walls" formed by back-plate 267. Saw toothed serrations 204 located at the front of nest cup 204 provides a convenient and user friendly surface for parent swiftlets to cling to and perch vertically while feeding, minding and tending to their chicks.

Edible nests 62 built into such artificially replicated receptacles 202 forms nice round crescent shapes which are visually appealing and "customarily desirable" to customers. Edible nests produced with such nice shapes and contours commands a higher price on the market, just like the 'cut' factor in the three C's (cut, carat, clarity) of a diamond. Other man made crescent shaped receptacles may also be used for providing dummy replicas of nesting receptacles 202 modeled after the shape of genuine edible nests to provide attractive, desirable, and provocative locations for swiftlets to build their nests in.

Removable replica nests cups 202 enables cups containing newly built nests to be removed and swapped with spare replacement cups 202 for swiftlets to build another nest. Or, a genuine but old and previously used nest built in nest cup 202 may be used in exchange, for the swiftlets to actually use for laying their eggs and raising their young. A stock of spare cup receptacles 202 may be stockpiled specifically for the purpose of swapping. In the darkness, such changes and swapping may not and cannot be seen by the swiftlets as the presence of nests may only be detected by means of tactile and olfactory senses. Such that the harvested edible nests comprises brand new nests, newly built nests which have never been used for laying eggs and raising chicks. Such nests are very clean, of much higher quality and worth more than the price of nests that have been used for raising chicks. Used nests are dirty and "contaminated" with feathers, bird excrement, dirt, impurities, etc.

Walls 191 and nesting panels 69 may also be constructed with recessed indentation 59, protruding extension 60, serrated with claw lines 245 and pocked marked with small holes 246 to provide vertical clinging at height, perching and nest building surfaces; and receptacles comprising crevices 57 in the shape of half-moon cups 202. Such that receptacles comprising such protruding, crescent shaped half-moon cups and/or recessed crevices provides an extremely attractive and appealing locality and micro-habitat for swiftlets to rest and to build their nests. Such receptacles 57 and nest cups 202 may also be integrated and incorporated into the design and configuration of nesting channels 76, panels 69a and nesting boards 196. Such channels 76, panels 69a, boards 196 and nesting receptacles 57 may be manufactured from raw materials comprising sedimentary, metamorphic, igneous, non-igneous rocks and ores such as: bauxite, granite, shale, gypsum, limestone, calcite, marble, gypsum, chalk, carbonates, silicates; clay, porcelain, wood chips, cement, concrete, high density poly-ethylene (HDPE), high density poly-propylene (HDPP), poly vinyl chloride (PVC), plastics, thermo-plastics, polymers, etc. Dimension of the crescent shaped replica cup 202 may measure 3" to 4" in length; ½" to 2" in height. Generally one standard size of receptacle may be used as a substrate, a base platform upon which nests may be securely attached and constructed. However, if required, replicated receptacles of different sizes may be made and installed to suit the needs of different species of swiftlets which may be of different sizes. The actual design, measurements and dimension of shapes and contours may be varied and modified to suit swiftlet preference. The nesting receptacles may be mounted on the vertical wall and panel 69 positioned 1 meter from the lowest point of the bottom floor board 212 of habitat 17a all the way to the roof or overhead ceiling of the cavity formed by top ceiling board 212. The distribution density of such replicated receptacles may range from 20 to 40 pieces of nest cups per meter square area. Such shallow crescent shaped cups provides an inviting, ready made substrate, structure and mould into, and upon which nests may be built. Nest cups may also be coated with avian hormonal attractants, sexual and/or olfactory stimulants appealing to swiftlets such as eggs and a gelatinous mixture comprising fragments and shreds of edible nests.

In another embodiment of present invention, replica nest cups and individual nesting locations where edible nests are constructed may be labeled with identification tags and labels such as bar codes and/or any other codification system to differentiate between the multitudes of nests built in a production facility. Such that each and every edible nest building location, each specific niche staked and claimed by one breeding pair of swiftlets in the colony, may be properly identified, labeled and tagged with a series of unique identification numerals/or symbols. Some swiftlets builds early while some builds late. New nests built in non-labeled spots of the micro-habitat, or unoccupied replica nest cup 202 may belong to a new breeding pair of first time parents (newly matured fledglings above one year old), or a new pair of swiftlets which have migrated and adopted the shelter as their home. When a breeding pair lost its first nest, the territorial swiftlets will build a new one in exactly the same nesting niche or spot. Such a system of electronic identification, tracking and monitoring enables good harvest management of nests; it avoids and prevents mistaken collection and unknown duplicate harvesting of nests from individual breeding pairs. Such mistakes may prove detrimental to the farm as over harvesting causes swiftlets to abandon an established habitat to move to another location/or shelter en-mass.

During the start of a nesting season, an identification tag may be affixed to each and every nesting site before the edible nests are taken. Each of the tags identifying the nesting niche may be scanned by a portable scanner. Such scanners may comprise commercially available bar code scanners used in stores and supermarkets. Stored data may be downloaded and transferred from portable field scanner units to a computerized central harvest management database for record, monitoring, audit, administration and planning purposes. During subsequent collection rounds, all tags must be scanned by the collector before any nest is taken. Only nests built on unrecorded sites in the habitat, or those without any ID tag may be harvested. To prevent double harvesting, the collector avoids taking any nests from nesting sites that appears on the record, which means that it has been harvested once during the current nesting season. Radio frequency identification (RFID) tags may also be used for the purpose of harvest management. Alternatively, duplicated copies of such permanent tags may be affixed to each replica nest cup and the nesting sites such as fixed holes 203 or brackets 208.

The scanner software may also be configured to give different audible signals to indicate the status of scanned identification tags; such that upon reading an identification label matching the recorded first harvest in its memory, the scanner emits a special audible tone, indicating that the tagged nesting site has been harvested once before; while a new unrecorded tag generates a different audible signal indicating its clear status. Such a computerized harvest-control-management system ensures that only the first nest built by a particular pair of swiftlets is taken; the second nests built must be left alone for the breeding pair to lay their eggs and to bring up their young. The second nests built will only be collected after they have been used for breeding and abandoned by the young fledglings, or the juveniles have been collected and brought back to greenhouse 33 for training, manual raising, transfer and transmigration to new production facilities. Such data may also be used for annual tracking of production, statistics and customization of customer preference. A regular customer may prefer nests produced from certain locations, or from specific swiftlets that they have been used and accustomed to taking (as the older the swiftlets are, the more mellow their edible nests). They can thus try out, choose and select nests produced by specific breeding pairs of swiftlets to be reserved for individual customer requirements and needs.

In another embodiment of present invention, young chicks and adult swiftlets may be tagged with RFID chips for identification and tracking purposes. RFID chip readers may be installed at access-ways 12 and passage-ways 79 to track and monitor their movements, change of nesting niches, habitats, etc.

Natural rocks containing a high amount of iron ores appears reddish due to the presence of hematite or iron-oxide ($Fe_2O_3$) while rocks with a high content of copper ores or copper oxide (CUO) appear greenish in color. Nests built on rocky surfaces containing a high concentration of such minerals naturally absorb them, became stained with and exhibits the natural color of these rocks and stones. Such that rock caves with a high content of iron ore ($Fe_2O_3$) produces reddish stained edible nests called "blood-nests" or "bloody-nests." While those with a high content of copper ores produces greenish stained edible nests. Chalk and lime-stones comprising calcium carbonate which is white in color, does not stain the nests. This natural process of absorption, adsorption, percolation and staining of natural colors of minerals by edible nests from the substrate may be employed to produce edible nests with different colors, visual appeal, demand, qualities and prices. The texture, crunchiness, aroma, etc. may also be affected by different mineral concentrations. Such colored edible-nests have been promoted by marketers as being of special attributes, such as being preferred for treatment of heat or cooling medicinal purposes. Bloody-nests may be worth more than white nests.

In another embodiment of present invention, such naturally occurring rocks containing different minerals and rock salts may be used to produce a variety of desirable colored edible nests appealing to connoisseurs. The utility application of the basic underlying principles and structural configuration in which colored rocks may be used to produce colored edible nests may comprise four main methods such as: directly carving nesting surfaces and nest building substrate from colored rocks; culturing, in which desirable rocks may be ground into powder, attached with a binder, shaped in a mould and set to produce the desired form; coated with a layer of cultured mineral rocks; or pieces of cut and sliced natural rock tiles may be affixed to the nest building substrate.

Carving: Nesting surfaces comprising panels 69, modified vertical panels 196, horizontal boards 212, ceiling 194, walls 191, bricks 242, 243 and nest cups 202 may also be mass produced and manufactured by directly carving them out of mineral rocks such as reddish hematite by means of machineries. Draining holes 56 may be incorporated into the bottom of such receptacles 202 to prevent collection of water. Stones and rocks containing different minerals and salt formations producing other colors such as green, yellow, pink, brown, blue, etc. may also be used to produce nests of different colors to suit the personal preference, likings, appeal, tastes and traditional beliefs in the medicinal-curative powers and properties of natural minerals, plants, etc. ingrained into the psyche of customers.

Culturing: Nesting surfaces comprising vertical panels 69a, modified ceiling mounted vertical panels 196, horizontal boards 212, ceiling 194, walls 191, bricks 242, 243, 247 and nest cups 202 may also be made from cultured materials, for example cultured marble. Cultured marble is a blend of powdered marble and stone mixed with calcium carbonate and polyester resins. The mixture is cast into gel coated molds in the shape and form of nest cups. After setting, pieces of cultured replica nest cups 202 may be removed from the mold, trimmed, polished and attached to walls 191, nesting panels 69a and 196. Resins used may be synthetic resins such as epoxy resins, unsaturated polyester resin, etc. Naturally occurring resins may be obtained from coniferous trees such as pine tree, dammar tree, etc. Other resins may comprise copals mastic, sandarac, etc. Dammar gum is obtained from the Dipterocarpaceae family of trees in India and East Asia, principally those of the genera *Shorea, Balanocarpus* or *Hopea*. The sap is obtained by tapping the trees. While fossilized resins such as amber, African copal and kauri gum of New Zealand may be used in making nest cups. Vertical perching groves, ledges and recesses 57, serrated claw-holds protrusion 59, indentation 60, lines 245, surfaces pock-marked with holes 246, eaves, crevices 18, may be designed onto the cultured nesting surfaces provided by such substrates. Panels 69a, 196, wall 191, horizontal panel 212 and ceiling 194 may also be directly constructed from such materials by means of culturing.

Cultured coating: Nesting surfaces such as channels 76, crevices 18, vertical panels 69a, modified vertical overhead panels 196, horizontal boards 212, ceiling 194, walls 191 and nest cups 202 may also be coated and overlaid with a surface layer of desirable minerals. This process is similar to culturing. A mixture of powdered marble, calcium and polyester resin may be directly cast into the indented portion of replica nest cups 202 and allowed to set. The cultured layer set to become firmly attached permanently onto and into the cup. The whole nest cup 202 may be coated in the cultured mixture. Cave wall 101, 102, 104, panels 69a, wall 191 may also be coated with a layer of such desirable minerals. The surface of substrate may be roughened to provide a good base for bonding and attachment by the cultured mixture or medium. Raw materials for manufacture of such a substrate upon which edible nests may be built by swiftlets may comprise mineral rocks and ores, gemstones, precious stones, precious metals, crystals, fossilized resins, therapeutic and medicinal herbs etc. held in high esteem and value by customers and consumers.

Surface Attachment: Nesting surface comprising man made receptacles such as vertical panels 69a containing nesting channels 76, modified overhead mounted ceiling panels 196, horizontal boards 212, ceiling 194 and walls 191 containing crevices 18, cusps and shallow crescent shaped replica nest cups or saucers 202 may be overlaid and attached with pieces of red hematite to produce red colored nests. Such that rocks containing desirable minerals may be cut and sliced into pieces of rock tiles, and compatible pieces are attached by means of adhesive glues, gums, cement, rivets, wires, clips, etc. to the nesting surfaces to produce desirably colored nests high in demand and value. This is similar to the tiling of floorings and walls in buildings. All the surfaces of nest building substrate may be roughened and serrated with saw-tooth 204, lines 245 and pock marked with small holes 246 to provide vertical clinging grip for swiftlets and for building edible nests.

Replicated nest cups 202 may also be coated with layer of medicinal herbal plants such as: lin-zhi, ginseng, etc. Or the whole cup may be made of compressed and compacted medicinal herbs and plants used in traditional medicine for preventing and alleviating a host of ailments. Such traditional medicine may comprise Chinese, Indian, Asian herbal plants/or therapeutic plants used by the native populace in the Americas, Africa, Australia and Europe as remedies in treating ailments, aroma-therapy, aesthetic and religious values. The plant materials may be weaved, sewn or attached together with a natural binder. Such replica medicinal nest cups 202 provide a substrate upon which swiftlets are enticed and encouraged to build their nests. Other plant materials used may comprise fragrant wood, resins, flowers, etc. Such plants may also be grown and cultivated as cover plants 111 to provide shade in the vicinity of the farm and a supply of raw materials for making nest cups substrate.

Fragrant and scented woods used for making nest cups 202 may comprise agar wood, sandalwood, clove (*Syzygium* spp.) is a spice; cypress is derived from the family of Cuperessaceae; cedar (*Cedrus* spp.); Juniper (*Juniperus* spp.); sage (*Salvia* spp.); star Anise (*Illicium* spp.) a spice; nutmeg (*Myristica* spp.). Agar-wood or eaglewood (*Aquilaria* spp.) is obtained from trees of the taxo-family Thymelaeaceae, in particular *A. agallocha* and *A. malaccensis*; sandalwood, obtained from *Santalum* spp. is used for incense, aroma-therapy and perfume;

Replica cups 202 may also be made from resinous materials comprising myrrh, copal, styrax resins, frankincense, etc. Myrrh is a red brown resinous material, the dried sap of the tree *Commiphora myrrha* native to Somalia and eastern Ethiopia. The sap of other *Commiphora* and *Balsamodendron* species including *C. erythraea, C. opobalsamum, B. kua* are used in liniments, perfumes and incense; copal; Styrax resin or benzoin resin obtained from the bark of the tree *Styrax* spp. native to Java, Sumatra and Thailand; frankincense or olibanum is an aromatic resin obtained from the bark of the *Boswellia thurifera* tree or *B. sacra, B. carterii* (Burseraceae) in Oman, Yemen and Somalia, used in incense and perfumes; camphor (Cinnamonum camphora and *Ocotea usambarensis*); labdanum or ladanum is a sticky brown resin obtained from the shrubs *Cistus ladanifer* and *Cistus creticus* and species of rockrose, with a long history of use in herbal medicine and as a perfume ingredient as the smell resembles ambergris; Ferula or galbanum (*Ferula* spp.) resin is used for medicinal and culinary purposes.

Essential oils, animal fragrance and natural plant based binders may be added to the raw materials used as ingredients for making and formulating nest cups 202. Essential oils comprises: Patchouli plant (*Pogostemon* spp.) is used in making perfumes; cedar wood; sandalwood oil; flowers such as rose (*Rosa* spp.); jasmine (*Jasminum* spp.); ylang-ylang (*Cananga* spp.) Animal fragrance from musk, operculum and ambergris. Musk is the name originally given to a perfume obtained from the strong-smelling substance secreted by a gland in the abdomen of the male musk deer. The organic compound that is the primary contributor to the odor of musk is muscone. The name is applied to other animals possessing a similar odor such as musk duck (*Biziura lobata*) of southern Australia, the musk shrew, the musk beetle (*Calichroma moschata*), etc. In the vegetable kingdom it is present in the musk flower (*Minulus moschatus*), the musk wood of the Guianas and West Indies, and in the musk seeds of *Abelmoschus moschatus* plants. Operculum is obtained from the conch shells of gastropods such as snails. Ambergris is obtained from the stomach of sperm whales washed up on beaches and shores. Natural plant based binders: mucilaginous plant material such as Makko powder, made from the bark of tabu-no-ki tree (*Machilus Humbergii*); natural gums. Replica nest cups may also be carved directly from the wood and raw plant materials; or cultured from pulverized plant materials impregnated and formulated with essential oils and fragrance.

Raw materials for manufacture of replica nest cups 202, panels 69a, modified overhead mounted vertical boards 196, wall 191, culturing medium; and to provide surface tiling and attachment may be derived and obtained from mineral rocks comprising sedimentary, metamorphic, igneous, non-igneous rocks and ores such as: bauxite, granite, shale, gypsum, limestone, calcite, marble, gold, copper, iron; gypsum, chalk, lime-stones, carbonates, silicates, rocks, clay, porcelain, wood chips, cement, concrete, high density poly-ethylene (HDPE), high density poly-propylene (HDPP), poly vinyl chloride (PVC), plastics, thermo-plastics, polymers, etc. Cups 202 may also be made from gemstones comprising: agate, anyolite, bixbite, corundum, ruby, diamond, emerald, garnet, jadeite, menilite, opal, morgonite, sapphirine, tsavorite, amethyst, ammolite, etc; precious metals comprising: gold, platinum, titanium, copper, bronze, etc; fossilized resins comprising amber, burmite, gedanite, stantienite, etc; or, crystals such as: quartz (SiO), agate, aqua-marine, glass, etc.

Customized edible nests may also be produced for a niche market of elite customers. Such edible nests may be built by swiftlets into nest cups made of precious metals, fossilized resins and gemstones such as: jade, diamonds, sapphirine, emerald, ruby, opal, amberlite, amethyst, crystals, marble, quartz, etc; minerals and rocks containing metallic ores of gold, silver, copper, etc. with medicinal and therapeutic properties. Apart from naturally occurring materials, such nests attachment substrates may also comprise of synthesized gemstones made by humans such as synthetic diamonds, rubies, sapphires, emeralds, jade, etc. Edible nests of swiftlets built on such precious and exquisite nest cups substrate may be custom made or sold at public auctions to the highest bidders; to be acquired by connoisseurs as collector's items, gifts, presents; a status symbol; more for decorative-collective purposes, exhibition and visual display than for food or consumption. Such a method may be used to increase the value and net worth of the farm's product; and to enhance profitability of the farm 113.

In another embodiment of present invention, a study may be carried out to determine the specific types of dietary insects which may affect the color of edible nests produced. Such that swiftlets feed comprising concentrations of particular types of insects may be tested and if certain types of insects are found to be favorable for producing colored edible nests, feed of such insects may be selectively increased during feeding time to effect the production quality of colored edible nests. Breeding and production of such types of insects may be selectively increased in proportion to other insects.

Normally nests built by the wrong kinds of birds (e.g. non-edible-nest producing swiftlets or swallows) may be removed from the shelters together with the eggs, such that over time this manual selection process only leaves behind a colony of swiftlets that produces the right kind of nests for the trade. In another embodiment of present invention, such nests may be retained for cross-fostering purposes such that these swiftlets or swallows used as surrogate or foster parents to raise the eggs and young chicks of edible nest swiftlets comprising *A. unicolor, A. fuciphagus, A. maxima* and *A. germani*. Eggs and hatchlings present in the wrong kinds of nests built by other species of non-edible-nest producing swiftlets such as *C. esculenta, A. salangana*, etc. may be manually removed by human breeders and swapped with those of edible nests producing swiftlets such as *A. fuciphagus*. This cross-fostering technique may also be used on the nests of birds comprising other genus of the family Apodidae such as Swifts (*Chaetura* spp.) and Swallows (family Hirundinidae), etc. The parasitic eggs inserted may be glued to the nest by super-glue to prevent ejection by the foster parents. The eggs of *A. fuciphagus* may be painted, colored, dressed and made up by human breeders to produce mimetic look-alike eggs similar in form and appearance to those of the foster parents and placed in the parasitized nests. Such that the foster parents may be deceived into believing that the mimetic eggs are their very own. Such cross-fostering of eggs and young chicks may be used to initiate the establishment of a colony of edible nest producing swiftlets in the man made breeding structure 11, 14, 100, 200, 356 for producing edible bird's nests. Such a method may also be used to generate a cottage industry for the semi-domestication of swiftlets and the small scale production of edible bird's nest.

In another embodiment of present invention, eggs laid by swiftlets during the nesting season in such shelters 11 and 14 may be partially collected and removed to another location for captive breeding in a newly constructed specialized breeding facility 200. Alternatively, eggs for captive breeding may also be obtained from the nests of wild swiftlets with the permission of the authorities. In an extension of the captive breeding program, chicks, hatchlings and juvenile swiftlets 2 to 4 weeks old (before fledging) may also be obtained from swiftlets residing in shelters 11, 14. The manually collected juveniles and chicks may be transferred, relocated and transmigrated to colonize a newly established production facility 200 far away; or, to newly extended portions of an existing production facility. Eggs and chicks of Swiftlets transmigrated from a multitude of such shelters 11 and 14 may be used to populate a new production facility 100, 200, 356 speedily. Such a method of transferring breeding materials also helps to relief population pressure of existing shelters through a managed re-distribution of the avian demography. And to avoid an avian population explosion which might likely lead to a large number of residential swiftlets abandoning established habitats. Overcrowding of habitat leading to abandonment is counter-productive, detrimental and will have a disastrous effect on the swiftlets breeding cum edible nest production facility 11 or 14. Habitat abandonment may also occur due to infestation of ecto-parasites and blood sucking cimicid bugs such as ticks, lice and fleas, rats, vermin and intrusion of entrenched predators like snakes and owls. In human terms, such a demographic re-distribution may be equated to the concept of resettlement, relocation or transmigration.

Swiftlets are altricial and chicks are totally dependent on their parents. Chicks are brooded for 1 to 2 weeks and new born chicks are fed food bolus comprising insects and worms held together with saliva by parent swiftlets. Young chicks can go into torpor to conserve energy in cold weather. Once chicks fledge, they are fully independent and receive no further parental care. In the greenhouse 33 where swiftlet chicks are brought up, feed materials comprising insects and worms 297 may be rolled into a round ball or food bolus, before being inserted into the open bills of chicks. Alternatively, feed materials may also be supplied in pellets form such that boiled ground fish, soft-bodied insects, worms, etc. may be held together with a binder comprising a sticky mixture of boiled gelatinous seed grains, mashed tapioca, potato, sagu, yam, etc. The semi-solid gluey mixture may be kneaded like dough and hand rolled into a long cylindrical shape, much alike a sausage. The desired amount may be cut or broken off by hand into suitably sized pieces of pellets. The pieces of feed pellets may then be inserted into the open beaks of chicks. Alternatively, the cylindrical rolls of feed materials may be put into large syringes specially adapted for this purpose. The desired quantity of feed material may be obtained by pressing the plunger to squeeze out its content. The discharged paste may be rolled into round boluses by hand just before feeding. Fortifying vitamins, mineral salts, medicine, health food and other additive nutrients may also be added to the feed bolus. Feed may also be directly squeezed into the open bills of older chicks such that the adapted syringe may be covered with or hidden behind a replica of an adult swiftlet. Such that chicks may be duped and deceived into believing that parent swiftlets are bringing them the food.

FIG. 5H shows another embodiment of present invention in which a mechanized food bolus production apparatus comprising of a feed extruder/roller wheel/cutter/roller mechanism may be used to produce large quantities of round feed bolus for feeding swiftlets chicks. Pre-mixed feed comprising insects, worms and binder 269 is placed into a feed slurry hopper bin 270. Plunger 271 compresses feed material 269 which is forced out of discharge nozzle 272. Extruded feed is cut into small pieces by the rotor wheel 273 cum cutter blades 274 which presses against a rotating belt 275 or against a static board. Pellets 276 with unevenly cut edges fall on to tray 277; pellets in full trays 277 are then removed. If desired, mixer blades and a stirrer motor may also be incorporated into hopper bin 270 to mix the concoction.

FIG. 5I illustrates a method in which full trays of pellets are shaped into spherical round bolus 276 by a rotating lid mechanism 278. Movement of lid 278 may be automated and motorized. The rotating lid may be moved from side to side across the top surface as the boluses are being shaped. Each food bolus may be made measuring from between 2 mm to 10 mm in diameter depending on the age of swiftlet chicks being fed. As the chicks grew in size, larger bolus may be manufactured for manual feeding. Sizes of feed bolus may be controlled by the opening/or size of the extruder discharge tip 272 which may be varied to produce bolus of various sizes as desired.

In the wild, swiftlet's breeding season overlaps the wet season; which corresponds to an increased insect population. Clutch size depends on the location and food source. In the mid-Baram River area in Sarawak, Malaysia, *A. Fuciphagus* adopted a multi-brooded reproductive strategy throughout a protracted breeding season of some nine months. Reproductive vigour gradually diminished towards the end of the breeding season. Two broods per year are the norm, but some pairs are capable of producing a third clutch. Provision of wild breeding insects and captive bred insects in combination with aerial feed dispensing apparatus 300 and vertical perching feeders 314 may induce swiftlets to have at least 3 breeding seasons per year. A fourth season may be made possible. Swiftlets being aerial insectivores are important agents in the control of insect-pest populations.

FIG. 6A to 6E illustrates a cockroach breeding apparatus 263 and a harvesting method, system and equipment to provide bird feed for swiftlets 61. Apparatus 263 may comprise of large common feeding cavities 280 located at one end of structure 263 connected to breeding compartments 281. Each compartment 281 may be internally sub-divided into a multitude of micro-cells 282 running horizontally from the feeding cavity 280 to the other end of the structure such that the myriad internal structure of inter-linked honeycombs and hollow cavities provides an ideal breeding environment for cockroaches to breed and multiply. Numerous holes and passage-ways interconnected the micro-cells 282 and compartments 281. Food, nutrients and water may be supplied and topped up via front opening trap-doors 298; or, dispensed via vertical ducts 279 into cavities 280 of compartment 281. Shafts 279 also serve as ventilation ducts to allow a limited amount of light to enter compartment 281. Cavity 280 forms a common feeding zone such that all the cockroaches residing in all of the micro-cells 282 in each compartment 281 may congregate to feed, interact and mate; moving back to the micro cells after feeding to breed and rest. Grass, wood chips and sawdust may be put into compartment 281. Details of section X-X connecting compartment 280 to the breeding compartment 281 is illustrated by FIG. 6B and FIG. 6C.

FIG. 6B illustrates the arrangement of breeding compartment 281 which comprises of a large number of honeycombed micro-cells 282. FIG. 6C illustrates a harvesting mechanism in which compressed air is supplied by main header pipe 283 via valve 284 to an array of discharge nozzles 285 for channeling purging air deep into the inlet side of each individual micro-cell 282 in compartment 281 located behind the feeding cavity 280. Compressed air may be discharged by manipulating flushing valve 284. Cockroaches inside micro-cell 282 are pushed and propelled to the outlet end-cover 286 located at the opposite end of the cell as illustrated in FIG. 6D. Insects flushed from micro-cells 282 are collected by end-cover 286 mounted at the outlet end of the breeding compartment 281. Insects flushed into the collection end-cover 286 are in turn sucked into discharge nozzle 287, fixed pipe line 288, flexible hose 289, strainer 294 and into a containerized vessel 290. A vacuum pulling pump mounted on container 290 sucks air from compartment 281 into 290. Such a push-pull pneumatic mechanism dislodges cockroaches from the micro-cells 282 and transferred them into container 290. Operation of discharge valve 291 in coordination with flushing valve 284 may be used to control off-take of cockroaches from each individual compartment 281 during the harvesting operation. The network of fixed pipes interlinking all of the compartments 281 may be connected to the main discharge header 288. Header 288 may be connected to the flexible hose 289 by way of quick coupling 292.

FIG. 6E illustrates a double layered strainer 294. Hose 289 may be routed through strainer 294 before entering container 290. Cockroaches entering vibrating strainer 294 may be separated according to size such that large breeding adults may be retained at the top level by sieve layer 295 while feed materials 297 falls through sieve 295 but retained in the middle compartment by sieve layer 296. Small sized juveniles fall through sieve 296 to the bottom compartment. Breeding adults and small juveniles may be flushed back to breeding apparatus 263. Such that breeding adults continue to produce young while the juveniles are allowed to grow larger before being harvested. A motorized vibrator may be attached to strainer 294 to produce vibratory movement to efficiently separate the insects.

The internal construction of container 290 may resemble the arrangement and layout design of breeding facility 263 comprising a number of compartments 281 and a multitude of micro-cells 282. Mobile container 290 equipped with automated climatic control systems 311 such as air-conditioners or heaters, may be loaded with insects and trucked by means of a prime-mover 293 from a remote breeding site to swiftlets farm 113, or shipped by means of sea routes in short journeys of 1 to 2 day's duration. During transportation, the air-conditioner 311 may be used to cool the container 290's internal environ to 20 degrees centigrade such that cockroaches fell into a hibernating state of torpor and keep still but alive and well.

The micro-environment of breeding apparatus 263 may be maintained at an optimum temperature of 30 to 35 degrees Celsius, moist with a humidity of 80 to 90%, stygian darkness with a constantly available supply of water, food and nutrients. Since cockroaches are omnivorous creatures, they feed on anything containing carbohydrates, starch, oils, grease, vegetative materials including leaves and fruits, protein, dead animals, etc. In fact, they eat almost any organic matter that does not fight back. Reproductive and breeding rates being proportionately and directly related to the temperature and food supply of the habitat. A drop in temperature from an optimum of 30 degree C. to 25 degrees C., doubles the time interval between the female production of egg cases. Each species differs but in general, one female cockroach may be expected to produce on average 1,000 offspring in its lifetime while on average, an adult cockroach lives for up to one year.

Some regular cockroach can produce 100 eggs in each egg sac or ootheca, and only needs to be impregnated once to be able to lay eggs for the rest of her life, allowing one single cockroach to lay over a million eggs in her lifetime. Of the 3,000 species of cockroaches on earth, only 10 species have found it easy to live with humans and get their food, water and shelter from the human shelters in which they live; and are on the WHO list of human pests.

Humidity control of apparatus 263 may be maintained using water pans 210, water pools 215, fogging fan 205, humidifying fans 250, monitored and controlled by humidistat 206. High temperature of 30 to 35 degrees centigrade for breeding facility 263 may be maintained by means of conductive materials such as galvanized metal sheets during the day; heat retention material that absorbs heat during the day and release it slowly at night; heaters and heating coils 348 built into the structure; etc. Thermostat 207 linked to automated heating mechanisms of heater 348 may be used for monitoring, controlling and regulating the temperature. Bird excrement and guano 224 may also be used as feed materials for breeding cockroaches, as in the natural cave habitat, millions of cockroaches, dung beetles and other insects inhabits the cave floors, living off the droppings of swiftlets and bats. In a cyclical ecological system enabled by means of present invention, bird excrement provides sustenance for feeding the cockroaches; and when the cockroaches are grown, they may in turn be harvested to provide bird-feed for feeding swiftlets. Such a self-sustaining eco-system which is self-rejuvenating and self-regenerative forms the basic under-lying principles of present invention.

Such a symbiotic relationship between swiftlets and cockroaches being symbolic of the mutually beneficial symbiosis between swiftlets and their human breeders. Wherein shelters, food, water, safety, security, care and protections for swiftlets are provided and accorded in exchange for their edible-nests. In U.S. Pat. No. 4,639,532 Schreiber et al teaches a process for preparing synthetic periplanone-B. In U.S. Pat. No. 4,339,388 Still et al teaches the synthesis of periplanone-B. (Search term: cockroach rearing) Taxonomic grouping of cockroaches is as follow. Kingdom: Animalia; Phylum: Arthropoda; Class: Insecta; Subclass: Pterygota; Infraclass: Neoptera; Superorder: Dictyoptera; Order: Blattodea; Families: Blaberidae, Blattellidae, Blattidae, Cryptocercidae, Polyphagidae and Nocticolidae.

Unlike chicken or other avian species, swiftlets cannot perch, feed or take off from flat horizontal ground due to their extremely short legs. This is an evolutionary trait of the four genera to which swiftlets belongs, and a limitation to which they have adapted over the eons. To rest, they must perch vertically at height. To take off, swiftlets must release the claw grip, fall from vertical perch and spread their wings to glide before flying away. A minimum height of at least one meter is required to execute such a "para-gliding" take-off. Such an aerial feed dispensing system 300 enables wingless terrestrial bound insects and worms 297 to become airborne providing aerial fodder for the aerial insectivorous swiftlets 61.

Figures 7A, 7B, 7C, 7D:
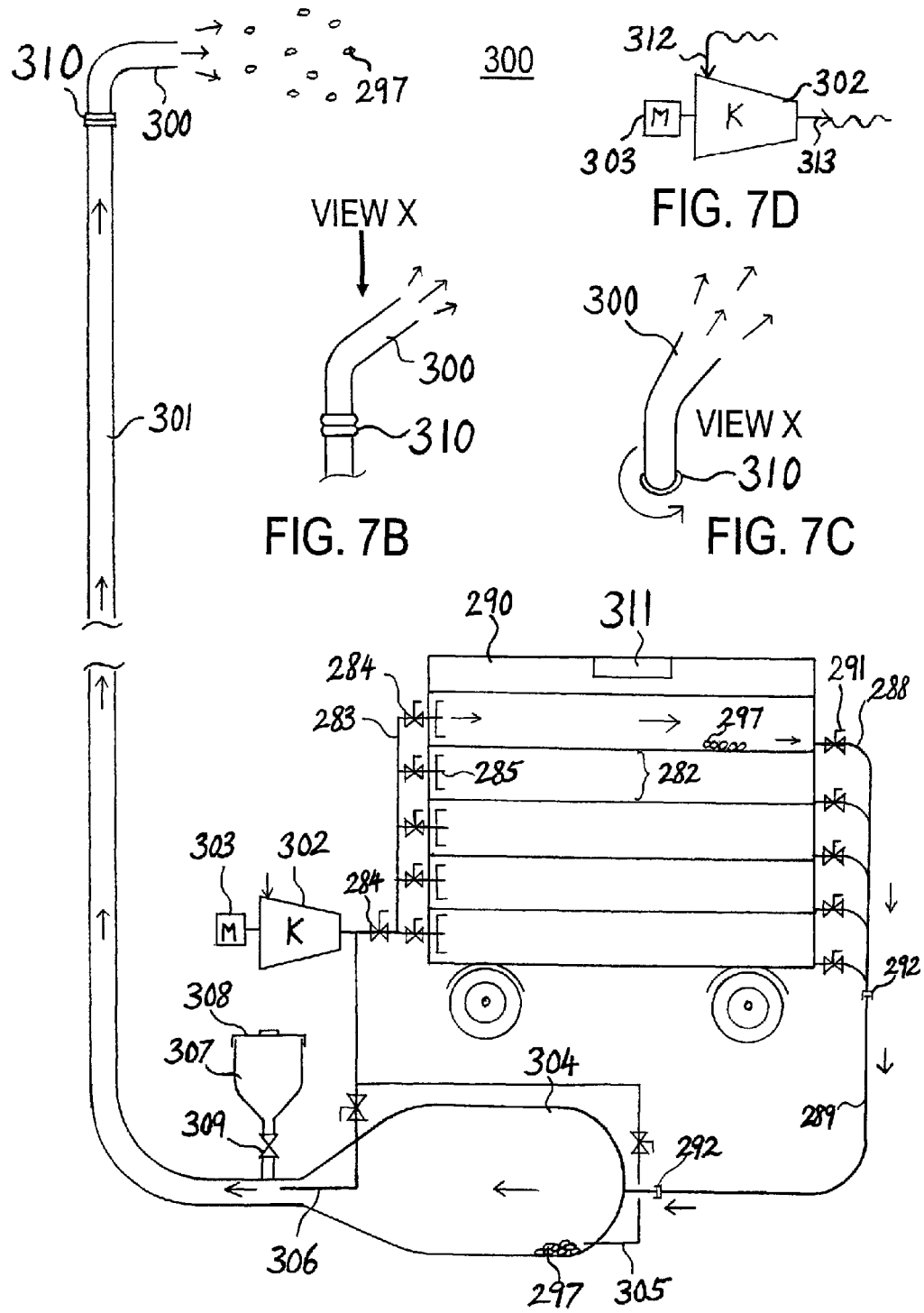
FIG. 7A shows an aerial feed dispensing apparatus used to provide airborne feed for swiftlets.
FIG. 7B and FIG. 7C shows two different views of the arrangement of discharge nozzle 300.
FIG. 7D shows a vacuuming cum pressurized air compressor.

FIG. 7A illustrates an aerial feed dispensing apparatus 300 which enables live winged flying insects as well as wingless insects and worms, etc. to be made available to swiftlets 61 which are strictly aerial insectivores by nature. Present invention discloses a system, method and specialized technique for dispersing airborne swiftlets feed by means of a discharge nozzle 300 mounted on top of a vertical pipe 301 rising hundreds of meters in height, through which compressed air is blown carrying feed materials. Such a system being enabled by means of an air compressor 302 powered by prime mover 303; flushing air from compressor 302 provides propulsion for transferring harvested insects 297 collected and kept in mobile container 290 into collection vessel 304; via associated fittings and piping equipment; and propelled from vessel 304 up to discharge nozzle 300 via pipe 301.

To flush out the insects, air may be selectively blown via supply header 283 into specific rows of cells 282 of compartment 281 by manually switching a series of inlet valves 284 and discharge valves 291 on outlet header 288. The valves 284 and 291 may be manipulated systematically by means of a manual purge sequence to divert air into selected cells 282 of compartments 281 to blow out insects occupying the honey combed structure. Fixed header 288 may be connected via quick coupling 292 to a flexible hose 289 connected to receiver vessel 304. Insects blown by compressed air from the container 290 into collection vessel 304 are in turn propelled and pushed by air from nozzle 305 and sucked by the venturi effect created by nozzle 306 such that they are blown, carried and propelled along vertical pipe 301, levitated and transported by the cushion of fast moving air up to discharge snout 300 mounted hundreds of meters above. Wingless and flightless terrestrial bound insects and worms may also be manually poured into hopper bin 307 via a removable top cover 308. The loading valve 309 may then be opened to feed them into the apparatus. Insects and worms are sucked into the pipe 301 and carried up to the discharge nozzle 300 to be disgorged. Aerial feed dispenser 300 may be designed to spew out thousands of insects and worms every minute. Vertical pipe 301 may be made from materials such as PVC, PE, PP, metals, etc.

FIG. 7B illustrates an elevated discharge nozzle 300 which may be tilted upward from the horizontal such that feed materials are shot upward at an angle, thus maximizing airborne time and aerial feeding opportunities for swiftlets 61. Nozzle 300 may be mounted on a swivel joint 310 such that it may be rotated in a circular motion to disperse feed materials evenly, maximizing feed distribution area and the airborne feeding opportunities of swiftlets. A small motor may be mounted on joint 310 to rotate and turn nozzle 300. To this end nozzle 300 may also be configured to discharge feed materials at an angular orientation (non-linear or non-perpendicular) as illustrated in FIG. 7C. Such an angular discharge provides a moment, a back-ward thrusting force to push and move nozzle 300 in the opposite direction. Such a self-propulsive motion design enables nozzle 300 mounted on swivel joints 310 to automatically turn by itself and disperse feed materials all around, 360 degrees. Such that all feed materials discharged may be "hawked" and snatched up by swiftlets in mid-air.

Vertical perch feeders 314 may be constructed beneath the discharge points of the airborne feeding apparatus 300 for vertical perch-feeding such that any excess feed comprising flightless worms or insects which are not immediately snatched up in the air by the swiftlets falls on to the tiered horizontal steps 315 of the staircase structure of the vertical perching feeder. Swiftlets may land and perch on the vertically serrated portion 316 of the feeder 314 to feed on the food resting on top of the level portion 315. Hard tail feathers with spiny tips helps swiftlets to brace against the walls of their roosting sites and assists in vertical perching. Vertical height is essential for swiftlets to drop from perch, stretch their wings and glide to fly away. Swiftlets will not perch on vertical surfaces less than one meter in height. Touch the level ground and they are dead meat.

Such aerial feeding apparatus 300 may also be mounted in the open area within the fully enclosed cage structure 20 and 21, such that the innate airborne feeding habit of swiftlets is made possible while other species of wild flying birds are excluded. Feed comprising seed grains may also be discharged via such an apparatus. Such seed grains may be flattened by compaction in order to allow them to float in air, dropping slowly, thus enabling swiftlets to snatch them in mid-air. Live insects of the order Diptera and Hymenoptera such as flies, houseflies, cockroaches, grasshoppers, crickets, etc. will instinctively spread their wings and start to fly; providing airborne fodder for the swiftlets which are adept aerial insectivores; hunt-feeding while in flight, drinking on the wings.

Aerial feeding system 300 may also be mounted in the open range outside of the shelter and cage structure 21 and 22 to provide free airborne feed to residential swiftlets, including wild roaming swiftlets passing by, to promote and to advertise the shelter to new visitors. Audio systems may be used to broadcast swiftlets calls via speakers 211 inviting new visitors to visit and inspect the shelter 11, 14, 100, 200, 356 to see what is on offer, look out for suitable nesting niche, a territory within the habitat in order to move in to occupy. Apart from audio advertisement provided by swiftlets call, visual display by VDU and physical attractions of robotic swiftlets, provision of free food may be used as a promotion, to attract and to act as an added incentive for roaming swiftlets to move into the shelter.

FIG. 7D illustrates an arrangement in which compressor 302 powered by prime mover 303 may be configured and transformed to comprise of a dual-purpose air compression cum vacuuming apparatus. A vacuuming hose mounted on the air-intake suction port 312 provides the sucking effect as air is drawn into the machine; while a compressed air hose mounted on the discharge port 313 provides pressurized air jets for blowing. Suction port 312 may be connected to container 290 which may in turn be connected to end cover 286 of breeding compartment 281; or to suction funnel 333. While discharge port 313 may be connected to flushing nozzle 285 to flush micro-cells 282, or to portable flushing nozzle 126. Such industrial equipment may be specially configured and adapted for use at the swiftlets farm 113 and at remote insect breeding facilities and apparatus 263, 264 and 265, simultaneously providing pressurized air jets (discharge) to flush, and vacuuming effects (suction) to suck. Such a machine capable of producing both pressurized air jets cum vacuuming effects may be used in collecting insects 297 bred to provide bird feed. Emphasis and design of such a compression-vacuuming machine being placed in favor of high volumetric flow capacity. Such that intensity/or rating of the pressure and vacuum being of less importance. In one form, the machine may comprise of a series of large multi-staged fan-propeller blades mounted inside a housing powered by prime-mover 303. The air jets may be used to dislodge insects and flush them out from the breeding habitat while the vacuuming effects may be used to suck up and collect the bird feed by means of a push-pull effect created by the dual purpose machine 302.

FIG. 8A illustrates a vertical perching feeder 314 in the form of an A-shaped pyramidal structure used for stationary vertical perch-feeding by swiftlets 61. FIG. 8B shows a plan view of FIG. 8A. Vertical perch-feeder 314 comprises a stepped stair-case structure with a multitude of horizontal steps 315 and vertical perching surfaces 316 serrated with claw lines 245 and pock marked with claw holes 246. Feed discharged from the top or apex of the structure 314 naturally falls down to spread out on the level steps 315. Such a feeder apparatus enables swiftlets to land and perch vertically on rough surface 316, settle down to peck and feed on insects and worms on top of flat steps 315; and to drop from perch at height, stretch its wings and glide to fly away after feeding. When feeder 314 is used for feeding and training fledging chicks, safety nets 84 supported by poles 317 may be erected on the ground. Or, a layer of soft cushioning material may be laid around the perimeter, such as artificial turf 318. Vertical perch-feeder 314 may be configured with a different base and sides shaped in the form of a triangle, square, hexagon, octagon, round, conical, etc.

FIG. 8C and FIG. 8D illustrates details of the sliding rail cum lifting mechanism to move feed container 319 up the vertical perching feeder 314 for distribution. Fixed rail 320 is laid on one side of the structural frame of apparatus 314 from the ground level to the apex of the structure. Feed container 319 attached to rail 320 by means of sliding sleeve 321 may be pulled up to the apex by means of cable 322 via pulley wheel 323 reeled by winch 324 driven by motor 325. Cable 322 passes through pulley wheel 323 resting on top of frame 326 mounted at the top of feeder 314. Fixed rail 320 may be secured onto the structural frame 327 of feeder 314 by means of bolts and nuts 235. Sliding sleeve 321 resting securely in the grooves of fixed rail 320 is attached to feed container 319 by way of bolts and nuts 235. Roller wheels 328 may be mounted in between fixed rail 320 and sliding sleeve 321 for ease of sliding feed container 319 up and down rail 320. Feed material 297 comprising live, non-flying insects such as ants, crickets, worms, larvae, etc. may be released at the apex of feeder 314 via a trap-door 329 mounted at the bottom of feed container 319.

In the wild, chicks 2 to 4 weeks old climbed out of their nests to cling on the vertical wall. Before fledging, young chicks will perform 'wing exercises' as they prepare for their life on the wings. In their natural habitat, fledglings must succeed in their maiden, first flight attempt as there is zero margin for error. The survival tolerance for any fall due to lost grip or flight failure is 0%. No training, no practice, no wrong timing and no second chance. Fledglings must succeed during their first flight attempt. Falls from great heights due to such failed maiden flights are normally fatal, such that even if the juveniles did not die, they may be seriously injured and unable to fly again. Or, even if they were not injured, swiftlets are unable to take off from flat or level surface due to the inherent disadvantage of their short legs; as they must drop from their perch at height before gliding to fly away. Left stranded on the level ground without any means to take off into the air, certain death awaits the fallen fledglings as they are attacked and devoured by cave creatures such as snakes, cockroaches, crickets, centipedes, crabs, ants, etc.

FIG. 8E illustrates a single sided cradle-vertical-perching apparatus 330 made of wire or plastic mesh 330 attached to a vertically inclined triangular framework structure 331 which may also be used for juvenile flight practices and in house flight training of fledglings. Miniaturized versions of apparatus 314 or single sided vertical perching apparatus 330 with a stepped stair case structure 315, 316 may also be adapted for raising swiftlets chicks. Such vertical perching apparatus 330 may be erected around the walls 332 inside the green house 33 for raising swiftlets chicks 2 to 4 weeks old. Twin units of apparatus 330 placed back to back forming an "A" shaped row may be erected in the middle of the green-house. Chicks clinging to such a cradle apparatus 330 may be fed boluses of insects 276 by human handlers at regular intervals round the clock. The floor of green house 33 may be covered with impact/or shock absorbing materials 318 to cushion the fall of swiftlets chicks which have lost their grip and/or dropped down from such a cradle apparatus 330.

As they grow older, juvenile chicks above 4 weeks may be transferred from cradle apparatus 330 to a miniature feeder 314 mounted inside green house 33, placed higher up on the staircase structure to be trained to feed from such feeders 314 and to practice in house flights. Handlers may take hold of each swiftlets chick, delicately place it on the vertical portion 316 of the feeder which is serrated with claw lines 245 and heavily pock-marked with claw holes 246 for ease of vertical perching, making sure that their claws held securely on to the feeder wall 316 before letting go/or releasing his protective hand. Vertical surface 316 may also be covered by wire or plastic mesh to provide better gripping surface for vertical perching. Robotic swiftlets masquerading as parent birds may emit vocalizations and call out to the chicks while pecking away on feed present on the level steps 315, teaching them the proper avian peck-feeding technique. Small chicks of chicken may also be placed on level portion 315 to peck at feed materials. Swiftlets chicks may take this cue or demonstrative example and start pecking to feed on the worms and insects 297 present on top of the horizontal portion 315. Such that even after the chicks have grown up into adult swiftlets, they will still remember and practice such habitual traits acquired when young; landing on vertical perching portions 316 of the feeder 314 and settling down to feed themselves by means of peck-feeding at a fixed stationary position. A capability and luxury enabled by means of present invention which swiftlets have never been able to enjoy previously.

Besides being used as a feeder, structure 314 and 330 may also be used as a flight training apparatus for fledglings to perform wing exercises and as a simulator for in house flight practices, prior to actual flights in a safe and secure environment. As feed is pecked off and finished at one level, juveniles may flap their wings, climb around or jump up to a higher step on the feeder. Such that even if the chicks fell, the inclined gradient and stepped structure of the apparatus will arrest and stop the falling chick, minimizing injuries. Safety nets 84 supported by poles 317, Styrofoam 237 or artificial turf 318 may be placed at the bottom of the feeder 314 to cushion the impact/or break the fall of a failed flight attempt. Chicks which have lost their grips and fell; fallen fledglings and juveniles practicing flights but failed, are rescued and retrieved from safety nets 84 or turf 318 by human handlers and returned to simulator 314 and 330 for further practice. To try, again and again until they have mastered the necessary techniques flying from one side of the wall mounted simulator to the other side; or until they have grown strong and large enough to fledge on their own. Apparatus 314, 330 and green house 33 may also be built inside the feeding chamber 259 of newly established facilities 100, 200 and 356 such that trans-migrated chicks may be brought up, fed, watered, trained to fly, until they fledge safely. And return to roost. In the farm environment, the margin for error and failure is 100%, safe and successful fledging being guaranteed by way of human intervention.

Insects of the taxonomical classification comprising the Class of Insecta, in particular the Order of Hymenoptera (sawfly) and Diptera (housefly) which forms the most important and abundant prey of swiftlets, may be bred in the vicinity of the farm inside and outside the wall 113 of the farm. Ground sections inside or outside of the fully-enclosed protective wire mesh cover 21 and 22, may also be adapted for breeding different families and orders of insects commercially to provide natural bird feed. Other insects from the taxonomic grouping of the Order comprising: Coleoptera (beetles); Hemiptera (whitefly); Odonata (dragonfly and damselfly); Lepidoptera (butterfly); Schizophora; Bibionidae; Brachycera; Aphidoidea; Araneida; Homoptera; Megaloptera (alderfly, dobsonfly, fishfly); Neuroptera (snakefly, mantidfly, owlfly); Mecoptera (scorpionfly, earwigsfly, hangingfly); Orthoptera (crickets, grasshoppers); etc. may also be bred for providing bird feed. Aquatic swarming insects such as Ephemeroptera (mayflies); Plecoptera (stoneflies); Trichoptera (addisflies); Dermaptera (earwigs); Raphidioptera (snakefly); etc. may also be bred in/or near the water ponds 260 surrounding the farm for crepuscular feeding. Ants comprising the Family of Formicidae may also be bred for bird feed. Kazillions of ants exists in the world, some are scavengers, others carnivorous, some eats plants only, others omnivorous.

Besides captive breeding, wild breeding populations of insects such as flies, house-flies, ants, bees, beetles, etc. may also be established, bred, fed and harvested for feeding swiftlets; or bred to be hunted down by the foraging swiftlets in open breeding apparatus 264. Wild breeding stock of all varieties of insects captured by traps from external areas of the rainforests may be continuously brought to the farm 113 and its vicinity for release to augment the wild breeding populations of insects. Such that favorable breeding conditions for such free flying populations of insects may be made possible by means of human intervention through a supply of food, nutrients, water; provision of parental breeding pairs; and the provision of conducive breeding habitats comprising temperature, humidity, light or darkness; protective vegetative growth or artificial shelters to enable breeding insects to hide and continue to produce off-springs; etc. Free ranging insects may be bred for the purpose of hunting-foraging by swiftlets.

Huge colonies comprising billions or trillions of wild breeding insects, bugs and flies may be allowed and encouraged to breed freely in open breeding ground 264 inside and outside of the farm perimeter walls 113. Such that feed materials comprising guano, bird shit, animal wastes from pig, cattle, sheep, chicken farms and other organic matter may be trucked in, dumped and spread out in the open fields and ground 264 to provide feed and nutrients for the flies and legions of larvae. Adjacent areas comprising jungles or farmland such as palm oil plantations, rubber estates, fruit orchards, crops; aqua-culture farms such as fish ponds, prawn ponds; ranches, duck and chicken farms, etc. may be acquired for establishing and maintaining such wild breeding populations of free flying flies for feeding swiftlets. In particular, wild breeding insects from the family Muscidae such as *Musca* Spp.; family of Fanniidae such as *Fannia* Spp.; *Calliphora* Spp.; *Stomoxys* Spp.; *Lucilla* Spp.; may be bred in apparatus 264 to supply swiftlets feed. Each female housefly can lay up to 8,000 eggs. Other insects such as grass hoppers, crickets, bees, fruit flies, etc. may also be bred for providing feed for swiftlets. Such open wild fly breeding areas in the vicinity of the farm provides a good hunting ground for swiftlets to hunt for their food naturally, near to their habitat. While the decayed waste provides a good source of organic fertilizer for the jungle trees, palm oil, rubber, fruit trees and crops planted in the vicinity. Wild breeding insects may also be collected by means of containerized trucks equipped with air-conditioning and compressor-vacuum apparatus to flush and suck up the insects.

Should the avian-farm based breeding facilities prove inadequate, externally located insects breeding facilities associated with and located near to chicken, pig, cattle and goat farms, etc. may be constructed solely for the purpose of providing bird feed. Organic materials and animal wastes from such farms ensure a continuous supply of nutrients and feed materials 334. For such externally located breeding apparatus and facilities, a cage structure may be erected to keep wild roaming birds from directly raiding wild insect breeding ground. Insects being smaller are free to fly through the cage erected to keep out larger mammalian predators such as birds. Such that the wild breeding insect populations are self-sustaining and propagative enough to be harvested to provide swiftlets with a continuous supply of feed. Such that both captive bred insects and wild populations of insects bred at remote locations may be harvested and transported to the swiftlets farm by means of specially adapted containerized vessel 290 and pumper-trucks 293 equipped with air-conditioners 311 and dual purpose compression-vacuuming units 302. Such sucker-collector trucks may be used to collect swiftlets-feed from such externally located insects breeding facilities, transport them to the swiftlets farm and discharge them into the aerial feeding apparatus 300, providing live feeding materials for swiftlets. Compressed air may be used to flush out insects from their habitats while the vacuuming unit may be used to suck them into the container. Air conditioner 311 may be used to regulate the internal temperature and to chill the container such that the insects settle down and remain passive or inactive during transportation, going into a torpor/or hibernating state yet still alive. Temperature may be adjusted accordingly to suit different types of insects being transported. Well fed swiftlets free from the predatory threats of enemies may be induced to have 3 to 4 breeding seasons per year, favorable breeding conditions leading to an explosive increase in population and edible nest production.

Figure 8F:
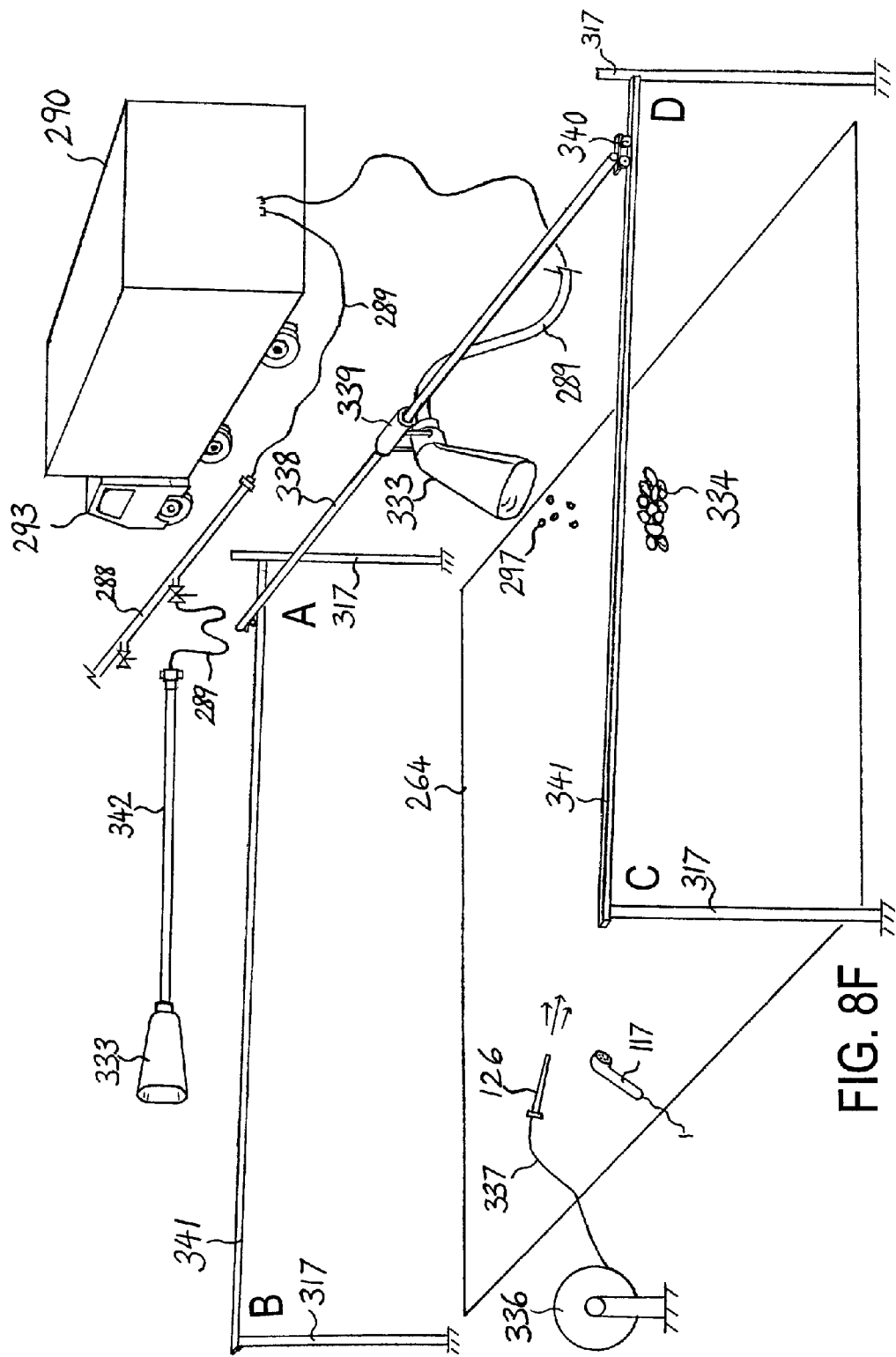
FIG. 8F shows a method of harvesting wild breeding insects from an open flies breeding facility 264.

FIG. 8F illustrates a method and apparatus 333 for collecting wild breeding insects 297 feeding on feed materials 334 from open breeding facilities 264 by means of vacuuming with suction funnel 333 and jet-flushing by means of compressed air via discharge nozzle 126 in a manually coordinated effort. The suction hose 312 of dual purpose compressor 302 is hooked up to empty container 290 while the discharge hose 313 is connected to hose reel 336. Hose 313 may also be connected to an eductor, ejector or venturi pipe apparatus to suck the air out of container 290 creating a semi-vacuum environment to induct and suck in insects and flies 297 via funnel 333. Hand held discharge nozzle 126 supplied with compressed air from hose reel 336 via air hose 337 may be used to agitate stationary flies feeding on materials 334 on the ground to fly and take to the air, while at the same time flush and push them towards the suction funnel 333 positioned at the opposite side of the wild flies breeding area 264. Insects and flies 297 in the air near to suction funnel 333 are sucked and pulled into the funnel by the vacuuming effects and carried via flexible hose 289 into containerized vessel 290, attached to prime mover 293.

Suction funnel 333 may be mounted on a mobile sliding apparatus comprising of a simple jib-tackle, pulley-sling mechanism to move it around the breeding area 264 to collect airborne insects 297. Suction funnel 333 is mounted on a movable horizontal pole 338 by way of sliding sleeve 339. The twin ends of pole 338 rests on sliding trolley wheels 340 which are in turn mounted in the groves of two horizontally inclined U-channels 341. U-channels 341 rest on vertical posts 317 in an inclined position from BC to AD with the groves facing upward. Pole 338 is positioned between points AD and BC and runs perpendicular to U-channels 341, which runs from A to B; and from C to D. Pole 338 may be pulled from AD to BC by way of strings attached near to roller wheels 340. Once the strings are released, pole 338 rolls back to points AD by gravity. Suction nozzle 333 may also be moved between points A and D; or B and C, by way of strings attached to sleeve 339 and pulley mechanisms anchored to the two ends of pole 338.

In another embodiment, collection funnel 333 may be mounted on a portable handle bar 342 attached to suction hose 289. Handle bar 342 may comprise of a hollow pipe made from metal or plastics. Such a portable hand held unit 333 for capturing flying insect provides extreme mobility, versatility and maneuverability in the hands of an experienced fly catcher. Hose 289 may be connected to a network of plastic pipes 288 leading to container 290. Hose 289 may be connected via a quick-coupling joint of the plastic pipes and the valve opened to suck insects into container 290. This method may also be used to harvest houseflies from captive fly breeding apparatus 29. In external wild flies breeding apparatus and facilities located far away from farm 113, an external cage may also be erected to cover breeding area 264 to exclude and prevent roaming wild birds from raiding the breeding grounds, decimating breeding stocks; devouring insects before they can be harvested. Wild breeding flies are free to roam, moving in and out of the cage structure; but once they venture outside of the protective cage, they may be captured and eaten by roaming birds in the vicinity.

Figure 8G:
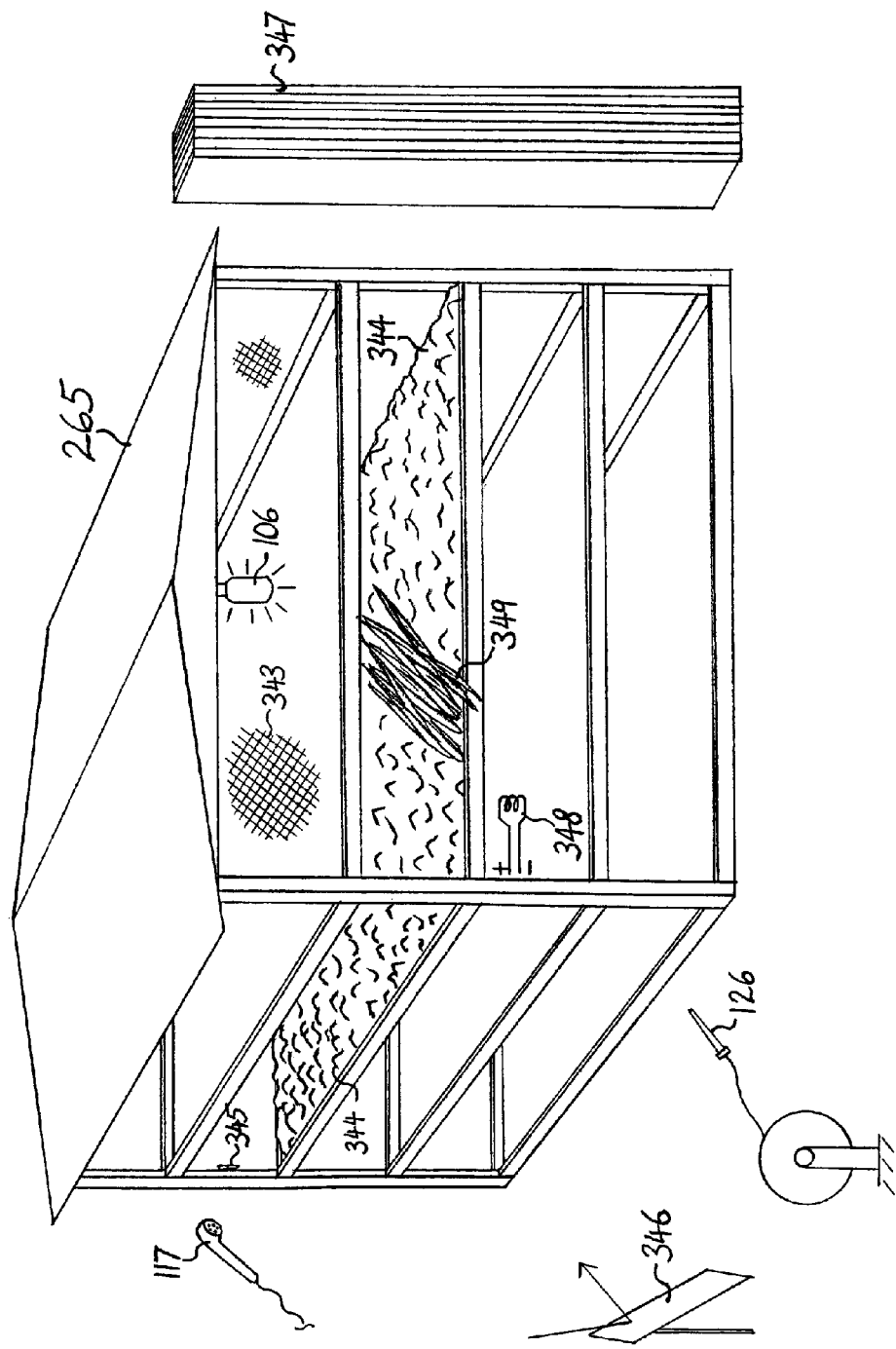
FIG. 8G shows a grasshopper breeding apparatus 265.

FIG. 8G illustrates a captive breeding apparatus 265 for breeding grasshoppers 345. Apparatus 265 may comprise of a multi-tiered structure with numerous levels enclosed in a fine wire mesh screen 343. Screen 343 may be mounted inside of an external wire grill of larger gauge size to keep out predators. A layer of loose earth and sand 344 is placed at the bottom of each tier or level as a substrate upon which adult females may deposit their eggs via ovipositors. After the females have laid their eggs, the breeding stocks 345 may be collected and removed to a new location or another breeding apparatus 265 for seeding the vacant apparatus. Reflective surfaces 346 such as mirrors and reflectors may be used to focus solar energy and sunlight on to the structure 265 to raise the habitat temperature to 30 to 35 degrees Celsius for the eggs to hatch speedily; and to provide heat and light to promote fast growth of grasshoppers. Lamps 106 may be used to augment and provide heat and light at night. A surrounding layer of folding side panes 347 may be used to insulate and keep heat inside apparatus 265. Side panes 347 are slid open during the day to let in light and heat and closed during night time. The apparatus may also be inlaid with heating coils 348 providing heat during the night. Reflective surfaces 346 and heating coils 348 may also be used with apparatus 263 for breeding cockroaches. Heating coil 348 may also comprise of a series of pipes through which flue gas, steam or hot water may be passed through. When eggs hatches, young grasshoppers may be fed on cut grass and vegetative materials 349 harvested from the field. Fogging fans 250 and pump 205 may be linked to and controlled by a humidistat 206; while thermostat 207 may be used to control heating coils 348. Such equipment may be tuned to monitor and to maintain the internal environ of apparatus 265 at a constant humidity of 90% and a temperature of 30 to 35 degrees Celsius. Grasshoppers raised may be collected using a portable collection apparatus 333 in which suction funnel 333 may be mounted on one end of a hollow handle bar 342 attached to suction hose 289 at the other end. Water may be supplied by nozzle 117 to provide moisture to the soil and sand 344, and agitating air via hose nozzle 126 for harvesting by means of funnel 333.

Herbivorous grasshoppers and locusts may be bred year round in tropical climates for providing bird feed. Females laid 400-500 eggs in the ground with short ovipositors. Scientific classification of grasshoppers is as follow: Kingdom: Animalia; Phylum: Arthropoda; Class: Insecta; Order: Orthoptera; Suborder: Califera. The suborder Caelifera is divided into Superfamilies. The Super family Acridoidea is further divided into the families of Acrididae, Arcypteridae, Catantopidae, Charilaidae, Chrotogonidae, Dericorythidae, Lathiceridae, Lentulidae, Lithidiidae, Ommexechidae, Pamphagidae, Pneumoridae, Proscopiidae, Pyrgomorphidae, Pyrgacrididae, Romaleidae, Tristiridae, Tetrigidae. The Super family Eumastacoidea is divided into the families of Chorotypidae, Episactidae, Eumastacidae, Euschmidtiidae, Mastacideidae, Morabidae, Proscopiidae, Thericleidae. The Super family Tetrigoidea is divided into the families of Tetrigidae, Batrachididae. The Super family Tridactyloidea, is divided into the families of Cylindrachetidae, Rhipipterygidae, Tridactylidae. Others such as: Super family Pheumoroidea comprises the family of Pneumoridae. Super family Pyrgomorphoidea comprises the family of Pyrgomorphidae; Super family Tanaoceroidea comprises the family of Tanaoceridae; Super family Trigonopterygoidea is divided into the families of Xyronotidae, Trigonopterygodae. Recent estimate indicates some 2,400 valid *Caeliferan* genera and about 11,000 valid recorded species.

Apparatus 265 may also be adapted for breeding crickets. Like grasshoppers, crickets used an ovipositor to lay eggs in a substrate of sand and soil. But unlike grasshoppers, cricket devours their young if they catch them. To avoid such forms of cannibalism, breeding adults must be removed from the apparatus after laying eggs, or a layer of sawdust may be used to provide a hiding place for hatchlings. A layer of fine mesh, mosquito netting 343 may be mounted inside of an outer wire grill of larger gauge size put up all round the breeding apparatus 265 providing an airy environment free from predators. External wire cage keeps out wild birds and larger animals while the fine mesh mosquito netting keeps the crickets inside of the apparatus and protects them from predatory spiders, centipedes, geckos, frogs, etc.

Crickets requires similar habitat conditions as cockroaches which bred in dimly lit, moist and warm shelters with a plentiful supply of food and water. Sliding side panels 347 may be kept pulled all round the apparatus/or, permanent walls may be erected to keep out direct sunlight. Moisture may be provided to the insects via a large sheet of cloth kept wet via a dripping tap while a water sprinkler 117 may be used to keep the soil and sand moist and soft. This assists in eggs laying by the adults and for hatchlings to emerge. Hardened earth traps the hatchlings preventing them from coming up to the surface. After egg laying adult crickets are removed from the breeding apparatus to seed another vacant breeding apparatus and to prevent adults from eating the young crickets. Cricket eats just about anything: wool, leather, grass, wood, guano, meat, any organic materials, even its own young, and in extremities its own appendages. The apparatus may be kept warm with artificial lights 106 and subdued light, but direct sunlight should be avoided. Optimum breeding temperature should be maintained at above 30 degrees Celsius but below 35 degrees Celsius. Crickets raised may be collected using a portable collection apparatus 333 in which suction funnel 333 may be mounted on one end of a hollow handle bar 342 attached to suction hose 289 at the other end. Crickets bred may also be used as swiftlets feed. Air may be supplied via hose nozzle 126 for agitating, making them jump and collected by means of funnel 333.

World wide there are about 900 known species of crickets. Taxonomic grouping and scientific classification of crickets is as follow: Kingdom: Animalia; Phylum: Arthropoda; Class: Insecta; Order: Orthoptera; Suborder: Ensifera. The suborder Ensifera comprises crickets, katydids, allies and divided into Superfamilies. The Super family Grylloidea is further divided into the families of Gryllidae, Gryllotalpidae, Mogoplistidae, Myrmecophilidae. Super family Hagloidea comprises the family of Prophalangopsidae. Super family Rhaphidophoroidea comprises the family of Rhaphidophoridae. Super family Schizodactyloidea comprises the family of Schizodactylidae. Super family Stenopelmatoidea is divided into the families of Anostostomatidae, Cooloolidae, Gryllacrididae, Stenopelmatidae. Super family Tettigonioidea comprises the family of Tettigoniidae. The family Gryllidae comprises subfamilies Eneopterinae, Gryllinae (common field crickets; brown or black), Nemobiinae (ground crickets), Oecanthinae (tree crickets usually green with broad, transparent wings), Phalangopsinae, Podoscirtinae (anomalous crickets), Pteroplistinae, Trigonidiinae (sword-tail crickets). In addition to the above subfamilies in the family Gryllidae, several other orthopteran groups outside of this family also may be called "crickets." They are Mogoplistidae (scaly crickets) Myrmecophilidae (ant crickets), Mole crickets, Tettigoniidae (katydids or bush crickets), Cave crickets (also called camel crickets), Sand crickets, Mormon Crickets, Weta Crickets, Jerusalem crickets, Parktown prawns. Cave crickets may comprise the Genera of *Ceuthophilus, Macrobaenetes*, etc. Crickets, like cockroaches lives in the dark under rocks, leave litter and are omnivorous.

Apparatus 265 may also be adapted for breeding dung beetles of the zoological order Coleoptera and family Scarabaeidae for providing bird-feed. The family is divided into two sub-families: Scarabaeinae and Aphodiinae. Dung beetles comprising the genus of *Phanaeus* Spp., *Onthophagus* Spp., *Canthon* Spp., *Copris* Spp., *Deltochilum* Spp., *Dichotomus* Spp., *Aphodius* Spp., *Onitis* Spp., *Onthophagus* Spp., *Euoniticellus* Spp., *Sisyphus* Spp., *Ataenius* Spp., *Deltochilum* Spp., etc. may be bred for feeding swiftlets. Dung beetle burrows into the ground and requires deeper layers of soil in the breeding apparatus than grasshoppers or crickets. They feed on liquid extracted from dung. Other feed material comprise mushroom, decomposing leaves, fruits and other rotting organic matter.

Several raptors (Falconiformes) are frequent predators of swiftlets. Known species include: peregrine falcons (*Falco peregrinus*), Eurasian hobbies (*Falco subbuteo*), sooty falcon (*Falco conoclor*) and bat hawks (*Macheiramphus alcinus*). Some known nest predators include crabs (Decapoda), snakes (Serpentes), red-winged starlings (*Onychognathus Mario*), spotted eagle owls (*Bubo africanus*), fiscal shrikes (*Lanius collaris*) and crows (*Corvis* spp.) There is also a species of cave crickets (*Rhapidophora oophaga*) in Borneo that feeds on both the young and eggs of swiftlets. Swiftlets are hosts to many species of parasites and ecto-parasites, found on individual birds and in nests. Parasites include: hippoboscid flies (Gataerina, Pseudolynchia and Ornithomya); feather lice (Dennyus and Eureum); ticks (Lelaptidae, Proctophyllodiae, Analgesidae and Eustathiidae); and fleas. Ticks may comprise the families of Ixodidae (hard ticks); Argasidae (soft ticks) and Nuttallliellidae. Fleas may comprise the families of Leptopsyllidae (bird and rabbit fleas) and Ischnopsyllidae (bat fleas). Lice may comprise the Order: Phthiraptera; suborder: Ischnocera (avian lice); Family: Heptapsogasteridae, Goniodidae, Philopteridae and Trichodectidae.

Adult fleas, lice and ticks may also be killed with a mixture of baking soda and salt which irritates the chitinous exoskeletons causing desiccation. Limestone (calcium carbonate) may be heated to produce soda ash powder and quicklime (calcium oxide), which may be dissolved in water to form slaked lime (calcium hydroxide) an alkaline solution which may be used to kill fleas, ticks and lice. Quicklime powder may be spread or dusted onto the nesting panels and a little water or fog sprayed on to the powder. Conversely, water mist may be sprayed onto the surface of panels 69a before lime powder is dusted on. Quicklime dissolves in the water to form an alkaline solution. After a few hours of soaking, the panels may be hydro-jetted to remove the lime solution, dehydrated adult pests and their eggs. Hydro-jetting effectively removes these parasites and their eggs from the habitat. Steam lances emitting a jet of hot scalding steam may also be used to exterminate such vermin and eggs. Cracks may be covered up and plastered over with cement or caulking materials. Some parasites may have co-evolved with specific species of swiftlets and are endemic to them. Chemicals such as naphthalene in the form of moth balls, flakes and crystals forms vapor which are effective in killing ecto-parasites like live fleas. To kill live vermin, the confined space of the habitat may be soaked for 2 to 3 hours with naphthalene. The danger comes from eggs which hatch in two weeks time. The eggs are easily scattered, resists and survives machine washing. The soak procedure is repeated after 3 weeks.

Predator traps 24, 25, 26, 27, 40, 41, 42, 43, as disclosed may be combined with external habitat patrols comprising flocks of geese, swans, ducks and packs of roaming dogs reared and kept within the perimeter walls 113 of the swiftlets farm 113 to deter and prevent terrestrial predators from ingress. Biological controls comprising natural enemies of pests such as snakes, lizards, squirrels, rodents and other small terrestrial predators may be used to control infestation. Such controls comprises dogs, geese, swans, ducks, etc. Geese may comprise birds from the genera *Anser* spp., *Branta* spp., *Chen* spp., *Cereopsis* spp., *Cnemiornis* spp. Swans may comprise birds from the genera *Cygnus* spp. and *Coscoroba* spp. While ducks may comprise birds of the family Anatidae; sub-families Dendrocygninae, Oxyurinae, Anatinae, Merginae; in particular, the genera of *Dendrocygna* spp., *Thalassarnis* spp., *Stictenetta* spp., *Anas* spp. etc. Dogs may comprise the genus *Canis* spp. of the family Canidae (coyotes, dogs, jackals, foxes and wolves). Geckos and house lizards may be entrapped, ensnared and eliminated by means of special traps configured with small narrow inlets armed with inward facing bamboo spikes or wire-bristles that allows for ease of entry for the lizards, but prevents any exit or egress.

In the farm environment, all of such terrestrial predators are excluded and eliminated from the habitat 17 except for airborne predators prowling the external aerial environment such as eagles, falcons, hawks, owls (family of Strigidae and Tytonidae in the order Strigiformes), crows, etc. in particular the avian genus *Accipiter* spp., *Micronisus* spp., *Melierax* spp., *Urotriorchis, Megatriorchis* spp. of the family Accipitridae. The mortality rate of adult swiftlets is generally low in comparison to fledglings. Mortality rate is highest during the first year of fledging due to predation and competition for food. To protect fledglings from such airborne predators and to ensure a high survival rate beyond this critical age limit, first year fledglings may be kept in a protective self-dispensing cage structure 350 until they have matured, large and strong enough before being released into the wild with their parents. Young swiftlets may be kept inside the protective structure until they are above one year old.

FIG. 9A shows an embodiment of present invention in which aerial feed dispensing apparatus 300 and water spray nozzle 214 may be combined with and incorporated into an aerial protective cage structure 21 and 22 to form an integrated aerial feed and water dispensing cage system 350. Wire-cage 22 and girders 21 may be configured to be fully enclosed, a wholly enveloping enclosure cum man made feeding range 350a providing millions of cubic kilometers/or billions of cubic meters in flight space and confined range for young swiftlets to fly safely. A colossal caged enclosure ranging from 10 meters to 200 meters in height covering a surface area ranging from tens of hectares to hundreds of hectares in size. Such a gigantic infra-structure provides protection from birds of prey, excluding all species of airborne predators from the farm and to keep young swiftlets safely in. Feed pipe 301 of the aerial feed dispensing apparatus 300 may be incorporated into the cage structure such that it may be combined with/or replaces girder 21, and used to support wire mesh 22; while at the same time, channeling live insects up to discharge nozzle 300 mounted hundreds of meters high, just beneath cage structure 301 and 22. Similarly, water from lake 260 may be pumped via water pipe 351 located on the other end of the structure up to nozzle 214 to be discharged in a water spray. The water spray falls back into the lake 260 and is circulated by the pump back to nozzle 214. Pipe 351 may be integrated with/or replaces girder 21 and used to support mesh 22 while channeling water up to nozzle 214. Such an arrangement forms an integrated aerial feed and water dispensing cage 350.

Such an integrated, mechanized and self-dispensing aerial structure 350 may be used to provide water and live airborne feed for residential swiftlets while excluding other species of wild birds from competing or snatching away their food. And protect them from predatory birds of prey. Live insects 297 in container 290 may be brought to the farm 113 by prime mover 293 to be discharged into vessel 304 via hose 289; propelled by compressed air up the pipe 301 which forms part of the frame work supporting cage 22; discharged by means of self-propelled rotating nozzle 300 into the artificial feeding range 350a to feed swiftlets 61. Resident swiftlets 61 sheltering in production facility 200 may feed from the flying insects 297 provided by aerial feed dispensing cage apparatus 350; insects fallen on vertical feeders 314 located beneath nozzle 300; prey on wild insects bred in area 264. Drinking as they fly into the water spray discharged by nozzle 214 of the self-dispensing cage apparatus 350; and while skimming in low passes over the water surface of lake 260. Hunt-foraging in flight, drinking on their wings! While humans have drive-thru meals ready to take away, swiftlets may experience fly-thru feed and water. Flying through a swarm of insects, a shower of water drops descending from the sky to feed and drink. Other features of the farm surrounded by high walls 113 include cockroach breeding apparatus 263, vegetative cover plants 111 and external moat 24. Access ways 12 located on the side of building 200 facing the free range (A) may be shut off to keep young swiftlets in until they are above one year old before being released to range freely with adult birds.

Building 200 acts as a filtering mechanism to keep out other species of wild birds; allowing only swiftlets 61 to pass through the shelter into enclosed feeding range 350a to feed on insects dispersed by aerial feed dispensing cage apparatus 350. The infra-structural design of cage 350 also provides positive isolation, helping to prevent mixing with other species of birds and in controlling potential spread of bird flu, avian diseases, etc. Besides first year fledglings, farmed adult swiftlets may also be confined in such an enclosure if necessary, for instance, during an outbreak of avian diseases which warrant such preventive measures to segregate and quarantine swiftlets to avoid cross-infection from other "infected" free-ranging avian species.

In another embodiment of present invention, to cater for such an emergency, the structural configuration of the macro-habitat 100, 200, 356 and the nutrients dispensing cage structure 350 may be configured with an optional isolation capability. Swiftlets shelter 200 may be arranged such that one side of the building marked (A) faces the wild open range; while the other side of the building marked (B) faces an enclosed flight range 350a designed to confine swiftlets in the gigantic self dispensing cage structure 350. During normal time, swiftlets may enter and exit access ways 12 provided on both sides (A) and (B) of the building 200 freely. However, in an epidemic, access ways 12 may be speedily transformed into a uni-directional entry point for swiftlets coming in from range (A), but cannot exit again from the same access ways 12 to range (A).

FIG. 9B illustrates the cross-sectional view of a modified access way 12 facing free range (A). Such that dual access-ways 12 may be modified and configured to provide an inward bound, a one way access point by means of self-opening flapper trap-door 352. Trap door 352 may comprise of a piece of firm and rigid, yet pliant, rubbery plastic hung over the inside of access ways 12. When pushed by inward bound swiftlets entering from range (A) trap door 352 swings to open inward. Once the swiftlets passes through it falls back to cover access way 12 preventing swiftlets from exiting. Swiftlets may enter with relative ease, but prevented from going out from the same point into range (A). Access way 12 may be configured in such a way that it is inclined, forming a sloping floor gradient 353 from range (A) towards the habitat 17. It may be ergonomically shaped such that incoming swiftlets (indicated by dotted lines) coming into contact with the light-weight cushioned flapper-trap door 352 pushes against it to open inward, drop down the incline, glide and flies into habitat 17.

Wall mounted fittings for attaching trap door 352 may be pre-fitted to the interior surface of bricks 242 of the wall while bracket slots 355 may be pre-mounted on the exterior surface 199 of bricks 247 in front of access ways 12 during construction. Such that in anticipation of an impending outbreak of avian pandemic, modified access-ways 12 may be switched speedily from dual access-ways into uni-directional access ways by slotting flapper-trap doors 352 into the attachment fittings. Such that swiftlets entering the shelter may not be allowed to exit to free range (A) via the same access ways 12 from which they have entered. However, they may exit and enter freely through access-ways 12 located on the opposite side of the shelter (B) into the confined flight range 350a to feed and drink. Incoming swiftlets may also be channeled by means of via-ducts into a quarantine facility. Such a configuration provides a means of swiftlets management to control, confine and quarantine farmed swiftlets if necessary for their own safety, health and welfare in times of an avian pandemic. Feed production may consequently be ramped up and increased drastically to cater for the increase in confined swiftlets population. At critical stages of an infectious outbreak, access ways 12 may be totally closed off such that no further swiftlets would be allowed in from the wild range marked (A). Wooden boards 354 may be slid into the slots of brackets 355. Such a configuration enables total isolation capability and complete segregation of the farm 113 from cross-infection by potentially infected stock.

Though such a control measure may only be necessary in time of a severe outbreak of deadly avian diseases such as bird flu, H5N1 virus infection, etc. which may occur once in ten or twenty years, business continuity doctrines cum emergency/contingency planning strategy dictates the critical need for such a structural arrangement in facilities. Essential requirements of swiftlets management counter-measures dictate the provision of such quarantine capabilities; to address such possibilities, to be firmly in place; to prevent and avoid total decimation of the farmed swiftlets population. Preventive measures may comprise the standard format of stepped escalation in criticality as in any emergency response. Farm personnel may be trained in theory and practical drills to institute such a form of stepped control measures at the first sign/or alarm of an outbreak of avian diseases in the country, or in neighboring countries. And the necessary precautionary measures in terms of personal hygiene, essential personal protective equipment, de-contamination facilities, medication, vaccinations, etc. to be taken for personal safety and health; and to prevent cross infection to humans. All personnel may be vaccinated and inoculated against pandemic diseases and sicknesses. All such equipment may be stored in the farm for immediate deployment whenever necessary.

FIG. 9C illustrates the structural configuration of FIG. 9A in which a converted natural relief comprising a double sided mountain valley 19 may be transformed and adapted for providing quarantine capabilities and the provision of shelter, food and water for breeding swiftlets. The transformed shelter 356 may comprise of one side facing a free range A and one side facing a confined range B covered by a mechanized self-dispensing cage structure 350 providing shelter, food, water, safety and security for swiftlets at one single point of congregation and contact. FIG. 9D illustrates a sectional view X-X of FIG. 9C. Feed may be provided by aerial dispensing apparatus 300 brought to site by container 290 and truck 293. Water may be provided by spray nozzle 214 pumped up the piping 351 by pump 357 from pond 260. Water piping 351 may be integrated with and into supporting poles 358 to support the girders 21 and wire mesh 22. The cage structure 350 comprising girder 21, mesh 22, feed and water dispensing apparatus 300 and 214 may be supported by poles and struts 358. Girders 21 resting on cliff top 20 may be grounded by lightning rods 359 to protect the apparatus against damages from lightning strikes.

Cage structure 21, vertical supporting struts 358 and wire netting 22 may comprise of SS-304 or SS-316 materials. Wire netting 22 may be coated with a protective layer of corrosion resistant material by means of electrolysis. Alternatively, wire cage/mesh/struts may be replaced and substituted with other materials comprising fiber glass, polymers, composites which may be light weight, durable, pliable, of high tensile strength/pliant, corrosion resistant. Such materials may be woven with joints attached with binding agents. Glass fiber wool may be spun and made into yarns or threads 2 mm in diameter, woven or hand threaded and made into netting or mesh. Such materials may also be used to cover apparatus 350, girders 21, support struts 358 and bracing wires 83 of the gigantic swiftlets cage structure providing billions and billions of m3 of flight space!

Cage structure 21 and 22 may be supported by poles 358, strands of large sized bracing wires or cables 83 strung between support 21, 351, 358; and helium gas or hydrogen gas filled balloons providing self-levitation and aerial lift. The integrity and reliability of such an aerial structure may be monitored by frequent ground based manual monitoring and airborne surveillance by means of hot-air balloons, self-levitating balloons, blimps and air-ships filled with helium gas or hydrogen gas; enabling aerial repairs and maintenance work to be carried out. Cameras mounted on these aerial platforms may be used to provide live graphics and pictures; transmitted from such remote airborne work-stations instantaneously to the on-site control centre and remote monitoring stations by means of wireless, wire-line electronic communications systems and the internet. High technology equipment may be acquired and installed to detect intruders such as night vision goggles, UV, IR sensors; optical-light sensors (night time) and light intensity meters; heat-seeking sensors and motion detection devices; trip-wires; limit switches on access-ways such as doors and windows of production facilities.

Figure 10:
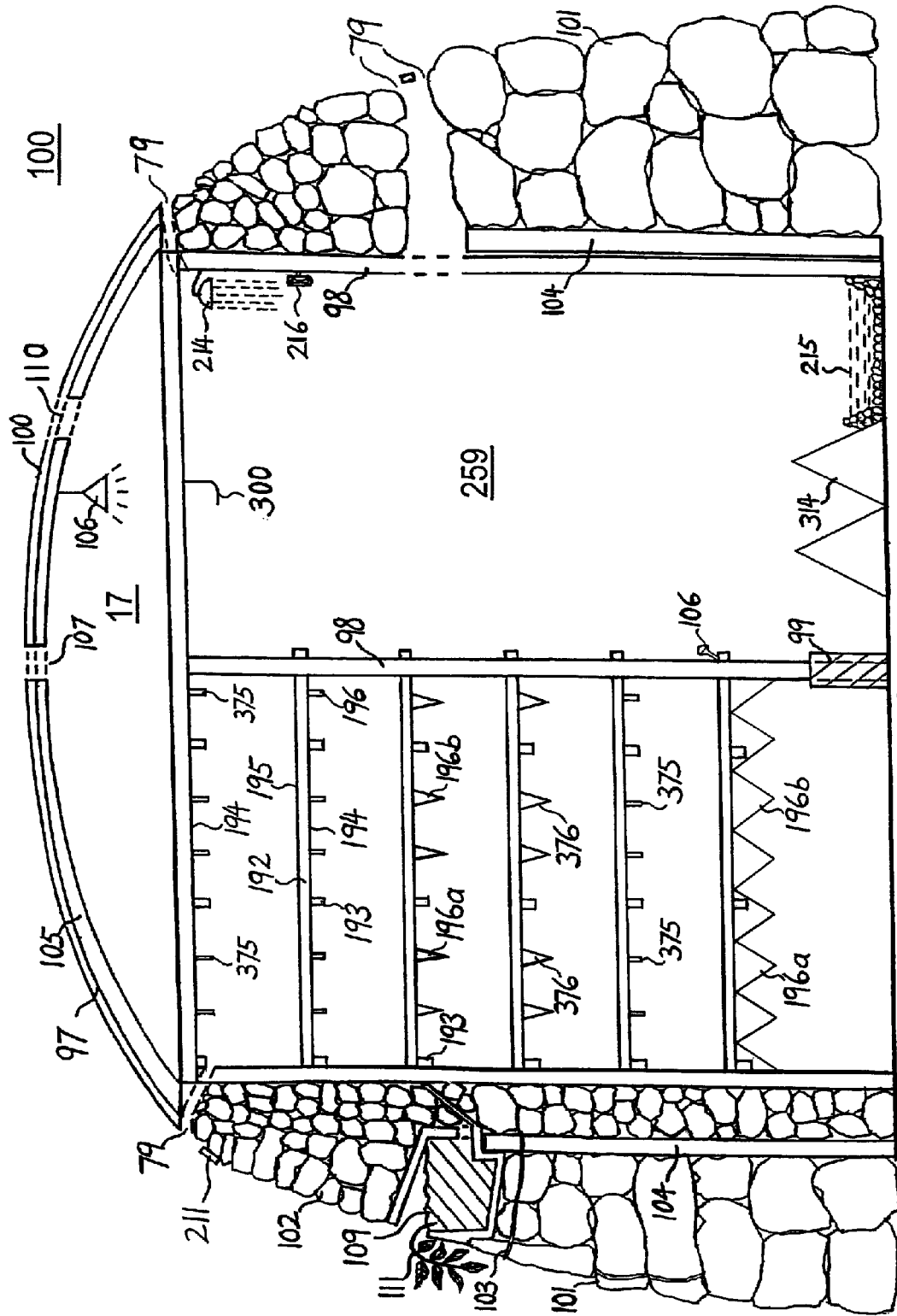
FIG. 10 shows the cross-sectional view of an artificial cave system 100 with multi-levels internal nesting structure for breeding swiftlets.

FIG. 10 illustrates the adaptation of multi-storey horizontal roosting structures into artificial cave shelter 100 in which the internal habitat is separated into numerous horizontal levels. Wherein each level 192 resting on beams 193 comprises a ceiling 194 and floor 195. Vertical nesting boards 196 hanging down from the overhead ceiling provides a nesting substrate for swiftlets to alight and builds nests. Normal rectangular shaped nesting boards 196 as previously disclosed may be used. In an alternative arrangement, the over-head nesting boards 196 may be configured such that the attachment base is securely affixed to ceiling 194; while the two side boards are inclined inwardly at an angular disposition; with the narrow edge pointing downwards to form a "V" shaped/or "triangular" shaped cross-section. Inclined nesting boards 196a and 196b (refer FIG. 12R) may be configured to cover the whole ceiling. Such an arrangement may increase the efficiency and productivity of the overhead nesting structure by up to 5 times; since each side of the vertical section may support 5 pairs of swiftlets (5 tiers or steps) instead of one pair as previously disclosed. Other overhead protuberances hanging down from the ceiling includes cylindrically shaped stalactites 375 and conically shaped stalactites 376 (refer FIG. 12S). The useful space for breeding swiftlets lies in the use of vertical walls and overhead ceiling trusses and protuberances. The main purpose of flat floor 195 of level/or storey 192 is for collecting bird feces; it also provides easy access for farmers to harvest the edible nests 62. Alternatively, instead of pieces of rocks 101 and 102, pieces of bricks 364 may also be used as a substitute for building the cave walls.

*A. unicolor* has been observed by researchers to feed at night under artificial lightings. Additional lamps 106 may be added in feeding chamber 259 to provide adequate lighting for supplementary nocturnal feeding sprees; enhancing the feeding opportunity for swiftlets 24 hours a day. Thus enhancing breeding, reproduction and nests production rates with larger, thicker, heavier nests; leading to a faster increase in population. Provision of an unlimited supply of food may encourage swiftlets to have 4 to 5 breeding bouts per year. Consistency in food supply and availability means the removal of natural limitations and constraints in the breeding and reproduction cycles; as well fed parents feeds their chicks more frequently, enhancing growth rates of young swiftlets, producing stronger, healthier chicks which matures and fledge earlier.

FIG. 11A to FIG. 11F illustrate additional embodiments of present invention in particular, micro-habitat features for breeding swiftlets 61 for their nests. FIG. 11A illustrates a cross-sectional view; while FIG. 11B illustrates the front view of vertical nesting wall 69a fitted with a variety of micro-features and micro-habitat adaptations. Roosting structures comprising sheer vertical walls 69 may be interspersed with rows of neatly arranged short horizontal extensions and protrusions 360 measuring 5 to 6 cm in depth or width. Short extensions 360 serves two main purposes; firstly, provide a shit shield; secondly, provide a roosting receptacle. As a shit shield, extension 360 retains and prevents bird excrement from dropping downward, thus keeping the edible nests 62 built below clean, hygienic, of high quality and market value. Swiftlets are very clean birds and chicks does not shit inside of their nests. The chicks maneuvered to defecate outside, over the edge of the nest, in this case onto receptacle 360. As a roosting receptacle, extension 360 provides ease and convenience for alighting swiftlets to cling onto, high up the vertical wall 69. A variety of small and short pieces of receptacle 360 of different designs and configuration may be attached to the wall 69a, such that from afar, the vertical wall 69 appears to be bristling with short, small pieces of attachments. Receptacle 360 may be horizontally positioned; while 360a may be inclined upward; 360b inclined downward/or mounted on a back-pad 267; 360c may be configured with a vertical frontal extension for ease of alighting by swiftlets 61. Each individual receptacle 360 may be separated from the others vertically and horizontally by a distance of empty unoccupied space 361; said receptacle 360 may measure 5 to 6 cm wide by 8 to 10 cm long. The receptacle may be attached lengthwise to wall 69a by means of shunt 266 and slot 203, with the 5 cm width protruding outward providing a shit shield and a clinging apparatus for alighting swiftlets. Alternatively, nest cups 202 may be stuck on the wall 5 cm to 7 cm below receptacle 360 which acts as a shit shield/or shit collector, keeping the nests built below clean and free from deposition of bird excrement. Receptacle 360 may be configured to be of any suitable and desirable dimension or measurement for breeding different species of swiftlets 61.

Each receptacle 360 may be configured to accommodate just one breeding pair of swiftlets/or two birds with adequate empty space 361 in between each receptacle to avoid territorial disputes, violent clashes and fatal fights between neighboring pairs of swiftlets. Swiftlets have extremely strong nest site fidelity. Nests built in close proximity causes territorial disputes, clashes and fights between neighboring breeding pairs. When a returning neighboring swiftlet lands too close for comfort, the resting bird normally emits warning vocalizations, extends its wings, or peck with its beak to ward off the intruding bird. Fights have been recorded and documented in which both birds, locked in mortal combat, fell to the ground. In the natural wilderness, such grounded birds normally die as swiftlets cannot take off from level ground; because, due to their short legs, they cannot stand upright; then, flap their wings to take off as other species of birds do. To avoid such territorial disputes from occurring, each receptacle 360 may be separated from the others by a smooth empty space 361 all around the sides. The empty spaces 361 at both sides of shit shield 360 may be glazed and smooth to prevent/avoid any swiftlets from clinging onto these portions of the wall. Smooth gaps 361 in between the individual extensions 360 also provides para-gliding swiftlets with a convenient and easy means of dropping off from the clinging receptacle 360, free-falling, before gliding to fly away. Areas above and below receptacle 360 may be calloused with claw lines 245, pitted with claw holes 246; while the receptacle 360 may be built with such claw holds as well as saw toothed claw gripping lines 204 and thorny surfaces covered with spiky thorns 377. Vertical nesting walls 69 may be configured to be solely covered on its surfaces with claw lines 245. Or it may be covered with claw holes 246; saw-toothed claw lines 204; thorns 377; indentations 59 and protrusions 60. Smooth and glazed empty spaces 361 may also be incorporated into all nesting substrates of present invention to avoid, minimize and prevent territorial disputes, clashes and fights between residential swiftlets in the farm.

FIG. 11C illustrates a perspective view of a horizontally installed receptacle 360 incorporating an indented concave crevice 57; with side clinging extension 359 all around the perimeter of the receptacle. Side extension 359 with rough, calloused serrated lines 245 provides for ease of alighting and clinging by swiftlets. FIG. 11D illustrates a perspective view of an inclined downward slopping receptacle 360b with a back rest 267. The receptacle and back rest may be made of red hematite rocks for producing red colored edible nests. FIG. 11E illustrates a perspective view of a plain inclined downward slopping receptacle 360b with serrated claw lines 245 and smooth glazed edge 361. Glazed portion 361 discourages clinging by swiftlets; while encouraging ease of slip-off for para-gliding take-offs required by swiftlets. FIG. 11F illustrates a perspective view of an inclined, downward slopping receptacle 360c with vertically disposed saw-toothed gripping footholds 204. At the bottom most portion of the footholds is installed a shit shield 362, which catches and retains bird excrement, preventing them from falling downward to dirty nests built beneath. The inclined surface may be pitted and calloused with claw holes 246.

Short horizontal stubs formed by receptacles 360 provides for ease of alighting by swiftlets, vertical perching, nesting activities and para-gliding take-offs of swiftlets. The stubs/or extension may be tilted, slanted/or inclined at any desirable angle of inclination suitable for swiftlets to alight vertically, perch and nest at height. The overhanging/overlapping design of the receptacles 360 sticking out from vertical wall 69 ensures that nests built on the wall in between upper and lower receptacles 360 are shielded and protected from bird excrement 224 falling down from above. This arrangement ensures that nests produced at the farm are clean, of high quality and high market value. The prices for clean whole nests are several times higher than that of reconstituted edible nest materials. Comparatively, if nests are built in non-shielded areas 361, they may be deposited full of bird excrement. And are thus very dirty, requires labor intensive cleaning, and of low market value.

The vertical perching receptacles 360 and portions of the wall in between the upper and lower receptacle 360 may incorporate claw lines 245, claw holes 246, saw tooth edged claw lines 204 and spiky thorns 377 for providing swiftlets with an easy gripping surface to cling on to. Conversely, parts and portions of the wall marked 361 in between receptacles 360 at the same level; and the edges 361 of receptacles 360 may be designed to be smooth and glazed, providing a slippery surface to discourage, avoid and prevent clinging by roosting swiftlets as well as nesting activities. Such a method of intentionally and purposely positioning claw gripping surfaces in desirable locations of the substrate to encourage alighting and nest building by swiftlets; coupled with the use of smooth, glazed, slippery surfaces on undesirable locations to discourage swiftlets from alighting or building their nests there; serves as a means of induced persuasion to usher the birds by default of structural configuration and design; to occupy and to build their nests in favorable, shielded position in order to produce clean, high quality edible nests. Edible nests built in undesirable locations, positions and areas marked 361 may be deposited full of bird excrement dropping down from above, resulting in dirty nests of low market value. Glazed surfaces 361 makes easy cleaning of any bird shit deposited on it.

shit pads/or shit shields 362 made of soft, flexible, non stick materials/coating may be attached to and used at the edges of receptacles 360. Bird shit sticking to it may be easily dislodged at the slightest shake or touch. Such materials may also be used to discourage perching and nest building activities on the edge of the receptacle, as nests built at the edges are easily dirtied by falling excrement. Swiftlets instinctively avoid building their nests on unstable, deformable or soft substrates; their preferred substrate being hard, stable and rough surfaces with plenty of grip. These shields are easily removable for cleaning/or replacement purposes. Aerogel may be used in the construction of roosting structure 100, 200, 356, panels 69, walls, etc.

FIG. 12A illustrates the cross-sectional view of a bricks wall 69 constructed from pieces of rectangular bricks 364 with a shallow gap of 5 to 6 cm deep in between the upper and lower pieces forming a concave crevice 57 into which nest 62 may be built. Such an arrangement produces clean nests as the extended ends of bricks 364 shields the nests from bird excrement dropping down from above. It also prevents excrement of swiftlets residing in its cavity 57 from dropping down to dirty the nests of other breeding pairs built below. Identification tags 363 may be attached to the roof of crevice 57. Alternatively, bricks 364a, 364b and 364c may comprise of tapered ends to provide easy para-gliding slip-offs for swiftlets. Bricks 364a and 364b may be tapered on one side while bricks 364c may be tapered on both sides at the end with saw toothed claw lines 204 and spiky thorns 377 on the surface to enhance gripping. Nest building substrate 267 made of red hematite may be attached into crevice 57 to produce red colored edible nests.

FIG. 12B and FIG. 12C illustrates the X-sectional configuration of vertical zig-zag wall or nesting panel 69b and 69c while FIG. 12D illustrates another form of shape in which said nesting panel 69d comprises of a wave-like undulating form. Such configurations may be used to prevent deposition of bird excrement on the nests in order to produce clean and high quality edible nests of high market value. In FIG. 12B, the plain zig-zag design and shit shield 362 provides a concave crevice 57 of 5 cm for swiftlets such as $A.$ $fuciphagus$ to build nests, while in FIG. 12C, addition of a vertical section plus shit shield 362 makes for a larger and deeper crevice 57 of 7 cm in depth suitable for larger sized species of swiftlets such as $A.$ $maximus$. Saw toothed claw holds 204 and thorny surface 377 enhances swiftlet's claw grips. In FIG. 12D, the undulating corrugated shape of the nesting panel 69d is used to provide larger and deeper concavities and crevices 57 to produce clean nests. Such a nesting wall 69d may be suitable for larger sized birds such as $Apus$ $pacificus$. Smooth and glazed area 361 assists swiftlets in slipping-off the nesting surface and for ease of cleaning any shit deposited. Extension edge 362 enables a deeper recessed crevice 57 ensuring nests built inside are kept clean. The sharp incline and steep gradient of the slope ensures ease of para-gliding take-offs for swiftlets. The corrugated nesting wall is enhanced with the attachment of a soft and pliable edge 362 which acts as a shit shield. Extension 362 also prevents and discourages nest building too near the edge of crevice 57 as swiftlets preferably builds their nests on hard surfaces. The corrugated wall 69 design resembles crevices, holes, indentations of natural cave walls.

FIG. 12E illustrates an alternative configuration in which vertical bricks walls 69 constructed of normal bricks 364 attached together by mortar and cement 366 framed by posts 365 resting on base wall 367 is arranged to create recessed crevices and concavities 57 for nesting swiftlets. FIG. 12F shows the plan view of wall 69 in FIG. 12E. Overlapping bricks and protruding edges 362 also provides a shit shield to prevent deposition of bird shit from other swiftlets nesting above. Nests built into the recessed crevices 57 are kept clean and shielded from bird excrement dropping down from above. Clean edible nests ensure low cleaning costs and high market value for the product. The lowest crevice 57 near to the base wall 367 maintains a minimum height of at least one meter. Open top crevices at the top most part of wall 69 may be covered with a piece of flat cover 368. Nests 62 may be built inside the recessed cavity 57.

FIG. 12G and FIG. 12H illustrates a piece of brick 364 with side extension 362 which acts as a shit shield, while FIG. 12I illustrates a modified hollow brick 364 with an internal cavity 57 and a tapered shit shield 362. FIG. 12J and FIG. 12K illustrates an alternative method of constructing a nesting cavity 57 in which a piece of back rest 369 is slotted into (refer direction of arrow) the empty cavity 57 in the wall, and rests on top of a modified hollow brick 364 configured with an open top and a concave cavity 57. Such an arrangement produces a larger combined cavity 57, optimizes space, materials and resources; improving efficiency and productivity of the nesting structure 69. Back rest 369 and hollow brick 364 may be manufactured as a combined piece to maximize provision of nesting crevices 57. Tapered design of shit shield 362 and steep gradient of the internal hollow cavity 57 ensures easy slip-off of swiftlets while the back rest 369 provides a substrate for nest building activities.

All edible nest swiftlets build self-supporting nests, attached to a vertical or concave face of the cave wall, often within a natural small chamber, alcove or tunnel. Small dome-shaped chambers measuring 3 m high×4 m wide accessible through a vertical tunnel and narrow ramifying passages provides the preferred nesting habitat. Another favored micro-habitat comprises narrow caverns, crevices, chasms, crevasses, abysses with linear vertical walls spaced 1 meter apart or less, 10 to 20 meters in height. Nests may also rest on narrow ledges or protuberances.

FIG. 12L illustrates an arrangement of artificial dome-shaped concavities and chambers 370 preferred by swiftlets for nesting in the wilderness of natural caves. Such a concavity forms a wholly enclosed and confined space comprising micro-habitat 17b with one access-way, normally located at the bottom of the cavity. Such an access-way may comprise of a narrow tunnel 372 measuring 1 meter or less in diameter. The dome shaped chambers 370 may rest on beams 193 propped up by supporting struts 222 and bound to each other or the substrate by means of concrete 366; or secured to the overhead ceiling beams 193, structural beams 98 or wall 191 using metal rods or bars 232. Such chambers 370 may comprise dome shaped, spherical, round, oval and oblong shaped cavities; including semi-dome shaped, semi-spherical, semi-oval and semi-oblong structures. Nests 62 may be built inside the roughened and serrated cavity of dome 370 configured with saw toothed foot-holds 204 for swiftlets to alight. The nesting substrate may also be configured to resemble the thorny, spiky and prickly skin of a durian, a local tropical fruit native to the region, to provide a favorable nest building substrate for the swiftlets. Or, the cutting, piercing, pricking, scything and skewering thorns of rattan vines and tropical creepers. Thousands and thousands of pieces of artificial, man made durian thorns 377 may be incorporated onto the surfaces of the nesting substrate. The gripping apparatus on the surface of the nesting substrate may comprise indentations 59, protrusions 60, nests cups 202, saw-toothed claw grip 204, claw-lines 245, claw-holes 246, short pieces of receptacles 360, prickly spiky thorns 377; including pitted, jagged, craggy, pock-marked, calloused, roughened and uneven surfaces. Such gripping apparatus may be incorporated onto nesting surfaces comprising vertical walls 69, 69a, 69b, 69c, 69d; building walls 191, pillars 98, stalagmites 15; overhead protuberances comprising nesting boards 196, 196a, 196b, dome-shaped chamber 370, round or cylindrical tunnels 372, cylindrical stalactites 375 and conical structures 376; in fact, on all nesting surfaces of present invention.

FIG. 12M and FIG. 12N illustrates an arrangement of vertically disposed nesting panels 69a and 69b inclined at an angle. Similar to the arrangement of FIG. 12L, the cavity formed by the panels may be configured with access only being available to and from the bottom and fully enclosed by a top cap 371. Such a configuration provides a confined micro-habitat 17b which is both simulative and emulative of naturally occurring caverns, crevices, chasms and abysses found in caves. The narrow cavern may be spaced 1 meter apart with a height/or depth of 10 to 20 meters. Alternatively, micro-habitat 17b may also be configured with access ways located at the top/or side of the micro-habitat with an enclosed bottom portion. Such an arrangement is less efficient and less productive because at least one meter of the bottom space of the crevice is not utilized by swiftlets for nesting due to their inherent need to free-fall and para-glide before flying away. In FIG. 12M the inclined panels 69a are partially stacked on top of one another held together with concrete 366; supported by horizontal beams 193 resting on vertical posts 222. Only one side of the panel 69a is configured for nesting with the other side attached by concrete 366. Nests 62 may be built attached to the jagged and saw-toothed serrations 204 of micro-habitat 17b, or thorns 377 covered surface of the substrate. A similar arrangement is set up in FIG. 12N with rows of neatly arranged inclined panels 69b resting on horizontal beams 193 propped up by vertical posts 222. Panels 69b may be serrated on both sides with zig-zagged surfaces; creating indentations which provides recessed nesting crevices 57. Double headed arrows indicate the tentative direction of dual aerial traffic flow, in and out of micro-habitat 17b. Nesting panels 69c or 69d may be used in place of panel 69b to provide larger crevices 57 for different species of swiftlets. Such an arrangement utilizing dual sided nesting panels 69 is more efficient and productive than FIG. 12M as both sides of the panels are used for nesting. The angle of inclination may be varied to suit the utility purpose of maximizing production of clean edible nests. Round or cylindrically shaped access passages comprising vertical and/or inclined tunnels 372 may also be configured for nesting purposes with one end capped.

FIG. 12O, FIG. 12P and FIG. 12Q illustrates an arrangement of nesting panels 69a built at an inclined angle. FIG. 12O illustrates the upper frontal view B; FIG. 12P illustrates the lower bottom view A; while FIG. 12Q illustrates the X-sectional/or side view. Such an arrangement guarantees the production of clean nests on one side of the nesting panel 69a, in particular, the lower, downward facing side/or on the surface of the wall marked "A". Bird shit 224 dropping down (refer to arrow) does not deposit on the nesting wall 69a. Whereas, on the upward facing, topmost side of the wall marked "B" a variety of measures may be taken to keep bird excrement from dropping down and dirtying the nests comprising shit shields 362 of 1 cm width placed directly beneath extensions 360; short horizontal shit boards 373 of 2 cm width made of pliable soft materials may be placed at regular intervals to catch any falling bird excrement 224. Safety net 84 may be placed beneath the wall 69, supported by post 222. Safety net 84 may be inclined to divert any fallen eggs and/or chicks towards a collection point, into container 374.

FIG. 12R illustrates an alternative configuration of rectangular lengths of wooden planks comprising nesting boards 196 which may be modified to form a triangular cross-section 19a and 19b. Normal nesting board 196 at left has a rectangular cross-section. The sides/or the length and breathe of modified nesting boards 196a and 196b may be inclined at an angular disposition wherein, an enlarged attachment base affixed to the ceiling 194 tapers down ward to a sharp edge, forming a "V" shaped/or an inverted, "triangular" shaped X-section (depth); such that nests built on the length and breathe of the inwardly inclined surfaces are kept clean from deposition of excrement from above without the help of shit shield 360, 362, 373. The triangular shaped (depth) nesting board 196a may be of plain configuration with its inclined surface (length and breathe) adorned with claw lines 245, claw holes 246, indentations 59, protrusions 60; or the nesting surface may be endowed with saw-toothed claw grips 204, a carpet of thorns 377 and glazed smooth areas 361. It may also be configured with a zig-zagged structure, in the form of a reversed stair case design; the steps facing downwards as illustrated by nesting board 196b. Indentations 59 and protrusions 60 provides ease of alighting by swiftlets. Edible nests built onto such triangle shaped (X-sectional) and inclined surfaces are not easily dirtied by bird excrement 224 dropping down from above. Staircase structure configured with inclined steps may also be used. As illustrated, five tiers/or steps of the inversed staircase structure may be configured, one tier below the other. Such a structural configuration produces clean nests of high quality; and improves the efficiency and productivity of overhead nesting boards 196a and 196b by up to five times per unit volume as compared to the plain configuration of board 196. If the overhead nesting apparatus are configured with ten steps/or tiers, then the efficiency and productivity is increased by up to ten times of the original capacity. Overhead nesting structures 196a and 196b may be supported with struts/or posts 222 at regular intervals as such nesting apparatus are heavier, larger and wider than plain board 196. Apart from triangular shape, such nesting structures may also be configured of trapezoid shaped X-section. The angle of inclination and clinging surfaces may be varied to suit local conditions, different species of swiftlets which are of different sizes and different distances (open space maintained) in between individual nests.

FIG. 12S illustrates artificial, man made cylindrically shaped stalactites 375 and conically shaped stalactites 376 with their attachment base affixed to the overhead ceiling 194 (indicated by arrow) with the free ends pointing downward. The nesting surface may also be adorned with claw lines 245, claw holes 246, indentations 59, protrusions 60; or endowed with saw-toothed claw grips 204 and a carpet of thorns 377.

Figure 12T:
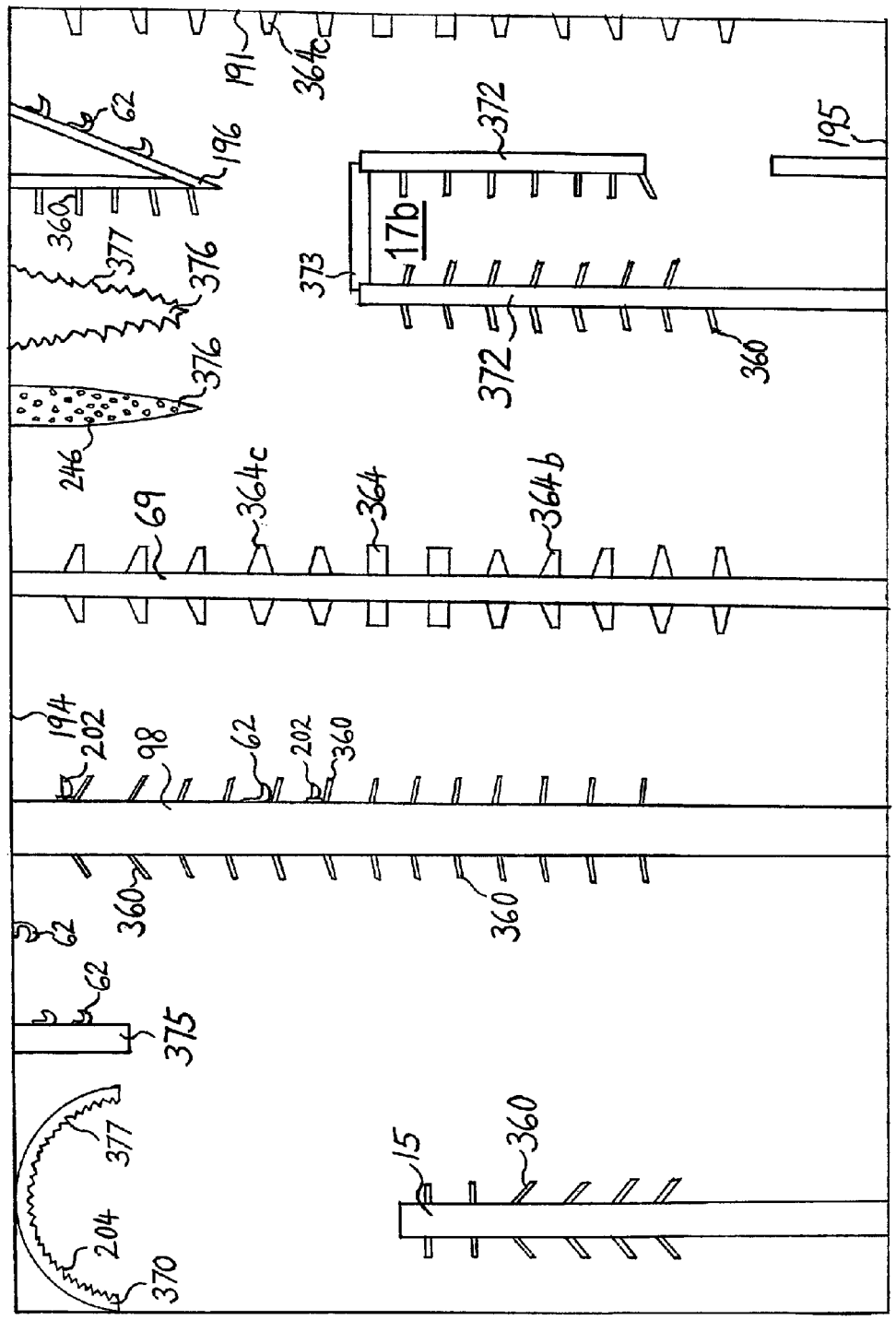
FIG. 12T shows the various configurations and arrangement of nesting structures.

FIG. 12T illustrates the combination of nesting features provided for swiftlets simulative and emulative of natural caves in which swiftlets thrives. To swiftlets, man-made shelters and roosting structures 100, 200, 365 resemble the sheltered breeding environment provided by natural caves 77. Vertical man made walls 69 erected inside the shelters are emulative and simulative of the utility purposes of sheer cliff walls 16, and walls 16 of natural cave 77. Overhead extensions 196 dangling and hanging down from the overhead ceiling 194 of the shelter resembles the utility purposes of stalactites found in natural cave 77. Nesting boards 196a and 196b may also be inclined at an angular disposition forming a triangular X-section, such that nests built on the inwardly inclined surfaces are kept clean from deposition of bird-excrement dropping down from above. The modified nesting boards 196a and 196b may be inclined on one side/or inclined on both sides.

Similarly, over head protuberances comprising cylindrical shaped structure 375 and conical shaped structures 376 with its base securely attached to, dangling and hanging down from the ceiling 194 resembles the utility purposes of stalactites found in natural cave 77. Man made stalactites 375 and 376 may be manufactured and constructed as replicas, replicating and simulating the actual stalactites in utility purposes. These structures may be covered by numerous artificial thorns 377 providing a gripping surface for swiftlets to alight.

While vertical column 15 rising half-way upwards from the ground level of the shelter resembles the utility purposes of stalagmites found in natural cave 77. Pillars 98 rising vertically from the ground level 195 to the ceiling 194 and used to support the roofing structure 105 resemble the utility purposes of rock pillars found in natural cave 77. Dome shaped concavity 370 adorned with saw toothed claw grips 204 and/or thorns 377, resembles natural rock chambers found in natural cave 77. At bottom right, vertically positioned cylindrical tunnels 372 may be configured with a top cover 373 to form a confined space and micro-habitat 17b. Such artificial tunnels resemble the utility purposes of naturally occurring rock tunnels in cave 77, which may be used as flight passages, or for nesting and breeding. Short pieces of receptacles 360 may be attached to enable swiftlets to alight easily. Wall 191 may be configured with pieces of protruding bricks 364 forming recessed crevices 57.

Figure 12U:
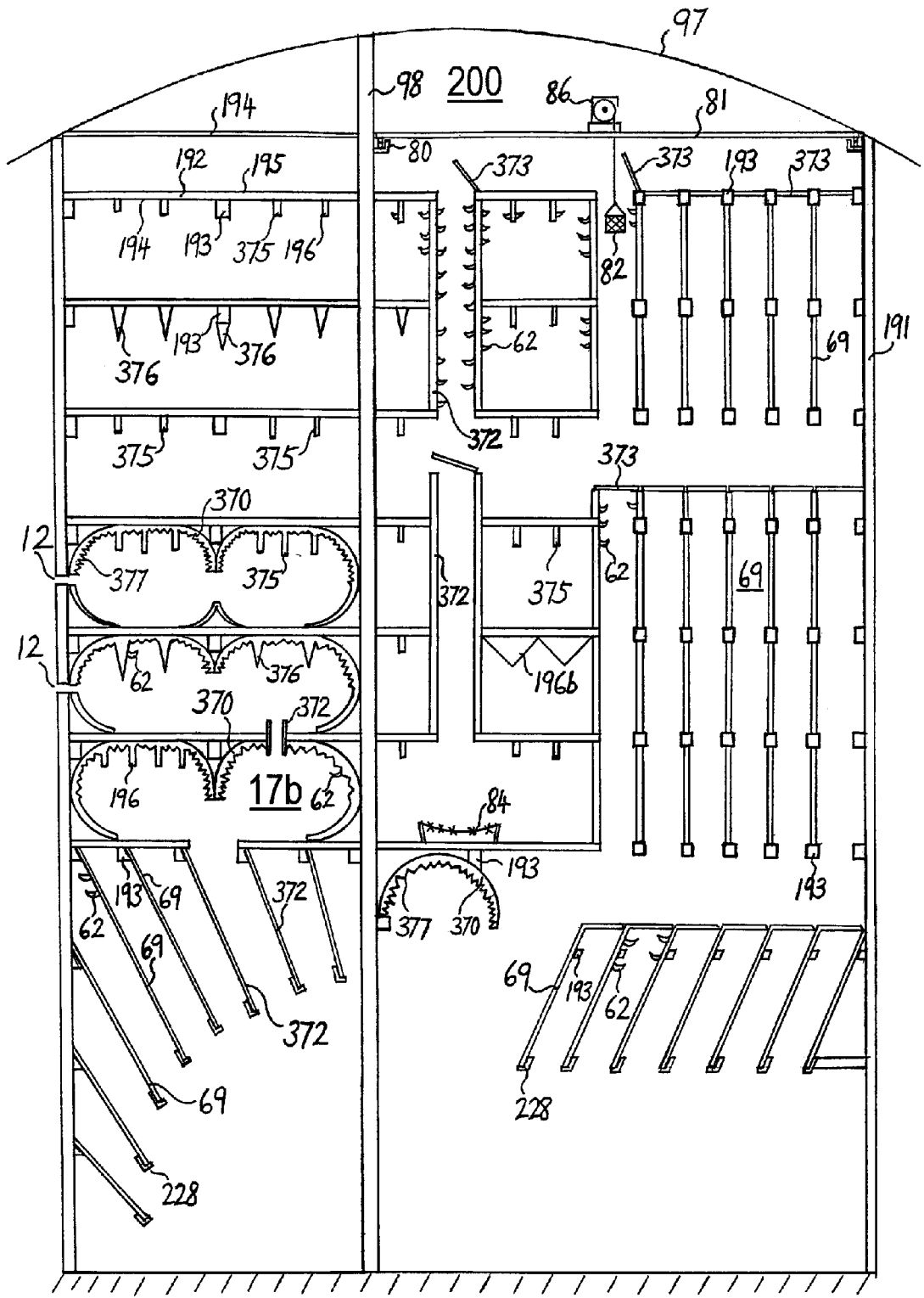
FIG. 12U shows the different arrangements of nesting walls and chambers in structure 200.

FIG. 12U illustrates the different combination of nesting structures built inside shelter 200 for breeding swiftlets. At the bottom level are inclined nesting walls 69 supported by L-shaped girders 228. L channels may rests on post 222. While at middle left, three floors of nesting space may be modified into a plurality of dome shaped chambers 370, modeled after rock chambers found in natural cave 77. Vertical overhead nesting boards 196; cylindrically shaped "stalactites" 375, conically shaped "stalactites" 376 dangling down from the ceiling of the domed chambers provides increased nesting surfaces. The interior surface may be adorned with thousands of gripping thorns 377. Such dome shaped chambers may measure 3 m high by 4 m wide, accessible through the floor 192 by means of a vertically inclined round artificial tunnel 372. The chambers may also be accessed by means of access ways 12 mounted at the side of the wall 191, and/or, interconnected by means of tunnels and passages 372. Tunnel 372 is emulative and simulative of a narrow ramifying natural cave passage. Man made tunnels 372 may also be formed by partitioning nesting walls 69 using semi-curved side-boards into enclosed round passage ways. Tunnels made of square shaped cross-section may also be constructed for use. In some cases, a large 16" PVC pipe may suffice. The levels above may be configured with nesting boards 196, modified nesting boards 196a, 196b, cylindrical protuberances 375 and conical stalactites 376. At the middle of the shelter 200, vertical tunnels 372 enclosed by top cover 373 may also be configured with claw gripping walls for breeding purposes. At the right side of structure 200, vertical nesting walls 69 rests on beams 193, with top cover 373 providing access points for overhead hoists and lifting system 86 and work cage 82. Safety nets 84 may be strategically placed at the bottom to save fallen eggs and chicks.

FIG. 13A illustrates a cross-sectional view of a stair-case shaped feeder cum flight training simulator 330. Manual tending of fostered swiftlets chicks, juveniles and fledglings on structure 330 may be provided by a human handler 378 using a mechanized lifting system 82 and 90. Young chicks may be raised by hand on lower levels of apparatus 330 by handler 378 providing semi-solid food, care and attention to their every need. Artificial nest cups 202 may be used to raise young chicks 61a. Step 315 has a raised edge or lip 55 to keep food materials 297 on the level surface, while preventing young chicks 61a from falling out. The stepped stair case structure 330 is conducive for breeding young chicks such that even if they fall out from the horizontal surface, they will only fall a short distance onto the next step. Not fatal falls to death down great heights like in the natural wilderness.

Juvenile swiftlets 61b may be raised on the upper portion of structure 330 clinging onto the vertical sides 316 while feeding off worms, insects and feed material 297 placed on the horizontal face of step 315 of feeder 330 by human handler 378. Swiftlets are altricial and the young are totally dependent on their parents. Young chicks of chicken 379 placed on horizontal step 315 pecking away at food morsels, worms and insects 297, may be used as teachers to teach and to demonstrate to the juveniles of swiftlets 61b clinging to vertical wall 316, the fine art of pecking and self-feeding. This is a conditioned action and skill which trained juveniles learnt; and shall find useful in adult life feeding from vertical feeding apparatus 314. Vertical portions 316 may be affixed with a layer of fibrous materials 380 providing a secure clinging and gripping substrate for swiftlets juveniles to train their wing muscles and for fledglings to attempt para-gliding take-offs. In the natural wilderness prior to fledging, while anchored securely to their nests 62; fledglings beats their wings powerfully, lifting their bodies into the air; but maintained a stationary body position by gripping tightly onto the substrate with the claws of their short legs; giving the impression of the fledglings trying to pull their nests off from the wall. In daily flight training sessions in preparation for a life on their wings! Such a flight training purpose of edible bird's nest 62 to fledglings is provided by flight training simulator 330; which is securely fitted with claw gripping substrate 380, nest cup 202 and modified clinging receptacles 360 and 360a installed on the sheer vertical (right) side of apparatus 330.

FIG. 13B and FIG. 13C illustrates features of modified nesting appliance 360. Near fledging juveniles 61b may also be transferred and raised on the wholly vertical (right) side 316 of apparatus 330 by means of receptacles 360 and 360a configured with food 297 holding crevice 57, vertical clinging side board 359 and clinging substrate 380. "U"-shaped cups 381 similar in utility purposes to modified nesting appliance 360 may also be attached to the sheer vertical wall 316. Young swiftlets do not utter the rattle call on the nest, until shortly before fledging. Those fledglings which have developed a rattle call (echolocation capability) and with wing feathers extending beyond the tip of their tail feathers may be placed in this sheer vertical (right) portion 316 of apparatus 330 to practice para-gliding take-offs. In the wild, such juveniles have attained the stage of physical growth in which, soon thereafter, they must take flight on their maiden voyage through the stygian darkness of the hazardous cave passages; to emerge from their birth place in the nether region, into the brilliant tropical lights of the outside world. To a life on their wings, and the freedom to roam high and afar!

FIG. 14 illustrates a method of initiating and releasing such fledglings into the world of adult swiftlets. Fledglings 61b ready for release may be arranged by handlers 378 to cling onto release pole/or board 382 which is then raised by means of a pulley mechanism up to aerial feeder 300 and water spray 214. Such that the sounds of the feeding frenzy, the feeding cries of flocks of swiftlets; numerous adult swiftlets swooping in to feed on live flying insects 297; a hive of aerial activities with both adult swiftlets and food (insects) flying all around the hungry fledglings; such a combination of external conditions may be used to sensitize, induce, excite, agitate and invigorate the fledglings to take flight from the release apparatus 382. Safety nets 84 may be arranged at the bottom of the release apparatus 382 to save juveniles which have failed in their practical fledging attempt. A similar release of fledglings may be carried out inside feeding chamber 259 of the shelter.

Besides the four main species of *Aerodramus fuciphagus, Aerodramus germanis, Aerodramus unicolor* and *Aerodramus maximus*; another avian species from the family Apodidae known to produce edible nest comprises the Pacific Swift; taxonomically classified under the scientific classification as *Apus pacificus*. Also known as the fork-tailed swift, *Apus pacificus* produces white edible bird's nests. Breeding colonies are known to be established in the eastern Trat province of Thailand. They are similar in size to the Common Swift Apus apus and are black except for a white rump. And can be distinguished from a partially leucistic Common Swift by the deeper tail fork, longer wings, bigger head and larger white throat patch. Similar to the characteristics of edible-nest-swiftlets, Pacific swifts have very short legs which they use only for clinging to vertical surfaces and they never settle voluntarily on the ground. They spent most of their lives in the air, living on the insects they catch in their beaks; and built their nests on cliffs, laying a clutch of 2-3 eggs, returning to the same site year after year.

Due to constraints in supply of traditional white and black nests in meeting global demand, nests materials produced by glossy swiftlets, *Collocalia esculenta* which is of low commercial value is now also in demand. The nest is attached to the substrate by a firm, copious, crescent shaped basal application of salivary nest cement. It is this attachment base to the substrate called the "hinge" that contains salivary nest cement which may be exploited. Since *Collocalia* spp. cannot echolocate, they lack the ability to penetrate, orientate and navigate in the total darkness of true caves. Thus *Collocalia esculenta* and *Collocalia linchi* can only occupy the cave entrance, cliff sides, areas which are sheltered and dimly lit, but still visible; and must return to roost before daylight fails totally. These non echo-locating species of *Collocalia esculenta, Collocalia linchi* and *Apus pacificus* may also be bred for their nests 62 in the production facilities of present invention such as transformed cliff-side shelters and production structures, crevices and caverns 18; shelters 100, 200, 365 configured with a brighter interior/or the use of artificial lights to enhance nesting activities; and farmed commercially using methods and techniques; systems, apparatus and equipment as disclosed.

Activated carbon or charcoal may be used to remove undesirable odor from edible nests. Nests containing odoriferous substances may be totally confined in an enclosure together with activated carbon for a period of time. While the nests may not be in direct contact with the cleansing substance, the activated carbon will absorb and remove undesirable smell or odor from the nests. Such odor purification technique produces high quality nests of high market value.

The enveloping canopy of equatorial forests prevents swiftlets from accessing and feeding from areas in between the trees. The surrounding vegetation of swiftlets farm 113 may be configured to comprise stripped forests or plantations in order to maximize feeding areas for residential swiftlets. Such a method helps in opening up and optimizing feeding zones. Rows or clusters of trees with strips of open spaces in between planted with low lying vegetation, grass or crops enables swiftlets to forage, hunt and feed from the low open areas in between the tall trees, at the edges of the forest vegetation. Aquaculture ponds integrated into the farm surroundings provides water for the flocks. Water is very important in the breeding biology of swiftlets. Naturalists have observed that, at all times of the day, swiftlets leaving the caves typically fly in a loose stream 30 to 60 meters above the canopy of the surrounding forest. They may meander around the edge of the forest vegetation, or fly low over a river.

Many swiftlets eggs are lost during incubation. The incidence of egg loss due to natural occurrence is approximately 30% for edible nest swiftlets comprising *A. fuciphagus, A. maximus* and *C. esculenta*. Main causes of eggs loss include accidental ejection by the incubating adult, premature falling of nests, and predation by large crickets. Swiftlets are easily startled leading to hysteria and panicky flights. Incubating swiftlets normally sit facing the cave wall, with the tail and wings projecting over the rim of nest 62. When alarmed they leap off from the nest and make a sideways turn, with a few powerful flaps of the wings to get airborne. It is at this critical moment that most eggs are accidentally tossed out of the nest, particularly if they are caught in between the feet of the incubating parent swiftlets. In the Niah Caves of Sarawak, a giant cave dwelling cricket *Rhaphidophora oophaga* equipped with strong biting mouth-parts, is known to feed on the eggs and attack vulnerable and defenseless newly hatched nestlings of swiftlets. Such giant crickets and related species are common in many caves. Having a pair of powerful hind legs, they are capable of clambering high up cave walls, to reach areas safe from other predators. Other invertebrate carnivores comprise centipedes with powerful pincer like jaws able to kill young swiftlets. In the swiftlets farm 113, all such natural threats shall be eliminated and exterminated by their human guardians.

Accidental falls from the nest are a common cause of fatality for weak nestlings. This may happen when a nestling moves backwards to defecate over the edge of the nest. When at the right distance from the edge of its nest, with feet firmly gripping the bottom of the nest, the chicks straightens its legs until the anus is positioned over the rim of the nest. The excrement is then expelled. If the nestling loses its balance and footholds at this critical moment, the resultant fall to the cave floor is fatal. Accidental falls may also occur when hungry nestlings become restless and hypersensitive to neighboring activities until they actually crawl out of the nest and fall. Even if swiftlets chicks do not die immediately from the fall, they may be attacked and killed by predators or simply die of starvation.

In the entire life cycle of the swiftlets, the most vulnerable stage is in the chick stage, which has the highest mortality rates. In the natural wilderness, assuming this figure is also similar to eggs loss at 30%; then between egg laying and recruitment into the ranks of hunt-foraging swiftlets, the combined eggs loss cum chicks mortality rate may comprise 60%. This is an extremely high rate of eggs loss and chicks fatality; with an overall success rate of only 40%. That is, only 40% of the total eggs laid translate into new and successful recruits joining the colony. Theoretically, safety nets 84 may/or can save up to 60% of accidentally ejected eggs and fallen swiftlets chicks and juveniles which otherwise, would have perished. Safety net 84 arranged below the nesting walls may be used to save accidentally ejected eggs and fallen chicks. Daily routine checks may be conducted to rescue such accidentally ejected eggs and fallen chicks for incubation and fostering by human handlers 378. Premature nest fall caused by weakened nest to substrate binding due to water seepage through the walls may be arrested by means of regular inspection and structural repairs to the swiftlets shelter. Reducing mortality rates of swiftlets eggs and chicks by up to 60% is a worthwhile endeavor of present invention; which will doubtless contribute tremendously towards the conservation and preservation of endangered swiftlets in particular; and protected wildlife in general. And improved productivity and efficiency of swiftlets farm 113.

Reticulate python, Python reticulates and the cave racer, *Elaphe taeniura* are known predators of swiftlets. Bat hawks comprising the species *Machaerhamphus alcinu* presents a major threat to swiftlets. It is the only predator which possesses the speed and agility in flight, and shares the same airspace with swiftlets. Although the main diet of bat hawks comprises slow flying bats which forms easier preys, bat hawks have been witnessed preying on swiftlets emerging from their roosting caves. Bat hawks, waiting from their perches on nearby cliffs or over hanging tree branches at the cave entrance, ambushes swiftlets from behind as they emerged. In the swiftlets farm 113, all such natural threats shall be excluded, eliminated, exterminated and made non-existent by the human guardians of swiftlets. In their natural habitat and the wild environment, humans may be the worst enemies of edible nest swiftlets 61. In the mutually beneficial symbiotic farmed environment of present invention, mankind may well be the saviour of edible nest swiftlets; their greatest benefactor cum beneficiary. Given private ownership of a resource, man-kind may be turned from destructive exploitation, from being the destroyer, the bane of edible nest swiftlets very survival; into champions of wildlife conservation and protectors of swiftlets!

Features of present invention not only provides a conducive environment for full filling and meeting the habitat requirements of swiftlets; but far exceeded any naturally existing conditions for wild breeding swiftlets. The structures and apparatus are specially and specifically configured for this single purpose—to breed swiftlets. All features and individual components, apparatus, techniques, systems and methods as disclosed in present invention may be cross applied, used in combination and integrated with each other for breeding of edible nest swiftlets 61 to produce edible bird's nests 62 for human consumption.

Finally, it is to be understood that various alterations, modifications and/or additions may be introduced into the constructions and arrangements of parts previously described without departing from the spirit or ambit of the invention.

We claim:

1. A method of cultivating and harvesting bird's nests, said method comprising:
    providing a production facility within a residential location, the production facility comprising at least one man made cave structure configured to provide a shelter and nesting habitat in an environment emulative and simulative of natural cave conditions in which cave dwelling swiftlets thrive; said production facility comprising:
    at least one enclosure;
    at least one vertical nesting apparatus selected from a group consisting of: a steep vertical wall; and an overhead vertical nesting apparatus;
        said at least one vertical nesting apparatus disposed within the enclosure and including at least one roosting structure disposed on the wall wherein the vertical nesting apparatus further includes a clinging substrate wherein,
        said at least one vertical nesting apparatus provides at least one nesting substrate;
    at least one humidifying means operable to maintain the humidity of the enclosure at about 80%; and
    at least one means for maintaining the temperature within the enclosure in the range of about 26° C. to 28° C.;
    populating the production facility with at least one breeding swiftlet;
    maintaining the environment within the at least one enclosure at approximately 80% humidity and 26° C. to 28° C.;
    maintaining the at least one enclosure in stygian darkness;
    providing at least one electronic audio system to emit swiftlet sounds.

2. A method as recited in claim 1, wherein, said at least one vertical nesting apparatus is selected from the group consisting of: a nesting board affixed to ceiling or beam; a ceiling-floor beam; a triangular inclined board; a multi-tiered staircase structure; a dome shaped semi-spherical concavity with a hollow internal structure; a tunnel structure; a cylindrical stalactite; and a conical stalactite.

3. A method as recited in claim 2, wherein, said at least one clinging substrate is selected from the group consisting of: an indentation; a protrusion; a saw-toothed claw grip; a claw line; a claw hole; a spiky thorn; a nest cup; and a vertical surface for alighting.

4. A method as recited in claim 1 wherein, said at least one enclosure is selected from the group consisting of: a modified abandoned vacant human dwelling; a modified unoccupied multi-storied commercial building suitably adapted with doors and windows shuttered, bricked up and cemented; a customized structure; an artificial cave; a multi-storied building specially designed and suitable configured purposely built for breeding swiftlets.

5. A method as recited in claim 1, wherein, said at least one electronic audio system is selected from a group consisting of: a speaker; a tweeter; a unit capable of audio data storage-memory, generation and broadcasting; a visual display unit; a television; a home entertainment system; a computerized multi-media musical-audio system capable of data storage-memory, generation, broadcasting and display; and a computerized multi-media musical-audio-visual system capable of data storage-memory, generation, broadcasting and display.

* * * * *